United States Patent [19]

Long, Jr.

[11] Patent Number: 4,776,370

[45] Date of Patent: Oct. 11, 1988

[54] APPARATUS FOR SECURING A CABLE TO A TUBULAR PIPE LINER

[75] Inventor: Charles A. Long, Jr., Birmingham, Ala.

[73] Assignee: Long Technologies, Inc., Birmingham, Ala.

[21] Appl. No.: 3,991

[22] Filed: Mar. 5, 1987

Related U.S. Application Data

[62] Division of Ser. No. 645,123, Aug. 28, 1984, Pat. No. 4,685,983.

[51] Int. Cl.$^4$ ............................................. F16L 55/16
[52] U.S. Cl. ......................................... 138/98; 138/109
[58] Field of Search ................... 138/97, 98, 107, 109; 141/98, 301, 302; 294/86.4; 383/12, 15, 20

[56] References Cited

U.S. PATENT DOCUMENTS

| 676,660 | 6/1901 | Mogg | 383/20 |
|---|---|---|---|
| 1,261,008 | 4/1918 | Braly | 138/107 |
| 1,577,562 | 3/1926 | Cooper | 383/20 X |
| 2,110,408 | 3/1938 | Tallman | 294/86.4 X |
| 2,311,767 | 2/1943 | Lumbard | 294/86.42 |
| 2,491,929 | 12/1949 | Orchard | 383/20 X |
| 4,006,521 | 12/1977 | Pedone | 294/86.4 X |
| 4,114,941 | 9/1978 | Heaton | 294/86.4 |
| 4,300,608 | 11/1981 | Cuthbertson | 383/15 X |
| 4,356,933 | 11/1982 | Connolly | 383/908 X |
| 4,480,766 | 11/1984 | Platt | 383/17 X |

FOREIGN PATENT DOCUMENTS

| 20478 | of 1911 | United Kingdom | 383/20 |
|---|---|---|---|
| 747206 | 3/1956 | United Kingdom | 383/17 |

*Primary Examiner*—Mark J. Thronson
*Attorney, Agent, or Firm*—Panitch Schwarze Jacobs & Nadel

[57] ABSTRACT

An apparatus for securing a generally flexible cable to one end of a generally flexible tubular pipe liner which has been impregnated with a thermosetting resin comprises a reinforcing member for reinforcing the liner end to distribute any tension exerted by the liner on the cable. A portion of the liner proximate the one end of the liner is flattened, with the interior liner surfaces interengaging to close the one end and to establish two generally flat liner end portion sides, the flattened liner end portion including a plurality of openings extending therethrough from side to side, the reinforcing member being secured to both sides of the flattened liner end portion. The reinforcing member includes a plurality of openings extending therethrough, the reinforcing member openings being in registry with the liner end portion openings. Fasteners extend through the registered openings in the liner end portion and in the reinforcing members for securing the reinforcing member to the liner end portion. A portion of the reinforcing member extends beyond the end of the liner and includes an attachment member for attaching the cable to the reinforcing member.

8 Claims, 21 Drawing Sheets

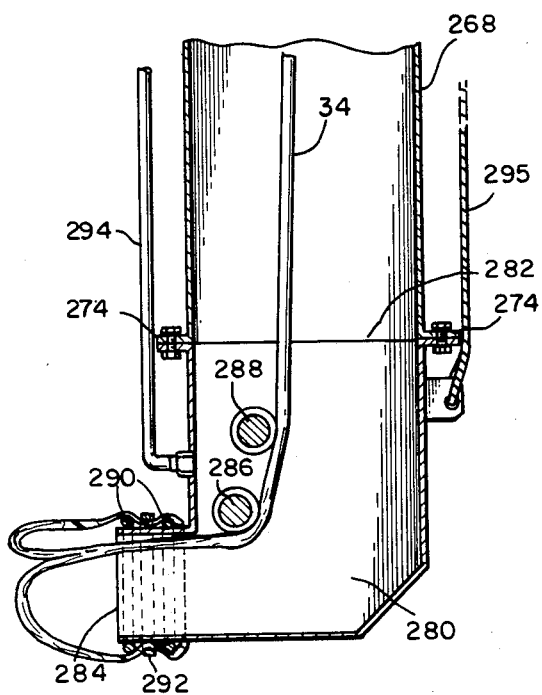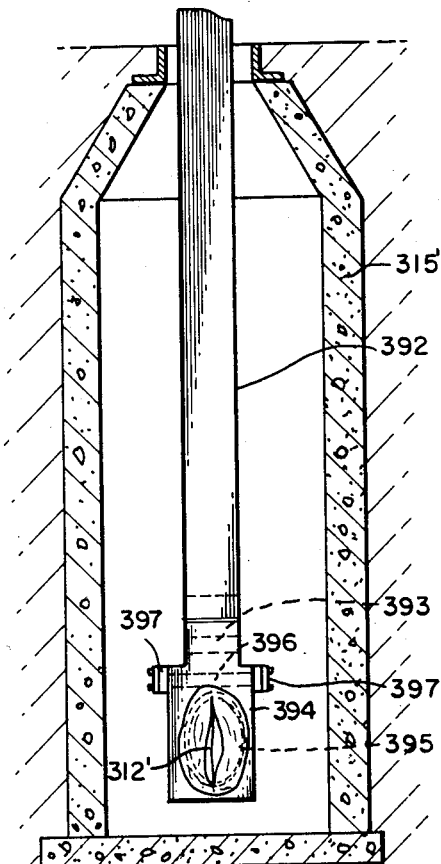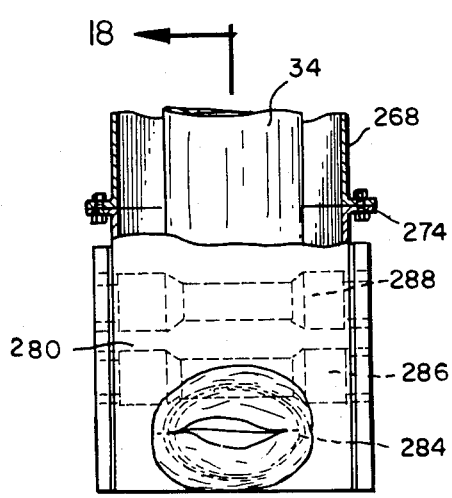

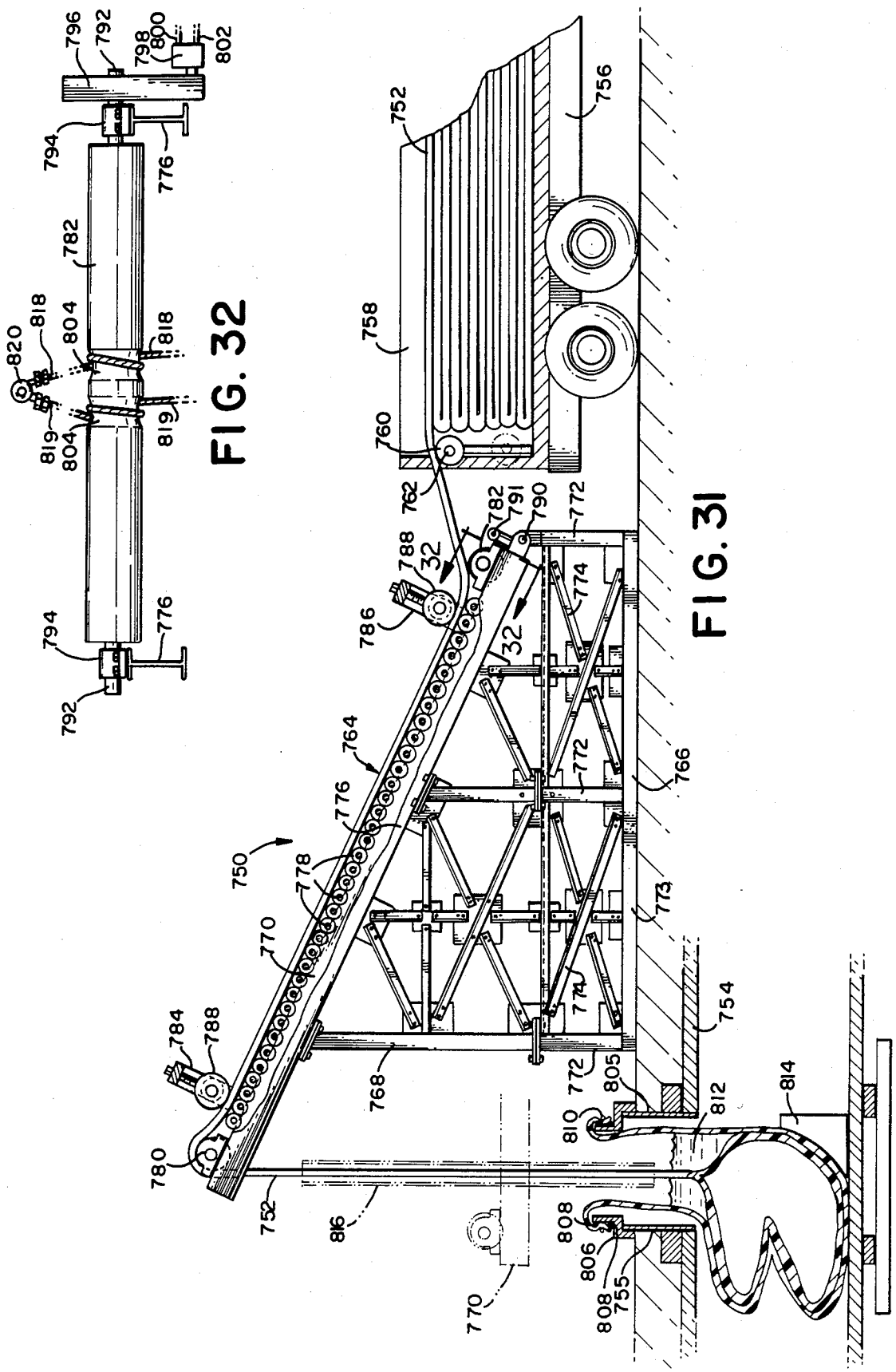

APPARATUS FOR SECURING A CABLE TO A TUBULAR PIPE LINER

This is a division, of application Ser. No. 645,123, filed 8/28/84, now U.S. Pat. No. 4,685,983.

BACKGROUND OF THE INVENTION

The present invention relates generally to a method and apparatus for the installation of a liner within the interior of such a conduit or pipe, such as a sewer pipe.

It is generally well known that the conduits or pipes, particularly underground pipes, which are employed for conducting fluids, for example, sanitary sewer pipes, storm sewer pipes, water lines and gas lines, frequently require repair due to fluid leakage. The leakage may be inwardly, from the environment into the interior or conducting part of the pipe, or outwardly, from the conducting part of the pipe into the surrounding environment. Leakage of this type may be due to improper initial installation of the pipe, deterioration of the pipe itself due to normal aging or the effects of conveying corrosive or abrasive materials, cracking of the pipe or pipe joints due to environmental conditions such as earthquakes, the movement of large vehicles or similar natural or man made vibrations, or any other such causes. Regardless of the cause, such leakage is undesirable at best and may result in waste of the fluid being conveyed by the pipe, damage to the surrounding environment and the possible creation of dangerous public health hazards.

Because of ever increasing labor and machinery costs, it is becoming increasingly more difficult, at least economically, to dig up and replace underground pipes or portions or sections of such underground pipes which may be leaking. As a result, various methods have been devised for the in situ repair or rehabilitation of the existing pipes, thereby avoiding the expenses and hazards associated with digging up and replacing the pipes or pipe sections. One of the more successful pipe repair or rehabilitation processes which is currently used is called the Insituform process and is decribed in U.S. Pat. Nos. 4,009,063; 4,064,211; and 4,135,958 the contents of which are incorporated by reference herein.

Briefly, in the Insituform process, an elongated flexible tubular liner comprised of a felt fabric or foam or similar flexible material, which has been impregnated with a thermosetting synthetic catalyzed resin is installed within the existing pipe utilizing an inverting or everting process as described in the aforesaid patents. Once the flexible liner is installed in place within the pipe, the liner is pressurized from within, preferably utilizing a fluid such as water, to force the liner radially outwardly to engage and conform to the interior surface of the pipe and to force some of the impregnated resin into any cracks or interstices within the walls of the pipe. The resin is then cured to form a relatively hard, tight fitting, rigid pipe lining which effectively seals any cracks and repairs any pipe or pipe joint deterioration to prevent further leakage either into or out of the pipe. The cured resin liner also serves to strengthen the existing pipe walls to provide added structural support for the surrounding overburden.

The method described in the aforementioned U.S. patents for inserting the liner into the pipe involves the use of a tower or scaffold which is approximately twenty-five to thirty feet high in order to provide the necessary water pressure head required to invert the liner and push it along the length of the pipe to be lined. While this method has been successfully utilized, it is relatively expensive in terms of both equipment and manpower to erect and operate such a large structure. In addition, such a large structure is awkward to utilize and, due to the height and the use of very hot water within the elevated structure to cure the resin, is dangerous to the operating personnel. Moreover, the existing liner insertion method is inadequate especially for the installation of a liner into a large diameter pipe since no positive control of the insertion and inversion of the liner is provided throughout the entire inversion process. In addition, it is difficult to work with the tremendous forces that are created by the water pressure required for such a large liner installation.

The present invention overcomes many of the difficulties inherent in the prior art liner installation method by providing a relatively self-contained, mobile system which permits the use of air pressure in combination with, and in some instances in lieu of, water pressure for the installation and inversion of the liner. In this manner, the liner can be installed within the pipe without the need for a large tower and without the need for numerous operator personnel. The present invention also provides for effective, positive, continuous control of the rate of insertion of the liner as it is being installed within the pipe and, therefore, the present method and apparatus is adapted for use in connection with the installation of liners in pipes of differing diameters without the need for additional equipment or personnel.

SUMMARY OF THE INVENTION

Briefly stated, one aspect of the present invention comprises an apparatus for installing a flexible tubular liner within a conduit comprising a supply of liner having a leading end a trailing end, means for generating fluid pressure to install the liner including a source of pressurized fluid and means defining a pressurized region, an insertion conduit having an entry end and an exit end through which the liner is inserted into the conduit, the entry end of the insertion conduit being sealingly connected to the means defining the pressurized region, means on the exit end of the insertion conduit for sealingly clamping the leading end of the liner to the exit end of the insertion conduit and for creating a fluid tight seal between the liner and exit end of the insertion conduit, a first feed control means for substantially continuously controlling the feed rate of the liner as it is inverting, the first feed control means comprising a conveyor having a slack conveyor belt and an idler nip roller assembly juxtaposed in aligned spaced relationship to the conveyor, the assembly including means for adjusting the compressive force of the nip rollers on a liner passing between the nip rollers and the conveyor, and means for controlling the speed of the conveyor belt, and a second feed control means for substantially continuously controlling the feed of the liner as it inverts which is effective sequentially to the first feed control means.

BRIEF DESCRIPTION OF THE DRAWINGS

The foregoing summary, as well as the following detailed description will be better understood when read in conjunction with the appended drawings. For the purpose of illustrating the present invention, there is shown in the drawings several embodiments which are present preferred, it being understood, however, that this invention is not limited to the precise arrangements and instrumentalities shown. In the drawings:

FIG. 17 is an enlarged right side elevation view, partially in section, of a portion of the apparatus shown in FIG. 1;

FIG. 18 is a sectional view taken along line 18—18 of FIG. 17;

FIG. 19 is an alternate embodiment of a portion of the apparatus shown in FIG. 6;

FIG. 31 is an elevation view, partially in section, of an alternate embodiment of the apparatus shown in FIG. 7; and FIG. 32 is an enlarged sectional view taken along line 32—32 of FIG. 31.

DESCRIPTION OF THE PREFERRED EMBODIMENTS

Figure 1:
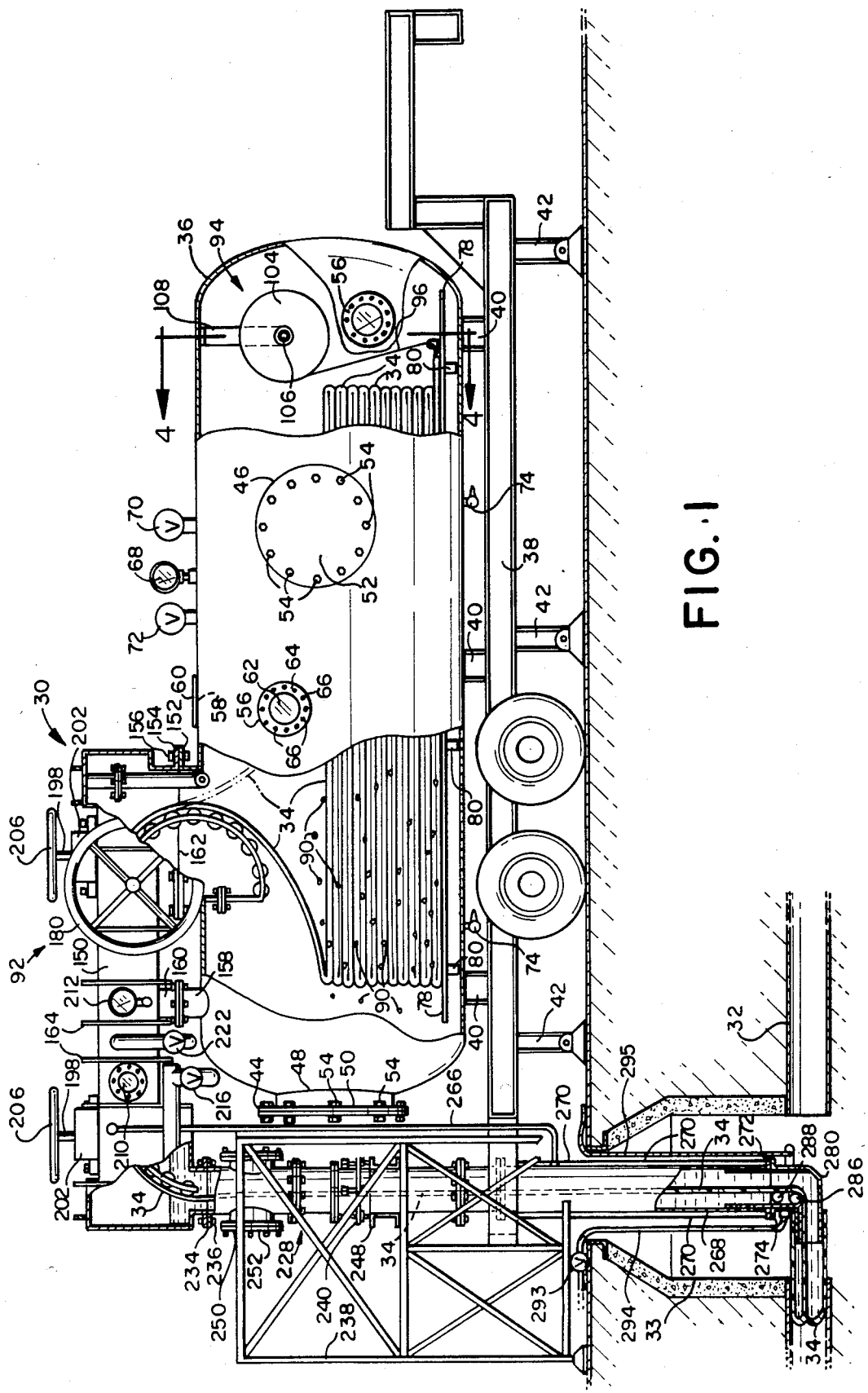
FIG. 1 is an elevation view, partially broken away and partially in section, showing a first embodiment of the method and apparatus of the present invention employed for the installation of a liner within a conduit having a diameter of from about four to about twelve inches.

Referring to the drawings, wherein like numerals are employed for the indication of like elements throughout, there is shown in FIG. 1 an elevation view, partially in section, of an apparatus generally designated as 30 for installing a liner within a conduit in accordance with the present invention. In the present embodiment, the conduit shown in FIG. 1 as 32 comprises an underground pipe or pipe line such as a sewer pipe. In the present embodiment, the sewer pipe 32 has a diameter of between about four and about twelve inches.

The liner 34, which is to be installed within the sewer pipe 32, is comprised of a predetermined length of elongated tubular material which has been impregnated with a thermosetting synthetic resin. Two types of flexible liners are presently available. The first type of liner (not shown in detail) has a polyester felt inner layer which is bonded to an outer layer of polyester felt to which is bonded a coating of polyvinyl chloride. An epoxy resin is impregnated within this first type of liner. The second type of liner (also not shown in detail) also has a polyester felt liner layer which is bonded to an outer layer of polyester felt to which is bonded a polyvinyl chloride coating. The second type of liner is impregnated with a resin system containing polyester resin catalyst inhibiter or vinyl vinylester resin catalyst inhibitor. The thickness of the layers of the lining may be varied depending upon the particular application. Details concerning a method for impregnating the liner 34 with the resin are available from the aforesaid patents and are not necessary for a complete understanding of the present invention. Likewise, various resin and catalyst systems can be used based on the varying environments, pipes, liner materials, etc. and are known to those skilled in the art. The outer diameter of the tubular liner 34 is generally equal to the inner diameter of the sewer pipe 32.

As previously indicated, the apparatus 30 is adapted to facilitate the installation of the liner 34 within the sewer pipe 32. For this purpose, the apparatus 30 forms a generally closed, pressurized system or pressurized region comprised in part by a sealable pressure vessel 36. In the present embodiment, the pressure vessel 36 is generally cylindrically shaped and is movably supported by transport means, in the present embodiment, a standard, heavy duty flat bed trailer 38 of a type well known in the art and generally commercially available. Any other type of transport means such as a one piece truck (not shown) could alternatively be employed. The pressure vessel 36 is supported upon and fixed or secured to the flat bed trailer 38 by support means, in the present embodiment, a plurality of elongated steel support beams or blocks 40, only three of which are shown in FIG. 1. The lower surfaces of the support blocks 40 are generally flat to conform to the upper surface of the flat bed trailer 38. The upper surfaces of the support blocks 40 are suitably curved to compliment and correspond too the curvature of the bottom of the pressure vessel 36 so that the support blocks 40 form a continuous supporting surface for the pressure vessel 36 which also prevents the pressure vessel 36 from rolling or otherwise moving laterally. The support blocks 40 are secured or affixed to both the pressure vessel 36 and the flat bed trailer 38 by any suitable means, for example, by welding.

The flat bed trailer 38 includes levelling and support means, in the present embodiment, a plurality of mechanically or hydraulically operated supporting jacks 42, only three of which are shown in FIG. 1. The structure and operation of supporting jacks of this type is generally well known in the art and therefore will not be described. Suffice it to say that when the flat bed trailer 38 is properly positioned at the job site of a liner installation as shown in FIG. 1, the jacks 42 are lowered to the usual known manner thereby engaging the surface of the ground as shown in order to provide firm support for the trailer 38 and to position or maintain the trailer in a generally level condition.

In the present embodiment, the pressure vessel 36 is fabricated of steel, but could be made of any other suitable material having sufficient strength to safely withstand internal pressures of twenty-five pounds per square inch or more. In the present embodiment, the cylindrical pressure vessel 36 is approximately twenty feet long and six feet in diameter.

The pressure vessel 36 is provided with two access ports 44 and 46 located at the rear end panel and side, respectively, to permit an operator to enter the pressure vessel 36 for purposes which will hereinafter be discussed. Each access port 44 and 46 is comprised of a generally circular opening 48 which extends through the wall of the pressure vessel 36 with a generally annular outwardly extending flange member 50 surrounding the opening 48. The flange member 50 is sealingly secured to the pressure vessel wall by an suitable means, preferably welding. The outwardly extending end of the flange member 50 includes a generally flat surface which is engaged by a suitably sized generally circular cover member 52 which is made of aluminum or some other strong but lightweight material. The cover member 52 is secured to the respective flange member 50 by attachment means, preferably a plurality of nuts and bolts shown collectively as 54 which are equally spaced around the perimeter of the cover member 52 as shown. An annular sealing gasket (not shown) is installed between the cover member 52 and the corresponding flange member 50 in order to provide an airtight seal when the nuts and bolts 54 are tightened. Access to the interior of the pressure vessel 36 is afforded by removing the nuts and bolts 54 from either of the access ports 44 or 46 and removing the respective cover member 52.

The pressure vessel 36 further includes a plurality of observation ports 56, only three of which are shown in FIG. 1, to permit an operator to visually observe the operations occurring within the pressure vessel 36 during liner installation. Each observation port 56 is comprised of a generally circular opening 58 extending through the pressure vessel wall and a generally annular outwardly extending flange member 60 which surrounds the circular opening 58 and is sealingly secured to the pressure vessel 36, preferably by welding. A generally circular view plate 62, preferably made of a transparent material such as a fluid impervious synthetic polymeric plastic, extends over the end of the annular flange 60 and is held in place by an annular cover ring 64. The cover ring 64 is secured to the annular flange 60 by attachment means, preferably a plurality of nuts and bolts shown collectively as 66. Suitable annular gaskets (not shown) are positioned between the view plate 62 and the annular flange 60 and between the cover ring 64 and the view plate 62 so that when the nuts and bolts 66 are tightened, the observation ports 56 are airtight to maintain the pressure within the pressure vessel 36.

A pressure indicating means, such as a standard pressure gauge 68, is positioned preferably on the top of the pressure vessel 36, to provide the operator with a visual indication of the pressure within the pressure vessel 36. Pressure safety means, in the present embodiment a pair of automatic pressure relief valves 70 and 72, are also located on the top of the pressure vessel 36 on either side of the pressure gauge 68. In the present embodiment, pressure relief valve 70 is predesigned to open or release when the pressure within the pressure vessel 36 exceeds twenty-five pounds per square inch. Similarly, in the present embodiment, pressure relief valve 72 is predesigned to open or release when the pressure within the pressure vessel 36 exceeds fifteen pounds per square inch. In most applications, the pressure required for insertion of the liner 34 within the sewer pipe 32 is below fifteen pounds per square inch and is typically on the order of ten to twelve pounds per square inch. However, since there may be applications in which the pressure required for the installation of the liner is between fifteen and twenty-five pounds per square inch, an override valve (not shown) is provided to circumvent pressure relief valve 72 to permit the use of pressures in excess of fifteen pounds per square inch within the pressure vessel 36. For purposes which will hereinafter become apparent, drain means such as closeable drain valves 74 are provided at the bottom of the pressure vessel 36.

The pressure vessel 36 is employed for containing and transporting the liner 34 from a centralized facility to a remotely located job site for installation within the sewer pipe 32. The liner 34 is first selected for a particular application and is cut to a predetermined length roughly corresponding to the length of the sewer pipe 32 to be lined. The predetermined length liner is then impregnated with the selected thermosetting resin at the centralized liner preparation facility (not shown) and is lubricated and cooled. Thereafter, the liner 34 is loaded into the pressure vessel 36 through one of the access ports 44 or 46 for transport to the job site.

Figure 4:
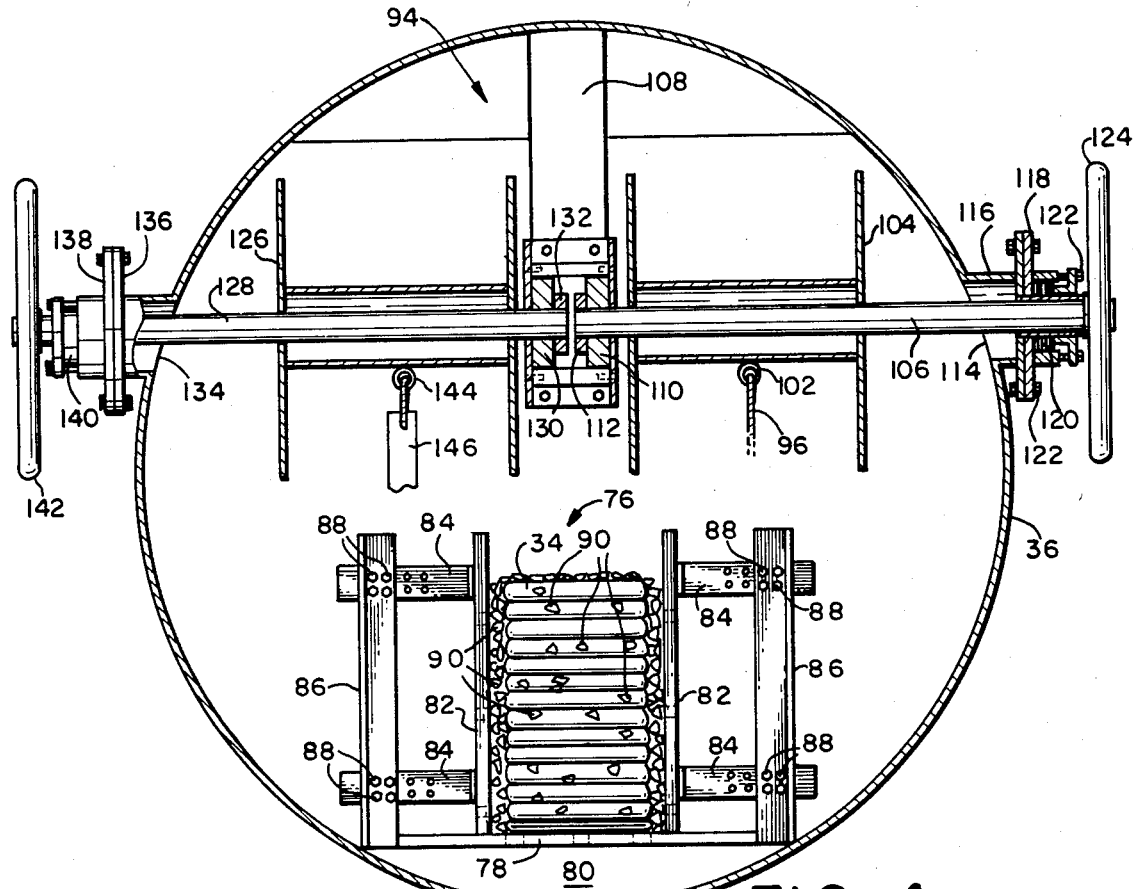
FIG. 4 is a sectional view taken along line 4—4 of FIG. 1.

As best seen in FIGS. 1 and 4, the pressure vessel 36 includes a liner storage means shown generally as 76 for receiving and maintaining the previously prepared liner 34. In the present embodiment, the liner storage means 76 is shaped like an elongated open topped box structure and comprises a generally flat, elongated base member 78 extending generally axially along the bottom of the pressure vessel 36. The base member 78 is supported by a plurality of support members 80 (only four of which are shown in FIG. 1) each having a generally flat upper surface and a curved lower surface to compliment and conform to the curvature of the bottom of the pressure vessel 36 as shown in FIG. 4. In this manner, the support members 80 provide relatively level, fixed support for the liner storage means 76. The support members 80 are fixed or secured to the bottom of the pressure vessel 36 and to the underside of the storage means base member 78 by any suitable means, preferably by welding.

The liner storage means 76 further includes a pair of generally parallel elongated sidewall mebers 82 which are generally perpendicular to the base member 78 and extend along the axis of the pressure vessel 36 as shown. The sidewall members 82 are supported by a plurality of outwardly extending adjustable support arms 84 which in turn are attached to a plurality of generally parallel vertically extending spaced apart support posts 86. The support posts 86 are secured to the base member 78 by any suitable means, preferably welding.

The adjustable support arms 84 are attached to the support posts 86 by a conveniently removable attachment means, for example, a plurality of nuts and bolts 88 which may be installed within a plurality of aligned openings extending through the support arms 84 and the support posts 86 as shown. In this manner, the width of the liner storage means 76 may be adjusted to accommodate liners which vary in width or thickness. The spacing between the sidewall members 82 may be adjusted by loosening and removing the nuts and bolts 88 and thereafter moving the sidewall members 82 to the desired positions. Thereafter, the nuts and bolts 88 are reinstalled within the aligned openings extending through the adjustable support arms 84 and the support posts 86 to secure the sidewall members 82 in place.

After the liner 34 has been impregnated with the resin, it is installed within the pressure vessel 36 by overlapping it and stacking it end to end as shown upon the base member 78 between the two side wall members 82 (see FIG. 4). When utilizing thermosetting resin, it is desirable to maintain the resin at a reduced temperature in order to retard the curing process until the liner 34 is fully inserted into the sewer pipe 32. In order to maintain the resin impregnated liner 34 at such a reduced temperature, the liner is initially cooled at the centralized liner preparation facility (not shown). The base member 78 and the sidewall members 82, which are in close contact with the liner 34 during transportation and storage within the pressure vessel 36, are comprised of or at least lined with a thermal insulating material such as an open or closed cell foam or the like. The walls of the pressure vessel 36 may also be lined with a thermal insulating material (not shown) in order to assist in keeping the liner 34 cool during transport and storage. An alternate method of cooling the liner 34 or to cool it further is to include a refrigeration system (not shown) in the pressure vessel 36.

In addition, as the liner 34 is stacked or coiled within the liner storage means 76, cooling means, in the present embodiment, pieces or chunks of ice or dry ice 90 are inserted between the liner layers as well as on the sides, top and bottom of the stacked liner 34. The base member 78 and the sidewall members 82 include a plurality of perforations or holes (shown in phantom) to permit water run off as the ice 90 melts during transport and storage of the liner 34.

By constructing the liner storage means 76 in this manner and by utilizing the ice 90, the thermosetting resin can be installed within the liner 34 at a centralized facility (not shown) and the liner 34 can be thereafter transported a substantial distance to the remote job site without any substantial curing of the resin during transport. By utilizing a centralized facility for the preparation of the liner, the same equipment can be employed to impregnate and otherwise prepare liners concurrently for different jobs at widely separated job sites.

As previously indicated, the liner 34 is inserted or inverted within the sewer pipe 32 utilizing a pressure process which will hereinafter be described in greater detail. In order to preclude the pressure from pushing the liner 34 into the sewer pipe 32 in an uncontrolled manner or at an excessive rate of speed and to avoid other problems associated with the use of pressure when installing such a liner 34, the present invention includes both primary and secondary liner feed control means shown generally as 92 and 94, respectively, for continuously controlling the liner feed rate or the rate at which the liner 34 moves through or is inverted into the sewer pipe 32.

In the present embodiment, as best seen in FIGS. 1 and 4, the secondary liner feed control means 94 is comprised of a flexible cable 96 one end of which is secured to the trailing end of the liner 34 in a manner which will hereinafter be described in greater detail. In the present embodiment, the cable 96 is preferably comprised of a synthetic rope which may have an outer coating of a plastic material.

For purposes which will hereinafter become apparent, the cable or rope 96 is of a length equal to the overall length of the liner 34 plus an additional length, for example approximately 75 feet. The other end of the rope 96 is attached or connected to an attachment means, preferably an eyelet 102 which in turn is secured to a cable reel means, in the present embodiment a first cylindrical spool 104 upon which the cable may be wound (not shown). The spool 104 is affixed or secured for example by a spline (not shown) to a generally cylindrical elongated spool support shaft 106 for rotation therewith.

The spool support shaft 106 is supported for rotation proximate the forward end of the pressure vessel 36. As best seen in FIG. 4, an elongated support member 108 extends vertically downwardly from the top of the pressure vessel 36. The support member 108 may be secured to the inner surface of the top of the pressure vessel 36 by any suitable means, preferably by welding. Secured to the lower end of the support member 108 is an annular bushing 110 which surrounds and supports one end of the spool supporting shaft 106. The one end of the spool supporting shaft 106 includes a radially outwardly extending annular flange portion 112 having a diameter greater than the diameter of the bushing opening so that the shaft 106 is captured by the bushing 110 and is thereby precluded from axial movement, at least towards the right when viewing FIG. 4.

The other end of the spool supporting shaft 106 extends through a generally circular opening 114 in the pressure vessel wall. A generally annular tubular member and flanged member 116 is sealingly secured to the pressure vessel wall, for example by welding, and surrounds the opening 114 and the outwardly extending spool supporting shaft 106. A similar annular flange member 118 containing a packing gland 120 which surrounds and sealingly engages the spool supporting shaft 106 is secured to the pressure vessel tubular member and flanged member 116 utilizing suitable attaching means, for example nuts and bolts shown collectively as 122. An annular sealing gasket (not shown) is positioned between the two members 116 and 118 to provide for a tightly sealed joint to maintain the pressure within the pressure vessel 36. The two members 116 and 118 cooperate with the packing gland 120 to support the other end of shaft 106 while permitting the shaft to rotate relative to the pressure vessel 36. The packing gland 120 permits the shaft 106 to turn and yet provides sufficient sealing to maintain the pressure within the pressure vessel 36. When the liner 34 is stacked within the pressure vessel 36 the rope 96 is wound upon the first spool 104 (not shown).

Cable reel control means are provided to facilitate the turning of the shaft 106 in order to control the rate at which the cable 96 is wound on and unwound from the cable reel or first spool 104 thereby controlling the tension of the cable 96. In the present embodiment, the reel control means comprises an annular control wheel 124 secured outside of the pressure vessel 36 to the other end of the shaft 106 for manual rotation of the shaft 106. However, it will be appreciated by those skilled in the art that any other suitable type of reel control means, for example, a hydraulically actuated motor could alternatively be employed.

Referring to FIG. 4, a second parallel reel means arrangement is provided on the left side of the pressure vessel 36. The second reel means includes a second generally cylindrical spool 126 supported by a second elongated shaft 128. The second spool 126 and second shaft 128 are generally parallel to the first spool 104 and shaft 106. The second shaft 128 is similarly supported on one end by a second bushing 130 installed within the left side of the support member 108. An annular flange 132 is provided on the one end of the second shaft 128 to maintain the shaft within the bushing 130. The other end of the second shaft 128 extends through a generally circular opening 134 within the pressure vessel wall and is supported by members 136 and 138. A packing gland 140 substantially the same as the previously described packing gland 120 is employed to permit the rotation of the second shaft 108 while maintaining the pressure level within the pressure vessel 36. A second reel control means, in the present embodiment a second annular control wheel 142, is secured to the other outwardly extending end of the second shaft 128 to facilitate rotation of the shaft 128.

A flexible conduit means, in the present embodiment a generally flat hose 146 is provided for purposes which will be hereinafter described. The walls of the hose 146 are pierced to provide a plurality of small spaced holes (not shown) to allow hot water which is pumped through the hose to pass through the holes during the resin curing operation as described below. The hose 146 is of a length which generally corresponds to the lengths of the liner 34 plus an additional length, for example 75 feet. One end of the hose 146 is secured to the trailing end of the liner 34 (not shown). The other end of the hose 146 is secured to attachment means, in the present embodiment an eyelet 144 on the second spool 126. When the liner 34 is stacked within the pressure vessel 36 the hose 146 is wound upon the second spool 126 (not shown).

As previously indicated, the liner 34 is installed within the sewer pipe 32 by securing the leading end of the liner to a fixed structure adjacent to one end or within the sewer pipe and by inverting the liner or turning the liner inside out along the length of the sewer pipe as shown in FIG. 1. Thus, the trailing end of the liner 34 to which the cable 96 and the hose 146 are secured is actually the last part of the liner to be inserted within the sewer pipe 32 and is finally positioned at the distal (leftmost) end of the sewer pipe (not shown). Once the liner 34 reaches the halfway point in the insertion process, all of the liner 34 is located within the sewer pipe 32 (half inverted and half not inverted but located within the inverted half). The pressure applied to the liner 4 tends to continue the inversion process. By controlling the feed rate at which the trailing end of the liner 34 is permitted to proceed along the sewer pipe 32, the rate of inversion of the liner 34 can be controlled without specifically controlling the pressure within the sewer pipe 32. The rate at which the cable 96 is unwound from the first spool 104 is employed to control the rate of movement of the trailing end of the liner 34 through the sewer pipe 32 to insure that the liner is properly placed within the sewer pipe and that the inversion pressure does not result in an improper placement or run away situation. As more of the liner enters the pipe being lined, the liner tends to invert more and more quickly, absent the control means of the present invention.

Figure 2:
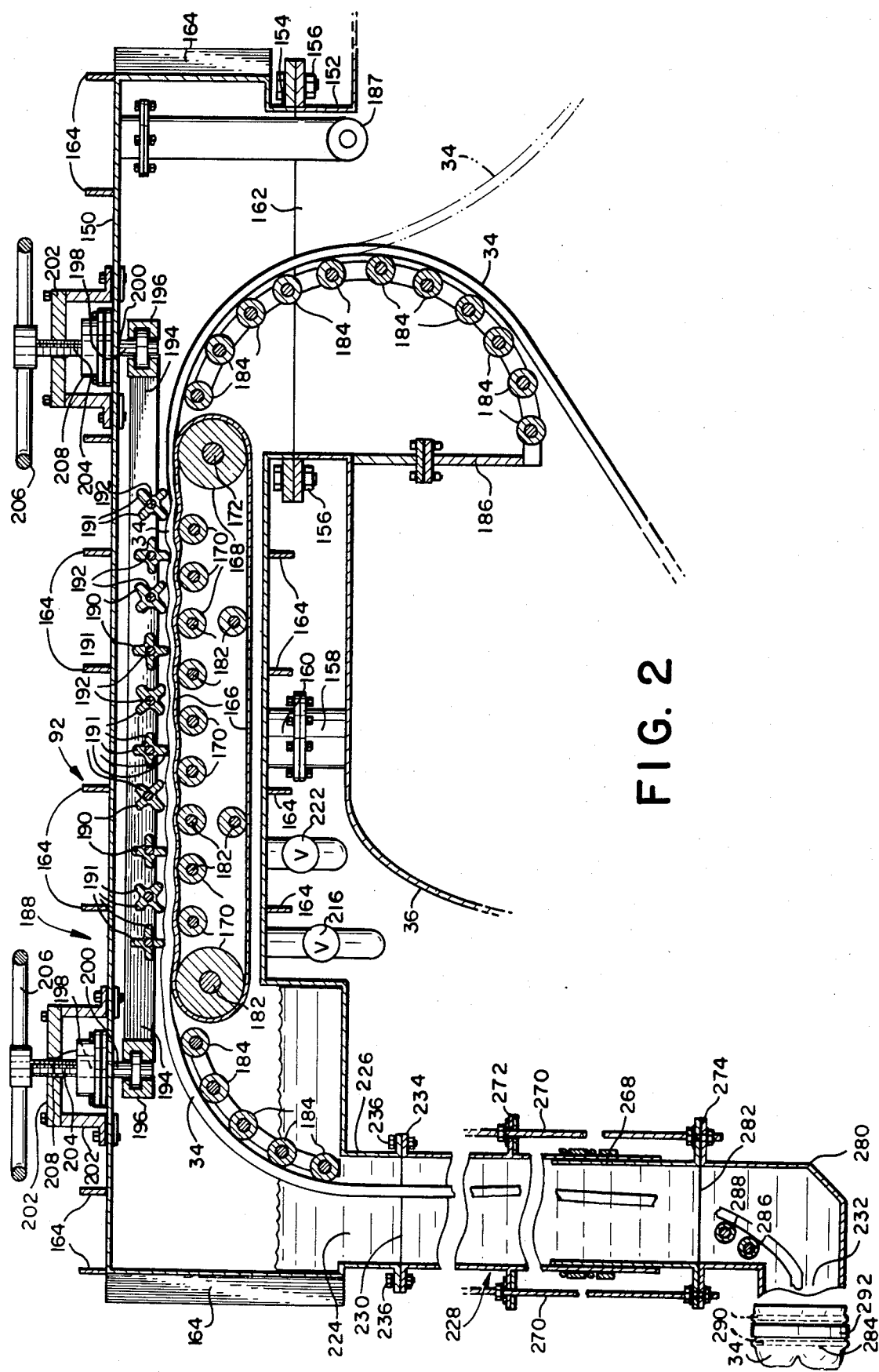
FIG. 2 is an enlarged sectional view of a portion of the apparatus shown in FIG. 1.
Figure 3:
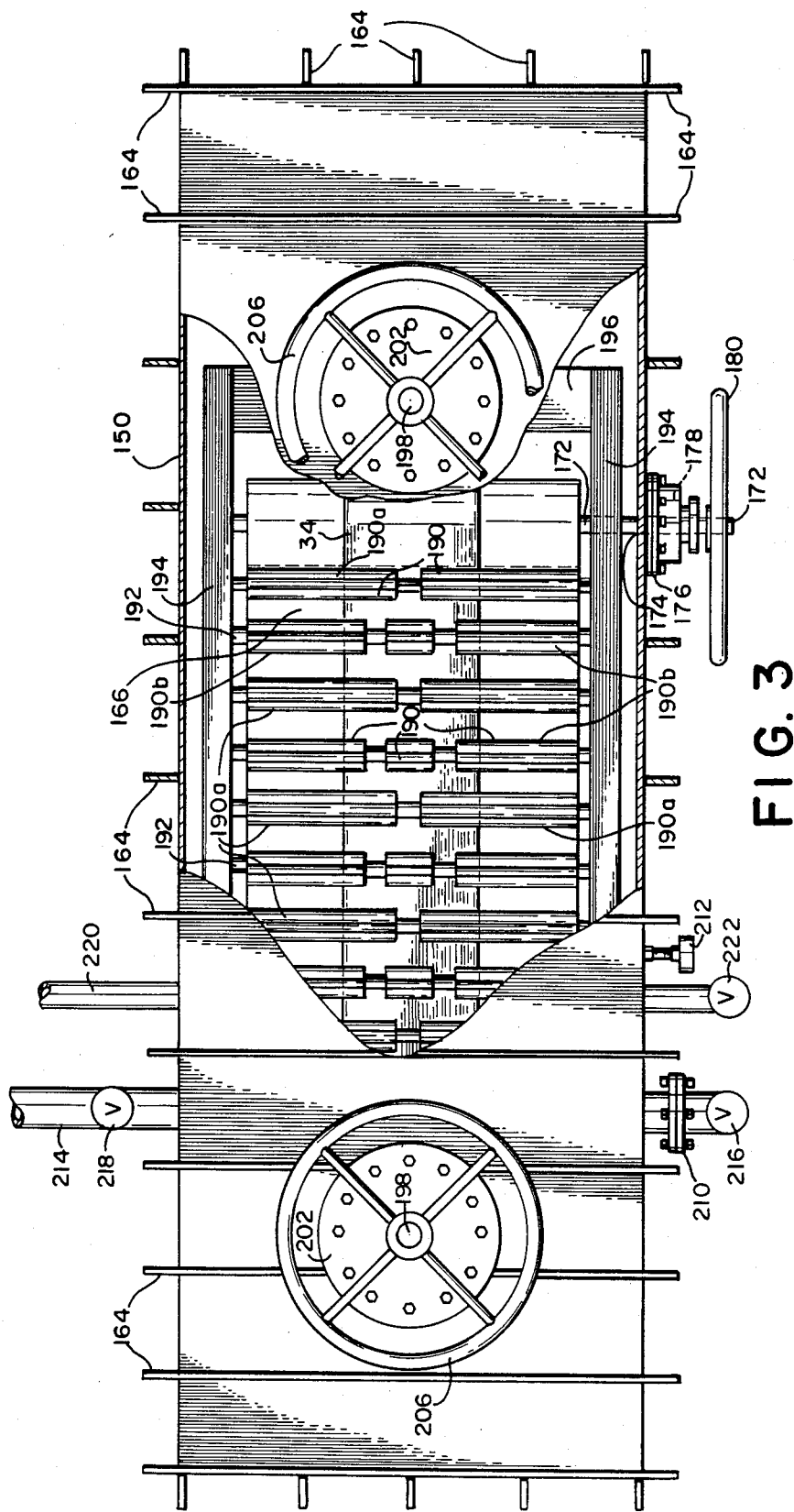
FIG. 3 is an enlarged plan view, partially in section, of the apparatus of FIG. 1.

Referring to FIGS. 1, 2 and 3, there is shown in greater detail the first or primary feed control means 92 which is utilized for initially controlling the feed rate of insertion of the liner 34 into the sewer pipe 32 before the liner reaches the halfway point. In the present embodiment, the first feed control means 92 is generally located within a housing 150 which forms a part of the pressurized region but is outside of the pressure vessel 36. It will be appreciated that the primary feed control means 92 could alternatively be contained within the pressure vessel 36. The housing 150 in the present embodiment is elongated and is generally rectangular in cross-section. As shown, the housing 150 is generally horizontally oriented, positioned above the rearward portion of the pressure vessel 36 and extends slightly rearwardly beyond the end thereof.

The primary support for the housing 150 is provided by a first upwardly extending tubular and flanged member 152 which is secured to the upper portion of the pressure chamber 36, preferably by welding. A corresponding downwardly extending flange member 154 of the housing 150 is secured to the upwardly extending pressure vessel flanged member 152 by suitable means, for example nuts and bolts shown collectively as 156. As with the previously described attachment flanges, a suitable gasket (not shown) is installed between the two members 152 and 154 to provide a tight seal. An opening 162 extends through the top of the pressure vessel 36 and the bottom of the housing 150 within the members 152 and 154 to provide fluid communication between the pressure vessel 36 and the interior of the housing 150.

Similarly, a second upwardly extending elongated flanged member 158 is provided near the upper rear end of the pressure vessel 36 which is similarly attached to a corresponding downwardly extending elongated flanged member 160 on the housing 150 to provide a secondary support for the housing 150. In the present embodiment, the housing 150 is approximately ten feet long, four feet wide and three feet high and may be made of steel or any other suitable material capable of withstanding internal pressures of up to twenty-five pounds per square inch. A plurality of strengthening ribs 164 surround the outside of the housing 150 to provide added strength and support.

As best seen in FIGS. 2 and 3, a conveyor means, in the present embodiment a conveyor having a slack conveyor belt 166, is positioned within the housing 150. The conveyor belt 166 is of the endless belt type and is supported by a conveyor drive roller 168 and a plurality of spaced idler rollers 170. The drive roller 168 is fixed or secured to a drive roller shaft 172 for rotation therewith. The drive roller shaft 172 is supported on one end by a support block on the housing 150, the other end of the drive roller shaft 172 extending through a suitably sized opening 174 in the housing 150. An annular flange member 176 surrounding the outwardly extending portion of the drive roller shaft 172 is sealingly secured to the side of the housing 150 as shown. The annular flange 176 includes a suitable packing gland 178 to maintain the pressure within the housing 150. A drive roller control means, in the present embodiment an annular control wheel 180, is secured to the outwardly extending end of the drive roller shaft 172.

The idler rollers 170 are supported for rotation upon an equal plurality of supporting shafts, shown collectively as 182 which in turn are supported on both ends by the housing 150. In this manner, the conveyor belt 166 travels continuously around the drive roller 168 and the idler rollers 170 at a rate or speed which may be determined or controlled by the rotation of the drive roller 168 as turned by the control wheel 180.

The liner 34 is conveyed from its stacked condition in the storage means 76 (see FIGS. 1 and 4) along the conveyor belt 166 and thereafter is moved downwardly into the sewer pipe 32 as hereinafter described. A plurality of rotatable guide rollers 184 are provided at each end of the conveyor belt 176 to facilitate movement of the liner 34 onto and off of the conveyor belt 166 and, to guide the liner 34 around the corners of the housing 150. The guide rollers 184 are supported by suitable supporting means such as downwardly extending flange member 186. A forward guide roller 187 is provided to guide the liner 34 around the forward corner of the opening 162.

Positioned above in juxtaposed aligned spaced relationship to the conveyor belt 166 is an idler nip roller assembly shown generally as 188. The idler nip roller assembly 188 includes a plurality of nip rollers 190 rotatably supported upon an equal plurality of nip roller shafts 192. The nip roller shafts 192 in turn are supported on each end by a pair of generally parallel elongated support members 194.

The height of the elongated nip roller shaft support members 194 is adjustable with respect to the conveyor belt 166 in order to vary the compressive force applied to the liner 34 by the nip rollers 190. In the presently preferred embodiment, the forward and rearward ends of the support members 194 are secured to generally perpendicularly extending adjustment bars 196. Each of the adjustment bars 196 in turn is secured to one end of a generally cylindrical vertically extending adjustment shaft 198. The adjustment shaft extends outwardly through a suitable opening 200 in the housing 150. An annular flange member 202 which is secured to the housing 150 surrounds and supports the adjustment shaft 198. The upper end of the adjustment shaft 198 includes a threaded portion 204 which cooperates with the annular flange 202 for downward movement of the shaft 198 and adjustment bars 196 upon rotation of the shaft 198. An actuator means, in the presently preferred embodiment an annular control wheel 206, is secured to the outwardly extending end of the adjusting shaft 198 to facilitate rotation thereof. A suitable packing gland 208 is provided to seal the housing 150 at the point where the adjusting shaft 198 emerges. The control wheels 206 can be turned to adjust the height of the adjusting bars 196 and the elongated support members 194 to vary the height of the nip roller shafts 192 and, thus, the nip rollers 190.

As best seen in FIG. 2, the nip rollers 190 are generally fluted and include four outwardly extending ribs 191. The fluted ribs on alternating nip rollers 190 are generally staggered in orientation as shown. In addition, the nip rollers 190 are superposed with respect to the spaces between the conveyor idler rollers 170 as shown. As also shown in FIG. 3, the nip rollers 190 are segmented as they extend from side to side across the housing 150. Alternating ones of the nip rollers 190 include two equal length segments with a central space therebetween as shown generally by 190a. The other alternating nip rollers 190 include three segments shown as 190b which are spaced so that one of the segments overlaps the spaced portion of 190a and the spaced portions of 190b are overlapped by the nip roller segments of 190a. The purpose in providing such alternating segmented nip rollers 190 which are also superposed between the idler rollers 170 is to insure that the compressive force provided by the nip rollers 190 in cooperation with the conveyor belt 166 does not significantly redistribute the resin (which has been previously uniformly impregnated into the liner 34) as the liner is moved along by the conveyor belt 166. Thus, by adjusting the height of the nip roller assembly 188 with respect to the conveyor belt 166, the speed or rate of movement of the liner can be positively controlled while maintaining the generally uniform distribution of the resin throughout the liner 34.

An observation port 210 is provided on the side of the housing 150 as shown. The observation port 210 is substantially structurally the same as the previously described observation ports 56. A pressure indicating means, in the present embodiment a pressure gauge 212, is located on the housing 150 slightly forward (toward the right when viewing FIG. 1) of the observation port 210. The pressure gauge 212 provides a visual indication of the pressure within the housing 150.

The apparatus 30 functions to insert the liner 34 within the sewer pipe 32 utilizing fluid pressure, in the present embodiment, a combination of water pressure and air pressure. Water from a water source (not shown) is conveyed to the housing 150 by a water conduit or pipe 214. A suitable water control valve 216 is provided to permit control of the flow of water into the housing 150. The water pipe 214 further includes a check valve 218 to prevent water from flowing out of the housing 150 when the housing is pressurized.

Similarly, compressed air from a compressed air source (not shown) is conveyed to the housing 150 by a similar air conduit or compressed air pipe 220. The compressed air pipe 220 also includes a flow control valve 222 to permit regulation of the flow of compressed air into the housing 150.

The lower rear end of the housing 150 includes an outlet opening 224 extending therethrough. An annular flange member 226 surrounds the opening 224 and is sealingly secured to the underside of the housing 150 as shown by any suitable means, preferably by welding.

A generally vertically extending insertion conduit shown generally as 228 is provided with an entry end 230 and an exit end 232. The insertion conduit entry end 230 includes an annular flange member 234 for attachment to the annular flange member 226 surrounding the housing outlet opening 224. An annular gasket (not shown) is installed between the two annular flanges 226 and 234 and the flanges are secured together by a plurality of nuts and bolts shown collectively as 236.

The insertion conduit 228, which also forms a part of the pressurized region, comprises a plurality of conduit or pipe sections which are sealingly connected together end to end and extend downwardly from the housing outlet opening 224 to the sewer pipe 32. Access to the sewer pipe is afforded by a manhole 33 as shown. The various pipe sections of the insertion conduit 228 are preferably made of steel or some other strong material. The pipe sections are connected together end to end as shown utilizing annular flange connections of the type previously described. Further details concerning each of the annular flange connections are not necessary for a complete understanding of the present invention and, therefore, will not be presented.

Figure 5:
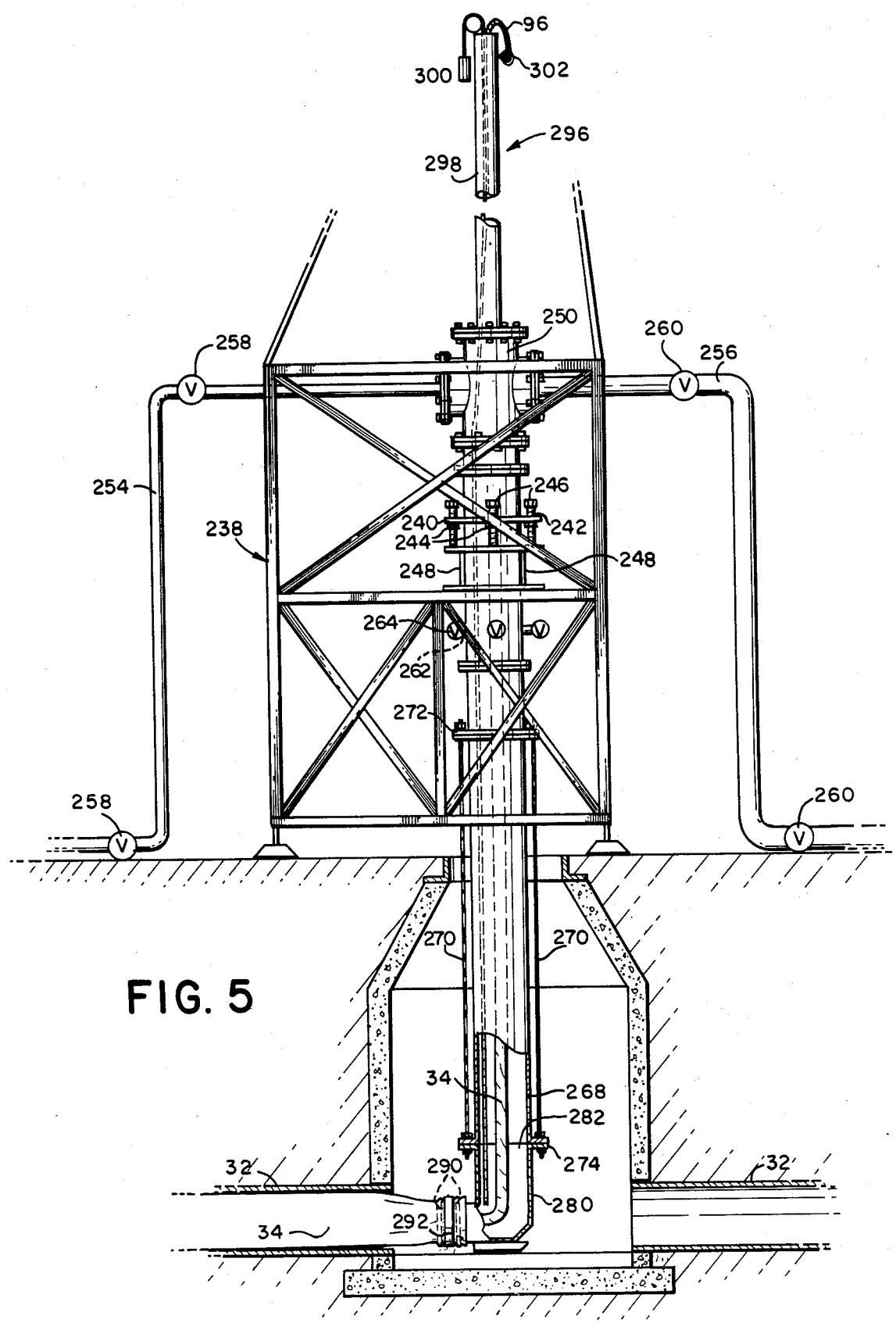
FIG. 5 is an enlarged elevation view of a portion of the apparatus shown in FIG. 1 at a different stage of the installation process from that shown in FIG. 1.

The insertion conduit 228 is supported in a generally vertical or upright orientation primarily by a scaffold assembly shown generally as 238. The scaffold assembly 238 generally straddles the surface opening of the manhole 33 and is erected in the usual known manner utilizing various scaffold sections to achieve the desired height. One section of the insertion conduit 228 includes an annular, radially outwardly extending flange member 240 which is secured thereto by suitable means, preferably welding. As best seen in FIG. 5, the outwardly extending flange member 240 includes a plurality of openings 242 extending generally vertically therethrough and an equal plurality of threaded adjustment nuts 244 one of which is welded to the underside of the flange and aligned with each of the openings 242. A corresponding plurality of elongated adjustment bolts 246 are threaded into the adjustment nuts 244. A pair of support beams 248 extend generally across the horizontal members of the scaffold assembly 238 from side to side, one support beam being on each side of the insertion conduit 228. In the present embodiment, the support beams 248 are generally C-shaped in cross-section and are made of steel. However, any other suitable type of support beam may be employed.

The downwardly extending ends of the adjustment bolts 246 engage the upper surface of the support beams 248 to provide the primary support for the insertion conduit 228. The adjustment bolts 246 may also be individually adjusted to both level and center the insertion conduit 228.

Another section of the insertion conduit 228, in the present embodiment located above the supporting flange 240 and slightly below the entry end 230, includes means for interconnecting additional conduits or piping which will hereinafter be described. In the present embodiment, the means comprises a pair of annular connection flange members 250 located on opposite sides of the insertion conduit 228. During the period of time when the liner 34 is being inserted or positioned within the sewer pipe 32, suitable circular cover plates 252 are sealingly secured to the connection flange members as shown in FIG. 1. Once the liner 34 is fully positioned within the sewer pipe 32, the cover plates 252 are removed and additional piping is attached to the connection flange members 252. As best seen in FIG. 5, the additional piping includes a first, hot water pipe 254 which is connected to one of the connection flange members 250 and a second, return or suction pipe 256 which is connected to the other connection flange member 250. The other end of the hot water pipe 254 is connected to a fluid heating source such as a boiler or other form of water heater (not shown). A pair of control valves 258 are positioned along the hot water pipe 254 for controlling the flow of hot water through the pipe 254. In the present embodiment, the control valves 258 are employed at different levels to provide added operational flexibility. The other end of the return or suction pipe 256 is connected to the intake side of a fluid circulating means such as a water pump or other source of suction (not shown), the output side of which is connected back to the boiler or other water heater (not shown) to provide a generally closed water circulation system. One or more control valves 260 are located along the return flow pipe 256 to permit regulation of the suction through the pipe.

Positioned slightly below the support flange member 240 suitable additional piping and valves 262 and 264 are secured to the insertion conduit 228. The piping 262 is employed for transporting additional water from a water source (not shown) for filling the insertion conduit 228 with water. The valves 264 are utilized to control the flow of the water passing through the pipes 262.

As best seen in FIG. 1, a generally vertically oriented elongated sight tube 266 extends generally parallel to the insertion conduit 228. A first or lower end of the sight tube 266 is connected to the insertion conduit 228 near the entrance to the manhole and the second or upper end of the sight tube 266 is connected to the housing 150 as shown. The sight tube 266 is made of a clear material, such as synthetic polymeric clear plastic and permits the operator to constantly monitor the water level within the insertion conduit 228. The portion of the insertion conduit 228 which is above ground is generally made of steel or any other high strength material capable of safely withstanding pressures of at least about 25 pounds per square inch.

The portion of the insertion conduit 228 which is located within the manhole 33 is comprised of an elongated generally vertically extending flexible conduit or pipe 268. The flexible conduit or pipe 268 is selected by length to extend into the manhole 33 to a point slightly above the top of the sewer pipe 32. A plurality of flexible support cables 270, preferably made of steel, extend downwardly from a supporting upper flange member 272 secured to the steel portion of the insertion conduit 228 to a similar lower flange member 274 extending around the lower end of the flexible conduit 268. The ends of the cables 270 are suitably secured to the annular flange members 272 and 274 as shown in FIG. 2 to provide at least partial support for the flexible conduit 268 and yet to permit the flexible conduit 268 to move laterally within the manhole and to be pulled out of the manhole 33 as required. The length of the flexible conduit 268 and the length of the supporting cables 270 may be adjusted depending upon the depth of the manhole and other operational factors.

As best seen in FIGS. 1, 2 and 5, attached to the insertion conduit exit end 232 which, in the present embodiment, is the lower end of the flexible conduit 268, is a diverter conduit or inversion elbow assembly shown generally as 280. The diverter conduit 280 comprises a duct which has an inlet or entry end 282 and an outlet or exit end 284. The diverter conduit 280 entry end 282 is secured to and communicates with the lower end of the flexible conduit 268 as shown. The diverter conduit exit end 284 forms the exit end of the insertion conduit 228. The diverter conduit is effective to divert the liner from the generally vertically extending manhole 33 into the generally horizontally extending sewer pipe 32. In diverting the liner 34, the diverter conduit 280 actually bends or diverts the liner through a plurality of angle changes the total of which is approximately 90 degrees.

The exit end 284 of the diverter conduit 280 is generally ellipsoid shaped in cross-section. The ellipsoid-shaped exit end 284 of the diverter conduit may be generally horizontally oriented as shown in FIG. 17 or may be generally vertically oriented as shown in FIG. 19.

Guide means, best seen in FIGS. 1, 17 and 18, located within the diverter conduit 280 are employed for engaging and guiding the liner 34 through the diversion angle which, in the present embodiment, is approximately 90 degrees. The 90 degree diversion angle is determined by the difference between the generally horizontally extending plane formed by the inlet 282 and the generally vertically extending plane formed by the outlet 284. In the present embodiment, the guide means preferably comprises first and second offset guide rollers 286 and 288 respectively supported on each end by bushings and pillow blocks (not shown) on opposite sides of the diverter conduit. The first guide roller 286 is rotatably secured in transverse disposition inside the diverter conduit 280 adjacent to the inner bend of the diversion angle as shown. The second guide roller 288 is rotatably secured inside the diverter conduit 280 slightly above the location of the first guide roller 286. As best shown in FIGS. 2 and 18, the second guide roller 288 is slightly offset from the first guide roller 286 and extends further toward the axial center of the diverter conduit 280 (towards the right when viewing FIG. 2). The offset position of the second guide roller 288 allows the liner 34 to be diverted in two separate changes of direction. The axes of rotation of the two guide roller 286 and 288 are generally parallel and extend into and out of the paper as shown in FIGS. 2 and 18. As shown in FIG. 17, the outer diameters of the guide rollers 286 and 288 vary from a first dimension at the axial ends to a second, smaller dimension along the axial central portion. By forming the guide rollers 286 and 288 in this manner, the movement of the liner 34 through the diversion is facilitated and the liner remains generally within the center of the diversion conduit 280.

Means are provided on the diverter conduit exit end 284 for sealingly clamping the leading end of the liner 34 to the exit end 284 and for creating a fluid tight seal between the liner 34 and the exit end of the insertion conduit 228. In the present embodiment, the means comprises a pair of spaced apart round rib members 290 extending generally outwardly around the diverter conduit 280 proximate the exit end 284. The leading edge of the liner 34 first passes out of the diverter conduit exit end 284 and is turned inside out to form a cuff which is pulled back over the diverter conduit exit end to a point beyond the spaced rib members 290 (toward the right). Thereafter, a suitable clamping means such as an annular clamp 292 is secured around the liner 34 between the spaced rib members 290 to secure the liner 34 to the inverter conduit exit end 284 as shown.

One end of a pressure conduit 294 is connected to the diverter conduit 280 adjacent the inner bend and preferably laterally between the two guide rollers 296 and 288 (see FIGS. 1 and 18). The other end of the pressure conduit 294 is connected to a source of pressurized fluid such as air or water (not shown). A valve and pressure indicator 293 is provided to indicate and control the pressure of the fluid flowing through the conduit 294. In this manner, pressurized fluid may be inserted into the diverter conduit 280 proximate the guide rollers 286 and 288 to "bubble" the area for lubrication and to assist in the bending of the liner 34.

The foregoing constitutes a description of the structure of the first embodiment of the present invention. In order to provide a better understanding of the interrelationship between the various components of the structure and the actual installation of a liner within a sewer pipe, a brief description of the operation of the apparatus will now be presented.

Prior to the installation of a liner 34, the sewer pipe 32 is thoroughly cleaned and inspected preferably utilizing a TV inspection system (not shown). The precise diameter of the sewer pipe is determined and the length of the sewer pipe to be lined is accurately measured. Based upon the diameter of the pipe to be lined, an appropriately sized liner is selected and the liner is trimmed to a length slightly greater than the length of the sewer pipe to be lined. The liner is then impregnated with the resin suitable for the particular environment utilizing an appropriate impregnation process, such as that described in one of the above-identified U.S. patents. As previously indicated, the liner preparation is conducted at a central facility (not shown) under controlled conditions. The resin impregnated liner is lubricated, cooled and stacked at the central facility.

Once the liner is fully prepared, the flatbed trailer 38 containing the pressure vessel 36 is brought into the central facility. The cover members 52 are removed from the access ports 44 and 46 and the pressure vessel 36 is ventilated and/or refrigerated in order to lower its interior temperature. A first end of the flexible cable 96 is secured to the attachment means 102 on the first spool 104. As previously discussed, the flexible cable has a length which is equal to the precut length of the liner 34 plus an additional 75 feet. The control wheel 124 is turned to wind the rope upon the first spool 104.

Similarly, the first end of the flat hose 146 is secured to the attachment means 144 on the second spool 126. The hose 146 is substantially the same length as the flexible cable 96. The hose 146 is similarly wound upon the second spool 126.

Ice chunks 90 are placed on the storage means base member 78 and the resin impregnated liner 34 is moved into the pressure vessel and is stacked within the liner storage means 76 in the manner as shown in FIG. 1. Additional chunks of ice 90 are placed between the various stacked layers of the liner 34 and along the sides of the stacked liner 34 as previously discussed. The second end of both the flexible cable 96 and the hose 146 are secured to the trailing end of the flexible liner 34 in a manner which will hereinafter be described in greater detail.

Once the liner is properly stacked within the pressure vessel 36 and the cable 96 and hose 146 are wound upon the respective spools 104 and 126, the cover members 52 are sealingly secured over the access ports 44 and 46. Drain valves 74 are opened to permit water from the melting ice 90 to drain out of the bottom of the pressure vessel 36. The flatbed trailer 38 is hitched to a suitable propelling means, such as a tractor (not shown) and is transported to the remote job site where the liner 34 is to be installed.

Prior to the arrival of the flatbed trailer 38 at the job site the manhole 33 is ventilated and/or cooled and tested for safe gas condition. Sewage is diverted from the sewer pipe 32 and the sewer pipe 32 is cleaned for a final time. The scaffold assembly 238 is erected and leveled straddling the manhole 33 as shown. The insertion conduit 228 is assembled by connecting the flexible conduit 268 and the diverter conduit 280 to the remainder of the insertion conduit 228 as shown in FIG. 1. The support beams 248 are installed across the horizontal portions of the scaffold 238 and the diverter conduit 280 and flexible conduit 268 are installed within the manhole 33 as shown. One or more ropes or cables 295 may be utilized to facilitate the installation of the flexible conduit 268 and the diverter conduit 288 within the manhole 33. The remainder of the insertion conduit 228 is lifted upwardly and placed upon the support beams 248. The height and location of the diverter conduit 280 is adjusted by turning the adjustment bolts 246. The sight tube 266 is installed in place along side of the insertion conduit 228 and the pressure hose 294 is connected to the diverter conduit 280.

When the flatbed trailer 38 arrives at the job site it is positioned so that the annular flange 226 at the lower rear of housing 150 is aligned with and slightly above the corresponding flange 234 on the upper or entry end of the insertion conduit 228. The leveling and support jacks 42 are actuated to level and support the pressure vessel 36 and, more particularly, to level the conveyor belt 166. The annular flange 234 on the entry end of the insertion conduit 228 is secured to the annular flange 266 at the rear end of the housing 150. The upper end of the sight tube 266 is connected to the housing 150 as shown. The water pipe 214 and the air pipe 220 are connected between the pressure vessel 36 and the respective water and air sources (not shown).

Once all of the piping and other connections have been made as described above, the cover plates 52 are removed from the access ports 44 and the pressure vessel 36 is again ventilated. The idler roller assembly 188 is adjusted upwardly away from the conveyor belt 166 by turning the control wheels 206 in a counterclockwise direction. The leading edge of the liner 34 is lifted from the top of the liner stack and is fed along the guide rollers 184, the conveyor belt 166 and down the insertion conduit 228 to the diverter conduit 280. The diverter conduit is pulled out of the manhole by bending the flexible conduit 268 upwardly. One or more cables or ropes 295 may be secured to the lower end of the flexible conduit 268 to assist in lifting the flexible conduit out of the manhole 33. Thereafter, the leading edge of the liner 34 is pulled out of the diverter conduit exit end 284, and is turned inside out for the first six inches to form a cuff which is pulled back over the outside of the diverter conduit exit end 284. The turned back portion of the liner is secured to the diverter conduit 280 utilizing the clamping means 292. The diverter conduit is then lowered back into the manhole 33 utilizing the rope 295.

At this point, the liner 34 is ready for insertion into the sewer pipe 32. The cover members 52 are placed back over the access ports 44 and 46 and the drain valves 74 are closed. All other valves, except for the pressure release bypass valve, are closed so that the pressure vessel 36 is generally sealed. The operator then opens the water flow control valve 216 and places approximately two feet of water in the diverter conduit 280 to push the liner slightly outwardly. The alignment of the diverter conduit is checked to insure that the liner 34 is squarely in front of the sewer pipe 32. The water control valve 216 is again opened to permit water to flow into the insertion conduit 228 until the water level reaches approximately the bottom of the housing 150 as shown in FIG. 1. The level of the water can be ascertained by referring to the sight tube 166.

At this point, the idler nip roller assembly 188 is lowered utilizing the control wheels 206 so that the idler nip rollers 190 engage the liner in the manner as shown in FIG. 2. As previously discussed, the idler nip rollers are positioned between the conveyor belt idler rollers 170 so that, although the liner 34 is firmly held in place, the pressure of the idler nip rollers 190 does not significantly redistribute the resin which has been uniformly impregnated within the liner 34 along its entire length.

The air flow control valve 222 is opened to allow a pressure regulated flow of compressed air to enter the pressure vessel 36 and housing 150 until the interior pressure reaches approximately seven pounds per square inch. The air pressure within the pressure vessel 36 acts upon the column of water within the insertion conduit 228 to push downwardly against the cuffed leading edge of the liner 34, thereby causing the liner to invert and move the turned back portion toward the left along the sewer pipe 32. Pressurized fluid flows through the pressure conduit 294 to lubricate and facilitate the bending of the liner through the diversion angle. The inversion and movement of the liner 34 along the sewer pipe 32 causes liner stacked within the storage means 76 to be pulled upwardly, along the conveyor belt 166 and down the insertion conduit 228. The movement of the liner along the conveyor belt results in a corresponding movement of the conveyor belt control wheel 180.

The movement of the liner 34 through the apparatus may be viewed by the operator through any of the various observation ports 56. Additional lighting (not shown) may be provided as required. The operator can fine tune the water flow control valve 216 and the air flow control valve 220 to maintain sufficient pressure within the pressure vessel 36 to move the liner 34 along the sewer pipe at a desired rate. The operator is able to further control the rate of movement and inversion of the liner utilizing the conveyor belt control wheel 180, primarily for the purpose of slowing down the movement of the liner 34 along the conveyor belt 166.

After most of the liner 34 has been inverted and positioned within the sewer pipe 32 so that the trailing edge of the liner 34 has reached the forward guide rollers 184, control of the inversion and continued insertion of the liner into the sewer pipe 32 is transferred to the secondary control means 94. At this point, slightly less than half of the liner 34 has been inverted within the sewer pipe 32. The transfer to the secondary control means 94 is accomplished by rotating the idler nip roller control wheels 206 to raise the idler nip roller assembly 188 away from the conveyor belt 164 to provide clearance for the flexible cable 96 and the hose 146. The water and air pressure acting to invert and move the liner 34 along the sewer pipe is maintained as before. As the liner continues to invert and move along the sewer pipe 32, the flexible cable 96 is played out off of the first spool 104 as controlled by the control wheel 124 to control the rate of liner movement. The hose 146 is also played out off of the second spool 126.

The inversion and movement of the liner 34 along the sewer pipe continues until the inversion end reaches and abuts against a stop means (not shown) which has been placed inside of the sewer pipe at the end of the section of pipe to be lined. Preferably, the location of the stop means corresponds with a second manhole (not shown). Since the length of the liner 34 has been predetermined to correspond to the desired length of the sewer pipe to be lined, substantially all of the liner is now inverted within the sewer pipe 32 with the trailing end of the liner being located near the stop means and preferably about five feet from the stop means (not shown). Thus, the flexible cabe 96 and the lay flat hose 146 extend within the liner 34 along its entire length, through the insertion conduit 228 and back to the first and second spools 104 and 126 respectively. The air pressure within the pressure vessel 36 is gradually released by slowly opening the drain valves 74 to permit the escape of air until the interior of the pressure vessel 36 is at atmospheric pressure. The water level within the insertion conduit 228 is lowered to slightly below the annular connecting flange members 250. At this point in the operation, the water level is still high enough above the sewer pipe 32 so that the static water pressure created is sufficient to force the tubular liner 34 radially outwardly against the existing walls of the sewer pipe 32.

The cover plates 252 are now removed from the annular connecting flange members 250 to provide access to the flexible cable 96 and the hose 146. The flexible cable 96 is secured to a suitable eyelet (not shown) proximate the annular flange 250 on the left side of the insertion conduit 228. The cover plates 52 are removed from the pressure vessel access ports 44 and 46 and the interior of the pressure vessel 36 is ventilated. The operator enters the pressure vessel and removes the remaining flexible cable 96 and hose 146 from the first and second spools 104 and 126 respectively. The remaining flexible cable 96 and hose 146 are then pulled out of the annular connecting flange members 250.

At this point, the mobile part of the apparatus is no longer needed for the remainder of the liner installation and, therefore, is disconnected and removed. Disconnecting the mobile portion is accomplished by removing the nuts and bolts 236 from annular flanges 226 and 234 to separate the insertion conduit 228 from the housing 150. The insertion conduit 228 is lowered slightly by turning the adjustment bolts 246. The sight tube 266 is removed as are the water and air pipes 214 and 220, respectively. The leveling and support jacks 42 are raised and the flatbed trailer 38 is transported back to the central facility (not shown) to receive another liner.

Once the flatbed trailer 38 has been removed, the remaining apparatus is substantially as shown in FIG. 5. The return or suction pipe 256 is connected to the right side annular flange member 250 as shown and the hot water pipe 254 is connected through the left hand annular flange 250 to the hose 146 which has been cut off for attachment.

Means for providing additional static pressure within the liner, in the present embodiment a snorkel assembly 296 is secured to the top or entry end of the insertion conduit 228 as shown in FIG. 5. The snorkel assembly comprises an upwardly extending conduit 298 which is generally open at the upper end. The length of the snorkel conduit may vary depending upon the particular operation. The upper end of the snorkel conduit 298 includes a float controlled water level assembly 300 which is employed to indicate the top of the water level that exists within the snorkel conduit 298. The snorkel further includes a suitable attachment means such as an eyelet 302 to which the excess portion of the flexible cable 96 is secured.

Valves 264 are opened to permit additional water to flow into the insertion conduit and the attached snorkel conduit 298. The addition height of the snorkel conduit 298 provides extra water pressure sufficient to firmly push the flexible liner 34 radially outwardly against the sewer pipe 32. Where the sewer pipe 32 has a service pipe entrance or lateral entrance (not shown) the extra pressure upon the liner causes a dimple or depression (not shown) in the portion of the liner extending across the service pipe entrance. The dimple aids in the location of the service pipe entrance to allow the cutting and removal of the blocking portion of the liner to reinstate the service entrance.

Hot water from the boiler or other heater source (not shown) is pumped through the hot water pipe 254 into the hose 146 which extends along the length of the liner 34. The hose includes a plurality of small openings along its entire length which permits the hot water to flow out of the hose and into the interior of the liner 34. Water is correspondingly drawn through the return pipe 256 and is returned to the boiler or other heater source (not shown) for reheating and recirculation. Through this circulation process, the water temperature within the liner 34 is slowly raised to approximately 170 degrees F. and is maintained at that temperature for the curing time of the liner resin. In the presently preferred embodiment, curing time is approximately three hours.

Once the curing period is over and the liner is sufficiently hardened, the heater source (not shown) is turned off and the water continues to circulate unheated to allow for a slow cooling of the cured liner 34. Once the liner 34 has cooled, the remaining water is removed and the ends of the liner are trimmed at the manholes. The insertion conduit 228, the scaffold assembly 238 and all of the remaining equipment are removed and taken to another location. Thereafter, the portions of the liner which cover over the service pipe entrances are cut away and removed and the restored sewer pipe 32 is ready to resume its normal operation.

Second Embodiment

Figure 6:
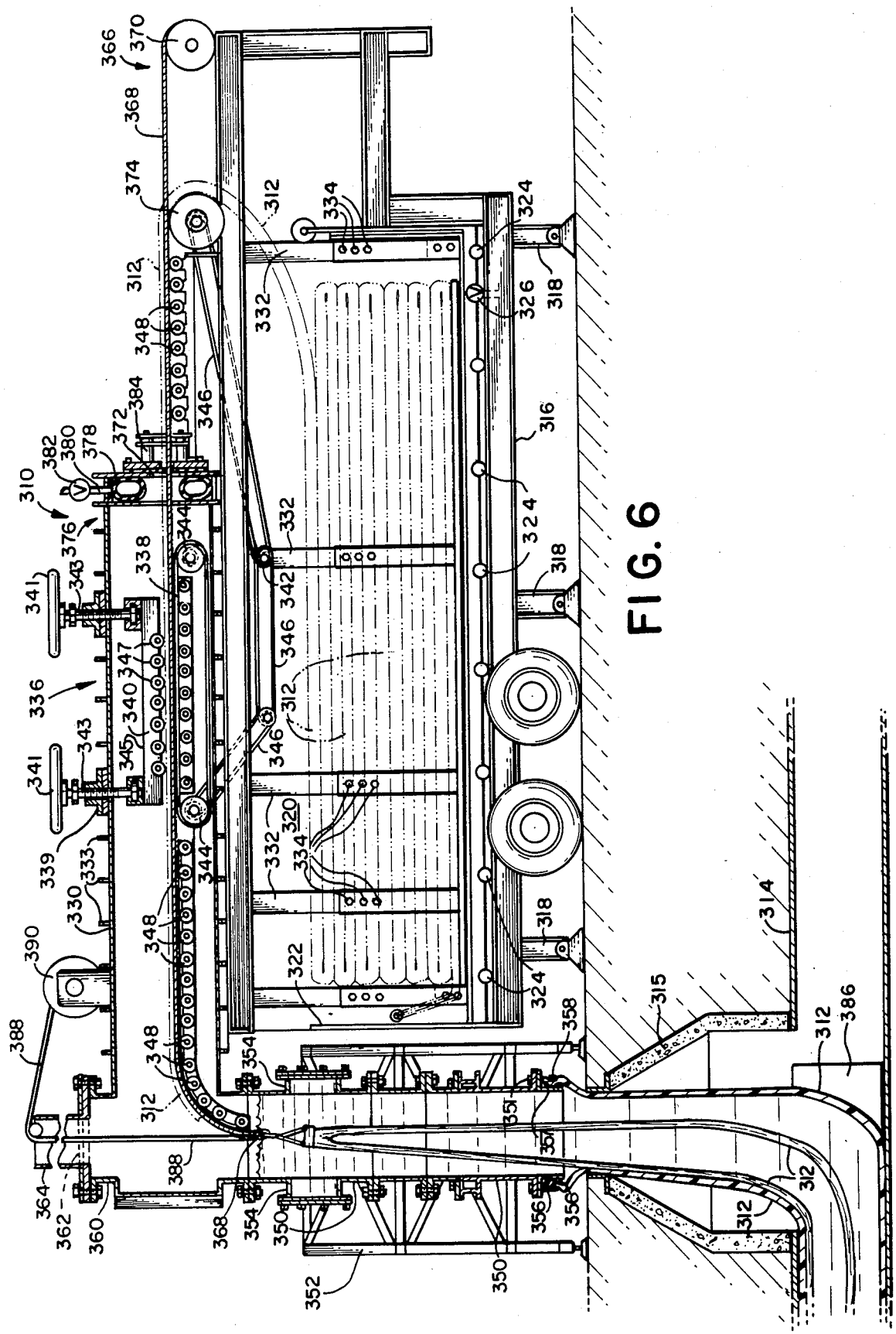
FIG. 6 is an elevation view, partially in section, of a second embodiment of an apparatus in accordance with the present invention employed for the installation of a liner within a conduit having a diameter of between about twelve and about thirty-six inches.

Referring now to FIG. 6, there is shown a second embodiment of an apparatus for installing a generally tubular liner within an elongated conduit in accordance with the present invention. The apparatus, shown generally as 310, is utilized for installing a larger diameter thermosetting liner 312 within a larger diameter conduit or pipe, such as an underground pipe 314, than with the first embodiment. In the present embodiment, the inner diameter of the underground pipe 314 and the outer diameter of the liner 312 are approximately equal and are in the range of between about 12 inches and about 36 inches. FIG. 6 shows the apparatus 310 at a point in time when approximately one-half of the liner 312 has been inserted into the pipe 314.

The apparatus 310 is structurally and functionally similar to the above-described apparatus 30 which is used for installing smaller liners 34 into smaller diameter conduits. For this reason, the following discussion will be oriented primarily towards the structural and operational differences between the two apparatus 30 and 310.

As with the apparatus 30 of the above-described embodiment, apparatus 310 includes a transport means for conveying the liner 312 from the centralized liner preparation facility (not shown) to a remote job site location where the liner 312 is to be installed within the pipe 314. In the presently preferred embodiment, the transport means comprises a heavy duty flatbed trailer 316 of a type well known in the art and generally commercially available. Of course, any other suitable type of transport means such as a large unit truck (not shown) could alternatively be employed.

The flat bed trailer 316 includes leveling and support means, in the present embodiment comprising a plurality of mechanically or hydraulically operated supporting jacks 318. However, unlike the above-described embodiment, trailer 316 does not support a cylindrical pressure vessel. Instead, the liner 213, which has been precut to the desired length (as described above) and has been previously uniformly impregnated with the thermosetting resin (as described above), is installed or stacked within a non-pressurized, open topped, generally rectangular liner storage housing 320. The housing 320, which may be made of steel or any other suitable material reinforced or braced by struts, ribs and/or beams (not shown), is secured to the bed of the trailer 316 and includes a rear panel member 322 which is removable or swings or pivots downwardly about a hinge (not shown) to provide convenient access to the housing 320 for the loading of the liner 312. The bottom or floor of the liner storage housing (which may also comprise the bed of the trailer 316) includes a plurality of roller members 324 to facilitate movement of the liner 312 into and out of the housing 320.

The side walls of the liner storage housing 320 are thermally insulated (not shown) and an insulated cover member made of a foam or other insulating material (not shown) may be placed over the top of the liner storage housing 320 during transport to provide further thermal insulation. As with the above-described embodiment, chunks of ice (not shown) are placed beneath the stacked liner 312 (shown in phantom) and between the stacked layers of the liner 312 in order to keep the liner cool during transport. The stacked layers of the liner may also be vertically separated utilizing separator members (not shown) to facilitate air flow and provide further cooling. Suitable drain valves, only one of which is shown as 326, are provided in the bottom of the liner storage housing 320 to permit the drainage of water which may accumulate from the melting of the ice. The side walls of the liner storage housing 320 are laterally adjustable to accomodate liners of different sizes within the above-described range.

The apparatus 310 further includes a sealable pressure vessel or pressure housing 330 which forms a part of a pressurized system or region. In the presently preferred embodiment, the pressure housing 330 is made of steel or any other material capable of withstanding internal pressure of up to twenty-five pounds per square inch and is elongated and generally rectangular in cross-section. Suitable reinforcing ribs 333 may be located around the housing 330 to provide additional strength and support. The pressure housing 330 is generally horizontally oriented and is supported above the trailer 316 by adjustable support means at a position above the liner storage housing 320. In the presently preferred embodiment, the adjustable support means comprises a plurality of generally vertically extending telescoping support columns 332. The lower end of each of the telescoping support columns 332 is secured to the trailer 316. The upper end of each of the telescoping support columns 332 is secured to the underside of the pressure housing 330. Suitable adjustment means, in the presently preferred embodiment a plurality of bolts 334 which extend through suitably sized openings in the telescoping support columns 332 are employed for permitting the height of the pressure housing 330 to be adjusted to provide water level of a desired height for insertion of the liner 312.

In general, the interior structure of the pressure housing 330 is substantially the same as that of housing 150 of the above-described embodiment. More specifically, the first or primary feed control means shown generally as 336 for initially controlling the feed rate of insertion of the liner 312 into the pipe 314 is contained within the pressure housing 330. As with the above-described embodiment, the primary feed control means 336 comprises a conveyor means 338 having a slack conveyor belt of the endless type and an idler nip roller assembly 340. Both the conveyor means 338 and the idler nip roller assembly 340 are substantially the same both structurally and operationally as the corresponding components described in detail above. However, unlike the previously described conveyor means 166, conveyor means 338 of the present embodiment includes a powered drive means for controlling the rotation of the conveyor belt as opposed to a hand control wheel. In the presently preferred embodiment, the drive means comprises a hydraulic motor 342 which is connected to the drive rollers 344 of the conveyor means 338 by suitable drive connection means, such as endless belts or chains 346 and associated drive pulleys or sprockets.

As with the above-described embodiment, the nip roller assembly 340 is juxtaposed in aligned spaced relationship with the slack conveyor belt and the individual nip rollers are positioned between the conveyor belt idler rollers. The nip roller assembly 340 is comprised of control wheels 341, threaded shafts 339, tapped sealing housings 343, frame 345 and idler rollers 347. The nip roller assembly 340 is movable with respect to the conveyor belt by turning control wheels 341 to move the frame 345 and idler rollers 347 for adjusting the compressive force of the individual nip rollers on the liner 312. In this manner, as described in detail above, the primary feed control means 336 functions to control the rate of insertion of the liner 312 into the pipe 314 without substantially redistributing the resin which has been uniformly impregnated within the liner 312. The conveyor means 338 also includes guide rollers 348 which are provided to assist in the movement of the liner 312.

The rearward end of the pressure housing 330 extends beyond the rear of the trailer 316. A generally vertically extending insertion conduit (shown generally as 350) is secured to and extends downwardly fromm the rearward end of the pressure housing 330. The housing 330 includes an outlet opening 331 to provide fluid communication between the housing 330 and the entry end of the insertion conduit 350 and to permit the movement of the liner 312 therethrough. The insertion conduit 350, which also forms a part of the pressurized region, comprises a plurality of conduit or pipe sections which are connected together end to end and extend downwardly as shown. The insertion conduit 350 and the various pipe sections thereof are substantially the same as the previously described insertion conduit 228 associated with the above-described embodiment. However, in the case of insertion conduit 350, the diameters of the various pipe section are greater than those of insertion conduit 228 in order to accommodate a larger size liner 312.

The insertion conduit 350 is supported in a generally vertical or upright orientation primarily by a scaffold assembly 352 in substantially the same manner as previously described with respect to insertion conduit 228. Similarly, insertion conduit 350 includes a pair of outwardly extending annular connection flange members 354 which, as shown in FIG. 6 are covered but which are adapted for the connection of a hot water pipe (not shown) and a suction or return pipe (not shown) during the liner curing process.

Unlike the previously described insertion conduit 228, the present insertion conduit 350 terminates in an exit end slightly above the entrance to the manhole 315. Means are provided on the exit end of the insertion conduit 350 for sealingly clamping the leading edge of the liner 312 to the exit end of the insertion conduit 350 and for creating a fluid tight seal between the liner 312 and the insertion conduit 350. In the present embodiment a flanged end tubular shaped inversion ring 357 is attached to the flanged exit end of insertion conduit 350 by means of bolts 351 and a gasket (not shown). A pair of spaced apart rib members 356 are provided on the outer surface of the end of the tubular shaped inversion ring 357. The leading edge of the liner 312 is pulled through the insertion conduit 350 and is turned inside out to form a cuff. The liner cuff (shown in section in FIG. 6) is then pulled back over the outside of the insertion conduit exit end to a point beyond the spaced rib members 356. Thereafter, a suitable clamping means such as an annular clamp or band 358 is secured around the liner 312 between the spaced rib members 356 to sealingly secure the liner 312 to the exist end of the insertion conduit 350 as shown.

The upper surface of the rearward end of the pressure housing 330 includes an upwardly extending flange member 360 which, during the time that the liner 312 is being inserted within the pipe 314, is sealingly closed by a suitable circular cover member shown in phantom as 362. Once the liner 312 is inserted within the pipe 314, the cover member 362 is removed and is replaced with a snorkel assembly 364 which is substantially similar to the snorkel assembly described above. The snorkel assembly 364 is provided to permit the water level in the insertion conduit to be raised for additional water pressure during liner curing.

The apparatus 310 further includes a secondary liner feed control means shown generally as 366. In the present embodiment, the secondary liner control means comprises a flexible cable or rope 368, one end of which is secured to the trailing end of the liner 312 in a manner which will hereinafter be described in greater detail. The other end of the cable 368 is secured to a cable reel means, in the present embodiment, a hydraulically actuated winch 370 which is secured to the forward end of the trailer 316. Once the liner 312 is approximately one-half way inserted into the pipe 314, control of the feed rate is transferred from the primary control means 336 to the secondary control means 336. Thereafter, the winch 370 winds or unwinds the cable 368 at a controlled rate to control the movement of the trailing end of the liner 312 along the pipe 314.

As shown in phantom in FIG. 6, the liner 312 is fed into the pressure housing 330 through an elongated inlet opening 372 on the forward end of the housing 330. Prior to entering the housing, the liner 312 passes over a plurality of guide rollers 348 and a forward drive roller 374. The forward drive roller 374 is also powered by the hydraulic motor 342 via a drive belt or chain 346.

Means are provided for closing and sealing the housing inlet opening 372. In the present embodiment, the sealing means comprises a bellows-type seal assembly 376 including an inflatable tube 378 which is connected through a suitable pipe 380 to a source of pressurized fluid, such as air. An air flow control valve 382 is provided to control the flow of pressurized air through the pipe 380 and into the inflatable tube 378. The inflatable tube 378 may be inflated by the pressurized air to seal off the housing inlet opening 372 to permit the pressure within the housing 330 to be increased to assist in inserting the liner 312 within the pipe 314.

Once the insertion of the liner 312 reaches the point where the trailing end of the liner 312 is about to pass through the housing inlet opening 372, a second sealing means, in the present embodiment a cable or rope packing gland 384 is installed on the forward end of the pressure housing inlet opening 372 with the cable 368 passing therethrough. The cable packing gland 384 is employed to seal the housing inlet opening 372 during the liner curing process.

The pressure housing 330 includes observation ports (not shown) for the purpose of permitting the operator to view the operation occurring within the pressure housing 330. Water from a water source (not shown) and compressed air from a compressed air source (not shown) are also provided to the pressure housing 310 by suitable pipes or conduits (not shown) each of which are valve controlled (not shown). The pressure housing 330 further includes pressure gauges (not shown) pressure relief valves (not shown) and a clear sight tube (not shown) all of which are substantially the same as the corresponding components described above in connection with the first embodiment. Suitable electrical power and hydraulic power connections are made (not shown).

The following constitutes a brief description of the primary structural features of the apparatus 310 of the second embodiment of the present invention. In order to better understand the interrelationship between the various structural components and the installation of a liner 312 within a pipe 314, a brief description of the operation of the apparatus 310 will now be presented.

As with the previously described embodiment, the liner 312 is selected and prepared at the central liner preparation facility (not shown) is cooled, lubricated and stacked within the liner storage housing 320 as shown in phantom in FIG. 6. The insulated cover (not shown) is placed over the top of the liner storage housing 320 and the trailer 316 is transported to the remote job site location where the pipe 314 is to be lined.

Prior to the arrival of the trailer 316 at the job site, the pipe 314 and the manhole 315 are prepared as previously discussed. The scaffold assembly 352 is erected and leveled straddling the manhole 315. The insertion conduit 350 is assembled and is lifted upwardly and placed upon the support beams as shown.

When the trailer 316 arrives at the job site it is positioned so that the flange on the entry end of the insertion conduit 350 aligns with the corresponding flange on the outlet at the lower rear end of the pressure housing 330. The insertion conduit 350 is then sealingly secured to the pressure housing 330. The sight tube (not shown) water pipe (not shown) and compressed air pipe (not shown) are connected to the pressure housing 330 and a source of hydraulic fluid (not shown) is connected to both the hydraulic motor 342 and the hydraulically actuated winch 370. Suitable electrical connections are made (not shown) to provide electrical power as required to control the operation of the hydraulic motor etc.

Once all of the piping and other connections have been made, the leading end of the liner 312 is lifted from the top of the liner stack and is fed around the forward drive roller 374 and through the housing inlet opening 372. The nip roller assembly 340 is raised and the liner 312 is moved along the conveyor belt 338 and the rear guide rollers 348, and passes down the insertion conduit 350. The hydraulic motor 342 is actuated to drive the conveyor drive rollers 344 to move the liner 312 (toward the left when viewing FIG. 6), and the forward drive roller 374 to lift the stacked liner 312 from the liner storage housing 320.

The leading end of the liner 312 is pulled out of the exit end of the insertion conduit 350 and is turned inside out to form a cuff. The cuff is then pulled back over the outside of the exit end of the insertion conduit 350 and is clamped in place as previously described to provide a tight seal between the liner 312 and the insertion conduit 350. At this point in the operation, the cover member 362 is secured over the flange member 360 and the connection flange members 354 are similarly closed and sealed. Water is pumped into the insertion conduit 350. The pressure exerted by the water pushes the liner 312 downwardly causing the liner to begin to invert. The hand wheels 341 are rotated to adjust the vertical position of nip roller assembly 340 so that the idler rollers 347 lightly press down upon the liner 312 to provide positive friction contact between the liner 312 and the conveyor belt 338. The primary liner feed control means 336 is operated to feed the liner 312 down the insertion conduit 350 at a slow rate.

A diverter means, in the present embodiment a curved block or inversion shoe 386, is secured to the bottom of the manhole 315 as shown. The inversion shoe 386 serves to divert the liner 312 into the pipe 314 as the liner 312 moves downwardly. An operator (not shown) is positioned in the manhole 315 to assist in guiding the inverting liner 312 through inversion shoe 386 and into the pipe 314.

The water is raised to the level as shown in FIG. 6 and is maintained at this level to provide sufficient water pressure to invert the liner 312 and to continue to move the liner 312 through the pipe 314. The insertion of the liner 312 into the pipe 314 continues in this manner until the liner 312 is inserted approximately half way through the pipe 314. As long as the water level is maintained approximately at the height as shown, the water pressure should be sufficient to invert and push the liner 312 along the pipe 314. However, in the event that the liner 312 gets hung up or stuck at a particular location, a procedure is available to again start the liner 312 moving. The procedure involves drawing several feet of liner 312 into the pressure housing 330 and then inflating the infaltable tube 378 to close and seal the pressure housing inlet opening 372, thereby effectively creating a sealed pressure chamber. The compressed air valve (not shown) is then opened to temporarily raise the pressure within the pressure housing 330. The increased pressure, acting in conjunction with the existing water pressure, pushes the liner 312 along the pipe 314 at least for the additional length of liner contained within the pressure housing 330. Thereafter, the inflatable tube 378 is deflated to unblock inlet opening 372 and relieve the pressure within the pressure housing 330. The normal liner insertion process then may be continued utilizing only the water pressure.

When the liner 312 has been installed approximately halfway through the pipe 314 and when the trailing end of the liner is just about to enter the pressure housing inlet opening 372, the liner insertion process is temporarily stopped. The one end of the cable 368 is passed through the cable packing gland 384 and is secured to the trailing end of the liner 312. The cable packing gland 384 is then secured to the forward end of the pressure housing 330 surrounding the cable 368 and the inlet opening 372 as shown. A suitable gasket may be positioned between the cable packing gland 384 and the pressure housing 330 for a tight sealing fit. The nip roller assembly 340 is raised to permit the cable 368 to pass unencumbered through the first feed control means 336. Thereafter, the insertion of the liner 312 is continued with the cable 368 and the hydraulically actuated winch 370 serving to control the feed rate of the liner 312.

When the trailing end of the liner 312 reaches the entry end of the insertion conduit 350, the liner insertion process is again stopped. The cover member 362 is removed from the flange member 360 and the snorkel assembly 364 is installed in place as shown. The first end of a flexible conduit, preferably a generally flat perforated hose 388, is attached to the trailing end of the liner 312 as shown. The other end of the hose 388 is wound around a rotatable holding drum 390.

The liner insertion process is then continued until the trailing end of the liner 312 reaches and abuts against a stop means (not shown) which has been placed inside the pipe at the end of the section of pipe to be lined. At this point, substantially all of the liner 312 is inverted within the pipe 314 with the flexible cable 368 and the hose 388 extending within the liner 312 along its entire length and back through the insertion conduit 350 to the winches 370 and holding drum 390 respectively. The water level is then increased to a point slightly below the top of the snorkel assembly 364 to provide increased static water pressure sufficient to force the tubular liner 312 radially outwardly against the existing pipe wall. The hot water pipe (not shown) and return pipe (not shown) are connected to the connection flange members 354 and the resin within the liner 312 is cured in substantially the same manner as previously described. Once the curing of the liner has been completed, the various pipes and the like are disconnected from the apparatus 310 and the apparatus is otherwise disassembled and removed. The remaining water is removed and both ends of the liner 312 are trimmed as described above. Alternatively, curing could be accomplished after disconnecting the insertion conduit 350 from the pressure housing 330 and returning the trailer 316 to the central facility for the loading of a new liner. The snorkel assembly 364 would then be secured directly to the entry end of the insertion conduit 350 and the liner curing process would proceed as described above.

Referring now to FIG. 19, there is shown a variation of the apparatus 310 of FIG. 6. The variation shown in FIG. 19 is employed to permit the insertion and inversion of a tubular liner 312' having a diameter of up to an eighteen inches within a similarly sized pipe or conduit through a manhole 315' having an entrance diameter of only eighteen inches. Instead of securing the liner to the exit end of the vertical insertion conduit 350 as shown in FIG. 6, a generally vertically extending flexible extension conduit or pipe 392 is secured to the exist end of the insertion conduit 350. The flexible extension conduit 392 extends downwardly into the manhole 315' and terminates proximate the bottom of the manhole as shown in FIG. 19. A plurality of flexible support cables (not shown) may extend downwardly for supporting the flexible conduit 392 in the manner as described above in connection with the embodiment shown in FIGS. 1 through 5.

A diverter conduit or inversion elbow assembly 394 is secured to the lower end of the flexible conduit 392 in a manner similar to that of diverter conduit 280 shown and described in connection with FIGS. 1 through 5. The diverter conduit 394 includes an entry end 393 and an exit end 395. As shown in FIG. 19, the diverter conduit exit end 395 is generally ellipsoid shaped and is oriented so that the longer dimension of the ellipsoid extends generally vertically.

Guide means, preferably a single, generally horizontal guide roller 396, is rotatably supported within the diverter conduit 394. As with the guide rollers 286 and 288 described above, the guide roller 396 is rotatably supported on both axial ends by bushings and pillow blocks 397.

In operation, the liner 312, which may be folded laterally as hereinafter described, passes through the insertion conduit 350 through the flexible conduit 392 and is pulled out of the ellipsoid shaped diverter conduit exit end 395. The perimeter of the ellipsoid shaped diverter conduit exit end 395 is equal to the inside diameter of the liner 312' so that when the leading end of the liner 312' is turned inside out to form the cuff, it fits exactly over the outside of the diverter conduit exit end 395. The liner cuff is secured to the diverter conduit exit end 395 in the manner as previously described and the liner installation proceeds in the same manner as described above.

Third Embodiment

Referring now to FIGS. 7 through 11, there is shown a third embodiment of an apparatus for installing a generally tubular liner within an elongated conduit in accordance with the present invention. The apparatus, shown generally as 400, is utilized for installing a large diameter thermosetting liner 402 within a large diameter conduit or pipe, such as underground pipe 404. In the present embodiment, the inner diameter of the underground pipe 404 and the outer diameter of the liner 402 are approximately equal and are in the range of between about 36 inches and about 96 inches. Because of the greatly increased size of the liner 402, the apparatus 400 includes special components, hereinafter described, to facilitate the movement and handling of the liner 402.

The general structure and operation of the apparatus 400 is substantially similar to the above-described apparatus 30 and 310 which are used for installing smaller liners into smaller conduits. Accordingly, the following discussion will be primarily oriented towards the structural and operational features of the present apparatus 400 which are different from those of the above-described apparatus 30 and 310.

As with the above-described embodiments, apparatus 400 includes a transport means for conveying the liner 402 from a centralized liner preparation facility (not shown) to a remote job site location where the liner 402 is to be installed within the pipe 404. In the present embodiment, the transport means comprises a heavy duty flatbed trailer 406 having a liner storage housing 408 substantially the same as the liner storage housing 320 described above. The walls of the liner storage housing 408 are thermally insulated and are laterally adjustable to accommodate various sized liners that fall within the above-stated range. The liner 402 which has been previously uniformly impregnated with the thermosetting resin as described above, is installed or stacked within the liner storage housing 408 with chunks of ice (not shown) inserted beneath the liner and between the stacked liner layers in order to keep the liner cool during transport.

Figure 7:
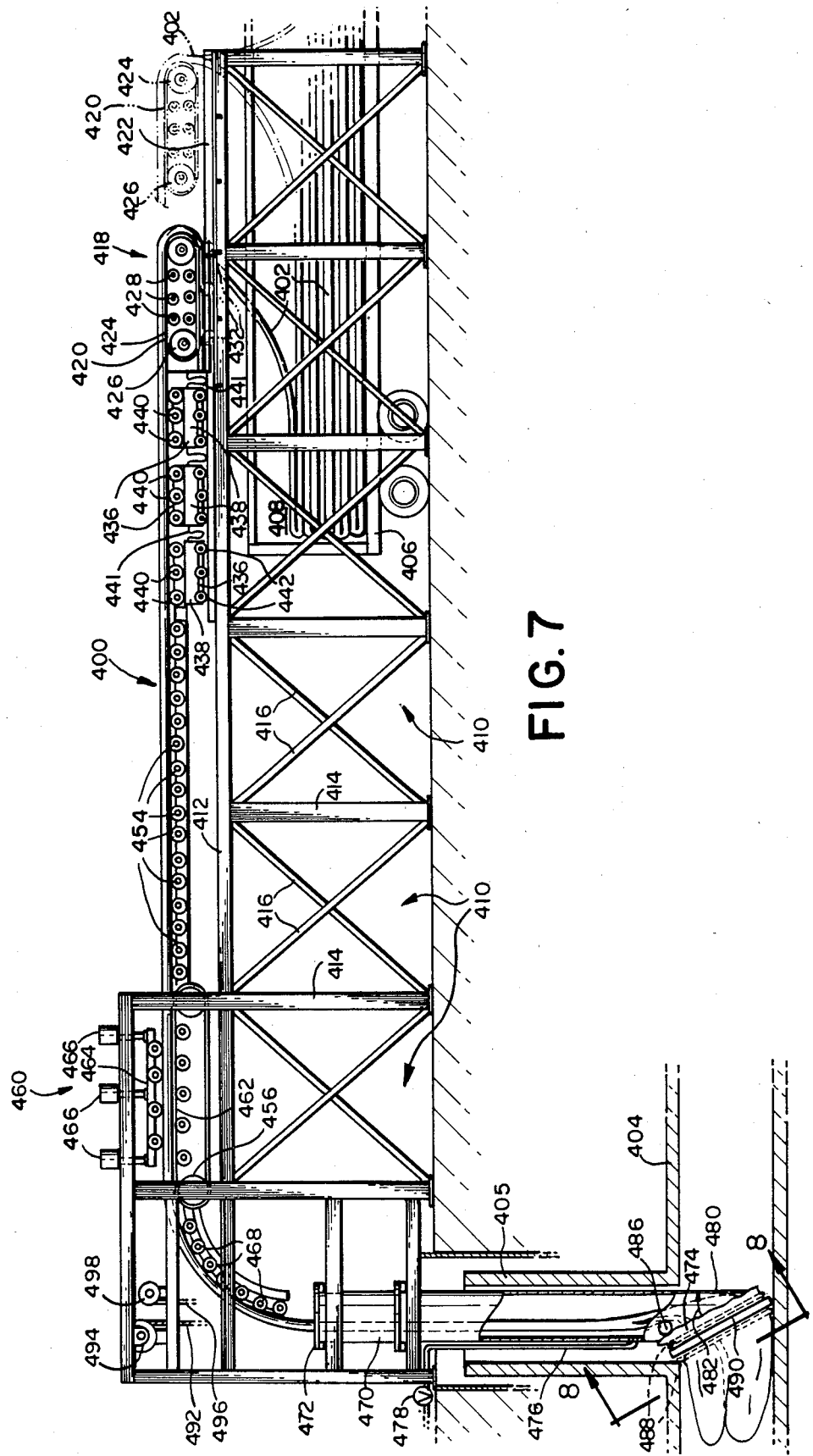
FIG. 7 is an elevation view, partially in section, of a third embodiment of an apparatus in accordance with the present invention for the installation of a liner into a conduit having a diameter of between about thirty-six and about eighty-four inches.

The apparatus 400 further includes structural means for supporting the liner 402 during insertion into the pipe 404 and for supporting various other components of the apparatus 400 which will hereinafter be described. In the present embodiment, the structural means comprises a plurality of supporting frames 410 which are secured together in side by side relation and a generally flat base panel 412 which is secured to the top of and supported by the various supporting frames 410. The supporting frames 410 are made of steel or some other high strength material and are comprised of a plurality of generally vertically extending spaced apart columns 414, cross beams (not shown) linking the four columns together and sway bracing or X bracing 416. Leveling means (not shown) and alignment means (not shown) are provided to facilitate the leveling and alignment of the supporting frames 410 to form a generally continuous supporting structure as shown in FIG. 7. The width and height of the supporting frames 410 are selected to permit the trailer 406 to be moved within and between the supporting frames 410 as shown.

The apparatus 400 further includes an initial feeding means, shown generally as 418, for lifting the liner 402 from the liner storage housing 408 and for conveying the liner 402 along the supporting frames 410. In the present embodiment, the initial feeding means 418 comprises a power driven conveyor means 420 mounted for power driven translational reciprocating movement upon a support structure 422. In the present embodiment, the conveyor means 420 comprises an endless conveyor belt 424, a drive roller 426 and a plurality of spaced idler rollers 428. The drive roller 426 is drivingly connected by suitable transmission means such as a drive belt or chain (not shown) to a drive means, in the present embodiment a hydraulic motor (not shown), to cause the endless conveyor belt 424 to rotate (in a counterclockwise direction when viewing FIG. 7) in the usual known manner about the drive rollers 426. In this manner, when the leading end of the liner 402 is lifted upwardly and placed on the conveyor belt 424, the rotation of the belt 424 tends to pull the liner continuously upwardly from its stacked position within the liner storage housing 408.

Figure 9:
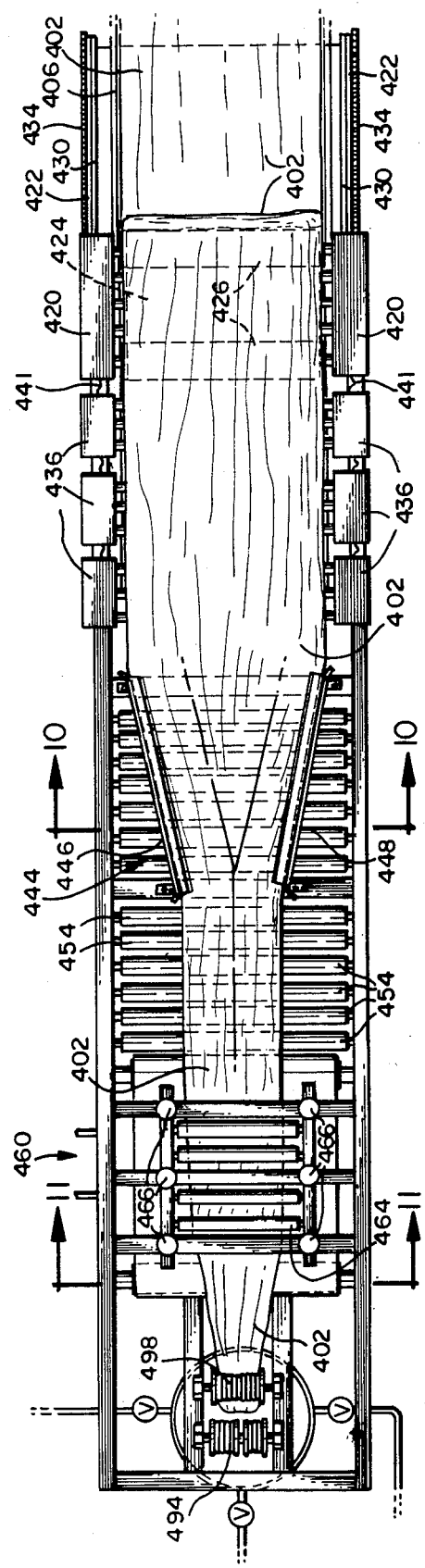
FIG. 9 is an enlarged plan view of a portion of the apparatus of FIG. 7.

As best seen in FIGS. 7 and 9, the support structure 422 which supports the conveyor means 420 comprises a pair of spaced apart, generally parallel rail members 430 which are supported by the rightmost supporting frames 410. The conveyor means 420 is supported for reciprocal movement on the rail members 430 by pairs of wheels or roller members 432. The rail members 430 each include rack teeth 434 which are engaged by corresponding drive pinion members (not shown) on the conveyor means 420. The drive pinion members are drivingly connected to a drive means, for example a reversible hydraulic motor (not shown) for driving the pinion members for rotation in one direction or the other. The rotation of the pinion members in cooperation with the rail member rack teeth 434 causes the conveyor means 420 to move back and forth (toward the right and left when viewing FIG. 7) along the rail members 430 depending upon the direction of rotation of the pinion members. By properly coordinating the reciprocal movement of the conveyor means 420 with the location of the liner 402 being lifted out of the liner storage housing 408, the liner can be lifted upwardly from its stacked position with a minimum of stretching and/or pulling.

The initial feeding means 418 also includes a plurality of movable idler conveyor assemblies 436, three of which are shown in the present embodiment. Each of the idler conveyor assemblies 436 comprises a structural frame or housing 438 which supports a plurality of rotatable guide rollers 440. The structural frame 438 is in turn movably supported by pairs of wheels or roller members 442 which engage the rail members 430 for reciprocal movement there along (toward the right or left when viewing FIG. 7). The idler conveyor assemblies 436, which are not powered, are attached together and to the left or rear end of the conveyor means 420 by flexible attachment means, preferably cables 441 of a predetermined length. In this manner, as the conveyor means 420 moves toward the right, the idler conveyor assemblies 436 are pulled along one at a time at predetermined spaced distances. In this manner, the idler conveyor assemblies 436 serve as moveable guide rollers to support the liner 402 as it is moved along the initial feeding means 418. As the conveyor means 420 moves toward the left, the idler conveyor assemblies 436 are pushed back toward the left to the position as shown in FIG. 7. The forward and rearward movement of the conveyor means 420 and the corresponding movement of the idler conveyor assemblies 436 is controlled by the operator through control of the speed and direction of the hydraulic motor (not shown) which is employed to rotate the conveyor means drive pinions (not shown).

Although the previously described power driven conveyor means 420 is presently preferred, alternative methods may be employed for lifting the liner 402 from the liner storage housing 402. One such alternate method is to place the liner 402 in a movable, power driven, container such as a wheeled cart (not shown). The cart (not shown) could be adapted to move reciprocally back and forth along rails or tracks (not shown) positioned between the supporting frames 410. A fixed power driven roller could be employed to lift the liner continuously upwardly as the wheeled cart (not shown) reciprocates back and forth beneath the power driven roller to compensate for the stacked liner. By moving the liner containing cart in this manner, the liner can be lifted upwardly without stretching or undue stress and without the movable conveyor means 420.

Figure 11:
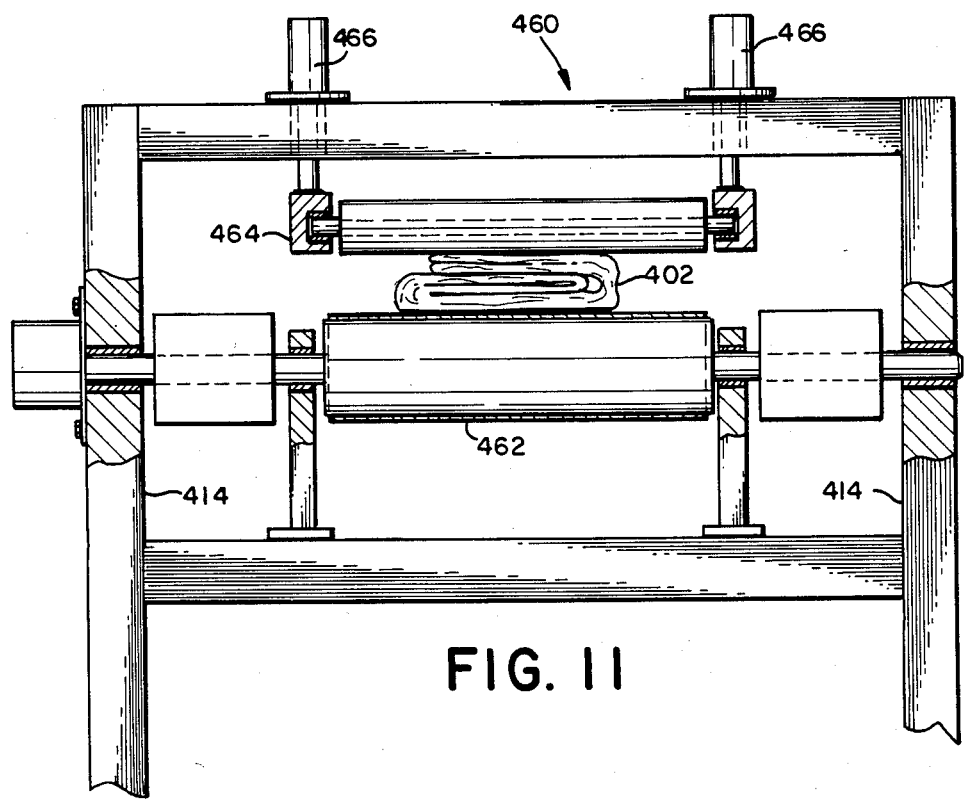
FIG. 11 is an enlarged sectional view taken along line 11—11 of FIG. 9.

The initial feed means 418 further includes liner folding means 444 located to the left of the idler conveyor assemblies 436. The purpose of the liner folding means 444 is to gently fold the lateral sides of the liner 402 inwardly to overlap each other and the center liner section as shown in FIG. 11 as the liner 402 moves along toward the left as shown in FIG. 7. The folding of the liner 402 is necessary in order to insert the large diameter liner 402 through the insertion conduit and into the pipe 404. In utilizing a liner 402 with a diameter of 96 inches, when the tubular liner 402 is flattened for the impregnation of the resin, the flattened liner has a transverse dimension greater than the transverse dimension of the insertion conduit and the manhole without being laterally folded. The liner folding means 444 folds the liner 402 to have a maximum diameter or transverse dimension which is less than the transverse dimension of the insertion conduit. In addition to facilitating the passage of the liner through the insertion conduit and the manhole and into the pipe 404, by folding the liner 402 in this manner, the insertion of the liner is easier to control.

Figure 10:
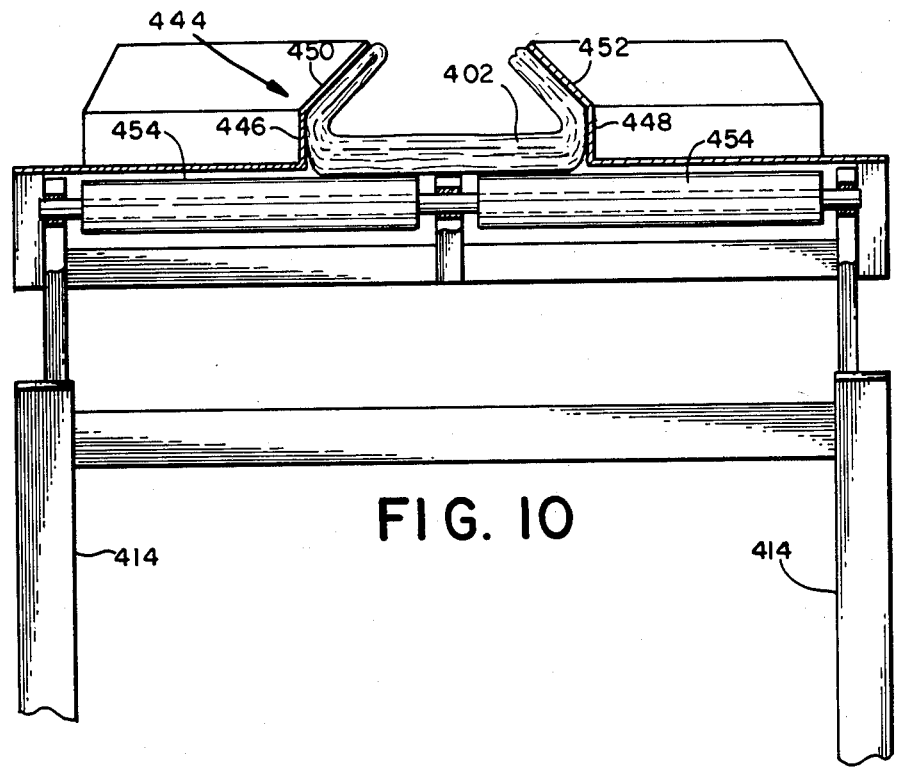
FIG. 10 is an enlarged sectional view taken along line 10—10 of FIG. 9.

The liner folding means 444 comprises a pair of spaced laterally converging generally upwardly extending flange members 446 and 448. The upper end of each of the flange members 446 and 448 includes an inwardly extending angled portion 450 and 452 respectively. As the liner 402 moves along the underlying guide rollers 454, the flange members 446 and 448 cause the lateral edges of the liner 402 to curve upwardly and inwardly as shown in FIG. 10. As the liner 402 moves further along (toward the left in FIG. 9) the upward and inward movement of the lateral edges of the liner 402 is continued due to the convergence of the flange members 446 and 448 until the two lateral liner edges overlap as shown in FIG. 11. As shown in FIGS. 9 and 11, the overall folded width of the liner is between one-third and one-half of the unfolded width of the liner 402.

The apparatus 400 includes a first or primary feed control means shown generally as 460 for initially controlling the feed rate of the insertion of the liner 402 into the pipe 404. The primary feed control means 460 of the present embodiment is not located within a pressure region or pressure vessel. As with the above-described embodiments, the primary feed control means 460 comprises a conveyor belt means 462 having a slack conveyor belt of the endless type and an idler nip roller assembly 464. Both the conveyor means 462 and the idler nip roller assembly 464 are substantially the same both structurally and operationally as the corresponding components described in detail above. The conveyor belt means 462 has a drive roller 456 that is connected to a hydraulic motor (not shown) by means of a belt or chain (not shown). However, unlike the previously described idler nip roller assemblies, the present idler nip roller assembly 464 includes power driven means, in the present embodiment hydraulically actuated piston members 466, for adjusting the spacing between the idler nip roller assembly 464 and the conveyor means 462. As shown in FIG. 11, the idler nip roller assembly 464 is adjusted to provide a compressive force on the folded liner 402 which is sufficient to force the lower part of folded liner 402 against conveyor belt 462 to provide frictional contact between the conveyor belt and the liner 402. The contact between the liner and the conveyor belt must be sufficient to control the feed rate of the liner into the pipe 404 but yet is not so great as to significantly redistribute the resin which has been previously uniformly impregnated within the liner 402. Vertical movement of the idler nip roller assembly 464 is controlled by the operator through simultaneous actuation of the piston members 466. As with the previously described embodiment, the conveyor means 462 is power driven, preferably by a hydraulic motor (not shown).

A plurality of rotatable guide rollers 468 are provided at the output end (left end when viewing FIG. 7) of the primary feed control means 460 for gently curving the folded liner 402 from its generally horizontal orientation to a generally vertical orientation. An insertion conduit 470 is positioned beneath the guide rollers 468 and extends downwardly to the pipe 404. In the present embodiment, the liner 402 is inserted into the pipe 404 by utilizing only the pressure generated by a column of water within the insertion conduit. Thus, the insertion conduit 470 also serves as the pressurized region.

As with the above-described embodiments, the insertion conduit 470 comprises a plurality of conduit or pipe sections, preferably made of steel, which are sealingly connected together end to end and extend downwardly into the manhole 405 as shown. However, in the case of the present invention conduit 470, the diameters of the various pipe sections are greater than those of the previously described insertion conduits in order to accommodate a larger sized liner 402. The insertion conduit 470 is supported in a generally vertical or upright orientation primarily by the leftmost supporting frame 410. The height of the insertion conduit 470 is adjustable utilizing means (not shown) similar to the insertion conduit adjustment means as previously described. The insertion 470 conduit includes an upper or entry end 472 through which the liner 402 is inserted and a lower or exit end 474 through which the liner 402 passes prior to entering the pipe 404.

As shown in FIG. 7, a fluid conducting conduit 476 communicates with the interior of the insertion conduit 470 proximate the lower end thereof. The other end of the fluid conducting conduit 476 is attached to a source of fluid, preferably water. A suitable fluid control valve 478 is provided along the conduit 476 to control the flow of the fluid or water into the insertion conduit 470. As previously stated, when inserting a large liner 402 of the type employed in connection with the present embodiment, the pressure developed by the height of the water within the insertion conduit 470 is sufficient to both invert the liner 402 and to move it along the pipe 404. Therefore, there is no need for a sealed pressure vessel or the like.

Figure 8:
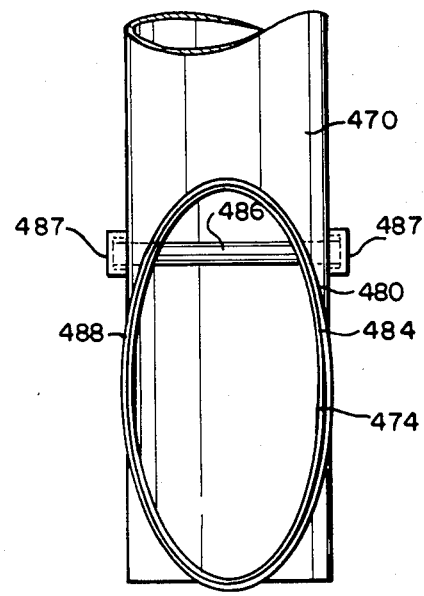
FIG. 8 is an enlarged sectional view taken along line 8—8 of FIG. 7.

The insertion conduit exit end 474 is specially adapted to facilitate the movement and inversion of a large sized liner such as liner 402. For this purpose, the exit end 474 includes a portion which forms a diverter conduit 480 which is effective to divert the liner 402 through a plurality of small angle changes, the total of which constitutes an angle of travel or diversion angle of about 90°. As best seen in FIGS. 7 and 8, in the present embodiment, the diverter conduit 480 is formed by terminating the insertion conduit exit end 474 at an angle 482 to provide a generally vertically oriented ellipsoid shaped opening which is surrounded by an ellipsoid shaped tubular inversion ring member 484. As best seen in FIG. 7, the ellipsoid shaped tubular inversion ring member 484 generally faces the pipe 404 into which the liner 402 is to be inserted. In the present embodiment, the angle 482 is approximately 30°, however, other suitable angles may be employed. The ellipsoid shaped opening is sized so that its perimeter is substantially equal to the outer perimeter of the unfolded liner 402 which is being installed within the pipe 404. In this manner, the folded liner 402 can flow down the insertion conduit 470 and, upon reaching the diverter conduit ellipsoid shaped opening can be unfolded for inversion and insertion into the pipe 404.

Guide means, located within the diverter conduit 480, are employed for guiding the liner 402 through the diversion angle. In the present embodiment, the guide means preferably comprises a single roller member 486 rotatably secured by pillow blocks and bushings 487 within the diverter conduit 480 adjacent to the inner bend of the diversion angle.

Means are also provided on the exit end of the diverter conduit 480 for sealingly clamping the leading end of the liner 402 to the exit end and for creating a fluid tight seal between the liner 402 and the insertion conduit exit end 474. In the present embodiment, the means comprises a pair of spaced apart rib members 488 which extend around the outer surface of the ellipsoid-shaped tubular inversion ring member 484 and a clamping means such as an annular clamp 490. The leading end of the liner 402 is folded back upon itself to form a cuff which is sealingly clamped to the insertion conduit exit end 474 in substantially the same manner as previously described in connection with the first and second embodiments.

The apparatus 400 also includes a secondary liner feed control means. In the present embodiment, the secondary liner control means is comprised of a flexible rope or cable 492 one end of which is adapted to be secured to the trailing end of the liner 402 in a manner which will hereinafter be described in greater detail. The other end of the cable 492 is secured to a cable reel means, in the present embodiment a hydraulically actuated winch 494 which is secured to supporting frame 410 at the rear or left end of the apparatus 400. Unlike the above-described embodiments, the cable 492 is not secured to the liner 402 during the entire liner insertion process. Instead, the cable 492 is secured to the trailing end of liner 402 only when the trailing end reaches the insertion conduit entry end 472.

Similarly, a generally flat perforated hose 496 is provided for use in the liner resin curing process. One end of the hose 496 is adapted for attachment to the trailing end of the liner 402 once the trailing end reaches the insertion conduit entry end 472. The other end of the hose 496 is secured to a second rotatable reel means 498 secured to supporting frame 410 proximate to the hydraulic cable winch 494.

The foregoing constitutes a brief description of the primary structural features of the apparatus 400 of the third embodiment of the present invention. In order to better understand the interrelationship between the various structure components and the installation of a liner 402 within a pipe 404, a brief description of the operatin of the apparatus will now be presented. As with the previously described embodiments, the liner 402 is selected and prepared at the central liner preparation facility (not shown) is cooled, lubricated and stacked within the liner storage housing 408. The trailer 406 is transported to the remote job site location where the pipe 404 is to be lined.

Prior to the arrival of the trailer 406, the pipe 404 and the manhole 405 are prepared as previously described. The supporting frames 410 are erected and leveled and the initial feeding means 418 and primary feed control means 460 are installed thereon. The insertion conduit 470 is assembled and positioned in place within the manhole 405. Depending upon the size of the insertion conduit 470, the frame of the manhole 405 may have to be removed and additional supporting means may have to be installed around the manhole opening. The hydraulically actuated winch 494 with the cable 492 wound thereon and the reel means 498 with the hose 496 wound thereon are installed upon supporting frame 410 as previously described. The fluid conduit 476 is secured to the insertion conduit 470 and to the fluid or water source (not shown). All required hydraulic and electrical power connections are made to provide sufficient electrical and hydraulic power to the various hydraulic and electrically operated components.

When the trailer 406 arrives at the job site, it is positioned as shown beneath the power conveyor means 420. The power conveyor means 420 is activated and the leading of the liner 402 is manually lifted upwardly and placed upon the conveyor belt 424. Alternatively, the cable 492 may be temporarily attached to the leading end of the liner 402 and the hydraulic winch 494 may be activated to help lift the leading end of the liner on the conveyor belt 424. The conveyor belt 424 continues to lift the stacked liner from the liner storage housing 408.

The leading end of the liner 402 is moved along the initial feeding means 418 to the liner folding means 444. The liner folding means 444 operates to fold the lateral edges of the liner inwardly to a more compact condition.

The idler nip roller assembly 464 is initially raised to permit the leading end of the folded liner 402 to enter the primary feed control means 460. Thereafter, the folded leading end of the liner 402 passes over the guide rollers 468 and down the insertion conduit 470 until a portion of the leading end extends out of the ellipsoid shaped opening 484 at the insertion conduit exit end 474.

The leading end of the liner 402 is pulled out of the ellipsoid shaped opening and is unfolded and turned back inside out to form a cuff. The cuff is then pulled back over the outside of the ellipsoid shaped tubular inversion ring member 484 on the insertion conduit exit end 474 and the clamp 490 is installed to provide a tight seal between the liner 402 and the insertion conduit 470. The idler nip roller assembly 464 is lowered to engage and place positive pressure upon the folded liner 402 to provide control of the liner feed rate. The valve 478 is opened and a small quantity of water is permitted to flow through the fluid conduit 476 and into the insertion conduit 470. The weight of the water forces the liner 402 to begin to invert and move through the pipe 404. Once the operator has determined that the liner 402 is properly inverting and moving along the pipe 404, the water level within the insertion conduit is increased to the level as shown in FIG. 7 and is thereafter maintained at that level. The downward pressure exerted by the water acts to invert the liner 402 and push it through the pipe 404. The primary feed control means 460 is employed to control the rate of movement of the liner 402. The conveyor means 420 reciprocates back and forth along the rail members 430 to continually lift the liner 402 from the liner storage housing 408.

When the trailing end of the liner 402 reaches the input end of the primary feed control means 460, the insertion process is stopped. At this point in the operation, approximately one-half of the liner 402 has been inverted and inserted within the pipe 404. It now becomes necessary to transfer control of the rate of liner feed from the primary control means 460 to the secondary control means. In order to accomplish the transfer, a temporary feed control tension member (not shown) is temporarily secured to the trailing end of the liner 402. The temporary feed control means comprises a length of material of sufficient strength and thickness designed to simulate the liner 402, for example, a piece of unimpregnated liner, and to permit the primary feed control means 460 to continue to control the feed rate until the trailing end of the liner 402 can be secured to the cable 492. Thus, with the temporary feed control means in place, the inversion process is continued until the trailing end of the liner 402 reaches the insertion conduit entry end 472. The cable 492 is then secured to the trailing end of the liner 402 and the temporary feed control means is detached and removed. The hose 496 is also secured to the trailing end of the liner at this time.

Thereafter, the inversion process is resumed with the winch 494 in cooperation with the cable 492 being employed to control the feed rate of the liner 402 through the pipe 404. The liner insertion process continues in this manner until the trailing end of the liner 402 reach and abuts against a stop means (not shown) which has been placed inside the pipe 404 at the end of the section of pipe to be lined. At this point, substantially all of the liner 402 is inverted within the pipe and the flexible cable 492 and the hose 496 extend within the liner along its entire length and back through the insertion conduit 470 to the winch 494 and reel means 498, respectively. The hose 496 can then be connected to a source of high temperature fluid such as water (not shown) and a suitable return pump (not shown) can be connected to the insertion conduit 470 to cure the resin within the liner 402 in the manner as described in detail above. Once the curing of the liner 402 has been completed, the various components of apparatus 400 can be disassembled and removed. Both ends of the cured liner 402 can thereafter be trimmed as previously described.

Alternate Embodiments

Referring now to FIGS. 31 and 32, there is shown an apparatus, generally 750, for installing a tubular liner within an elongated conduit in accordance with an alternate embodiment of the present invention. Like the previously described apparatus 400, the present apparatus 750 is particularly adapted for the installation of a large diameter thermosetting liner 752 within a large diameter conduit or pipe, such as underground pipe 754. However, the apparatus 750 of the present embodiment is more portable and easier and quicker to erect. In the present embodiment, the apparatus 750 is particularly suited for the installation of a liner 752 having a diameter in the range of between about thirty six inches and about sixty inches into a similarly sized pipe 754. It should be understood, however, that the apparatus 750 as described below may also be employed in connection with the installation of liners of a different diameter, depending upon the particular application.

The general structure and operation of the apparatus 750 is similar to that of the above-described apparatus 400 which is used for the installation of large liners into large conduits. Accordingly, the following discussion will be primarily oriented towards the structural and operational features of the present apparatus 750 which are different from those of apparatus 400.

As with the above-described embodiment, apparatus 750 includes a transport means for conveying the liner 752 from a centralized liner preparation facility (not shown) to a remote job site location where the liner 752 is to be installed within the pipe 754. In the present embodiment, the transport means comprises a heavy duty flatbed trailer 756 which supports a box-like open topped liner storage housing 758 substantially as described above. Of course, the base and side walls of the liner storage housing 758 are thermally insulated and the liner 752 which has been previously uniformly impregnated with the thermosetting resin as described above, is installed or stacked within the liner storage housing 758 with chunks of ice inserted between the stacked layers. A temporary insulated cover (not shown) may be placed over the top of the liner storage housing 758 during movement. In this manner, the liner 752 can be kept cool during transport to the remote job site to retard the curing of the resin.

A rotatable guide roller 760 is positioned at the rear of the liner storage housing 758. The guide roller 760 is mounted upon a generally cylindrical shaft 762 which is vertically adjustable to any desired position along the rear of the liner storage housing 758. The guide roller 760 serves to support the liner 752 as it is removed from the liner storage housing 758. The guide roller 760 is initially positioned near the top of the liner storage housing 758 as shown to correspond to the initial liner height. As the liner 752 is removed from the liner storage housing 758 and the height of the liner stack decreases, the guide roller 760 is correspondingly lowered to provide the needed liner support.

The apparatus 750 further includes means for raising the liner into a predetermined height above ground level prior to the installation of the liner within the pipe 754. In the present embodiment, the means for raising the liner comprises a pivoting support frame assembly shown generally as 764. The pivoting support frame assembly is comprised of three major sub assemblies; a fixed support frame base 766, a movable support frame generally 768 and a liner supporting beam frame subassembly generally 770. The fixed support frame base subassembly 766 is comprised of a plurality of generally vertically extending columns 772 which are supported upon horizontally extending base members 773 (only one shown) and are secured together as shown by suitable sway bracing 774. The fixed support frame base subassembly 766 rests upon and is secured to the ground to form a stable, level base for supporting the remainder of the pivoting support frame assembly 764.

The liner supporting beam frame subassembly 770 is comprised of a pair of parallel beam members 776 which are spaced a predetermined distance greater than the width of the liner 752. Extending between the two beam members 776 are a plurality of rotatable idler rollers 778 and top and bottom power rollers 780 and 782 respectively. The outward most portions of the idler rollers 778 may be axially inwardly sloped or tapered (not shown) to help keep the liner 752 properly positioned upon the apparatus 750. Nip roller assemblies 784 and 786 are associated with each of the power rollers 780 and 782 respectively. As presently preferred, each nip roller assembly 784 and 786 comprises a single nip roller 788 which is inwardly and outwardly adjustable in a manner previously described to vary the direction of movement of the liner 752 as it passes beneath the nip rollers 788 and over the top surface of the power rollers 780 and 782. Although, in the present embodiment, only a single nip roller 788 is associated with each nip roller assembly 784 and 786, it will be appreciated by those skilled in the art that additional nip rollers (not shown) could be employed for a particular application, if desired.

The rightmost or lower ends of the beam members 776 are pivotally secured to the rightmost vertical column 772 of the fixed support frame base subassembly 766. A suitable pin member 790 or any other such means may be employed to provide the pivoting connection. A single guide roller 791 is also provided proximate the right or lower end of the beam members 776 for supporting the liner 752 when the level of the liner stack in the inner storage housing 758 gets low (now shown).

The pivoting frame support assembly 764 is transported to the remote job site location with the liner supporting beam frame subassembly 770 pivoted to a generally horizontal position with respect to the fixed support frame base subassembly 766 (as shown in phantom in FIG. 31). Once the fixed support frame base subassembly 766 is properly positioned with respect to the manhole 755 and is properly leveled and secured, the left end of the liner supporting beam frame subassembly 770 is lifted upwardly utilizing a small crane (not shown) or by some other such lifting device, such as one or more hydraulic lift cylinders (not shown) which may be attached to the fixed support frame base 766. The movable support frame subassembly 768 is then installed between the fixed support frame base subassembly 766 and the angled liner supporting beam frame subassembly 770 as shown in FIG. 31. Suitable flanges and nuts and bolts are provided for securing the three subassemblies 766, 768 and 770 together as shown in FIG. 31 to form a generally continuous, stable structure for supporting the liner 752. Of course, the angle of the liner supporting beam frame subassembly 770 and the height of the left or distal end of the liner supporting beam frame subassembly 770 may vary from that shown in FIG. 31 for any given application. Variations in the liner supporting beam frame subassembly angle may be accomplished by suitable variations in the overall height or size of the movable support frame subassembly 768 or by making this subassembly of a variable height.

Referring now to FIG. 32, there is shown greater detail of the lower power roller 782, it being understood that the upper power roller 780 is structurally and operationally the same. The lower power roller 782 is mounted upon a rotatable shaft 792 which is supported on each end by a pillowblock 794. The pillowblocks 794 in turn are secured to the beam members 776. A portion of the shaft 792 extends beyond the right pillowblock 794 as shown in FIG. 32. Suitable reduction gearing 796 is affixed to the shaft. The reduction gearing 796 in turn is drivingly connected to the output of a hydraulic motor shown in block form as 798. Suitable inlet and outlet conduits 800 and 802 are secured to the hydraulic motor 798 for providing hydraulic fluid for driving the motor.

The power roller 782 is generally annular as with any other such roller. However, the outer surface of power roller 782 includes a pair of annular capstan grooves 804 extending around the circumference proximate the axial center thereof. The grooves 804 permit the power roller 782 to function as a capstan as will hereinafter be described in greater detail.

In the operation and use of the apparatus 750, a liner 752 is selected and prepared at the central liner preparation facility (not shown) is cooled, lubricated and stacked within the liner storage housing 758 as shown in FIG. 31. The trailer 756 is then transported to the remote job site location where the pipe 754 is to be lined.

Prior to the arrival of the trailer 756, the pipe 754 and the manhole 755 are prepared as previously described. The manhole frame and cover (not shown) have been removed and a protective entrance pipe 805 has been installed to provide larger diameter access into the manhole.

The pivoting support frame assembly 764 is transported to the remote job site location and the fixed support frame base subassembly 766 is positioned as shown proximate the manhole 755. The liner supporting beam frame subassembly 770 is then raised to the height which has been previously selected for installation of the particular liner 752 being installed. The movable support frame subassembly 768 is installed and secured to the fixed support frame base subassembly 766 and the liner supporting beam frame subassembly 770 to create a relatively rigid, stable structure for supporting the liner 752.

Once assembly of the pivoting support frame assembly 764 is completed, the trailer 756 is positioned as shown and the rear panel of the liner storage housing 758 is removed to expose the stacked liner 752. The guide roller 760 is adjusted to a height approximately corresponding to the height of the leading edge of the liner 752.

A pair of ropes (not shown) each of which are somewhat longer than the length of the liner supporting beam frame subassembly 770 are secured to the leading end of the liner 762. The ropes may be secured to suitable attachment rings (not shown) of the type which will hereinafter be described. The other ends of the ropes are coiled around the surface of the upper power roller 780. The upper power roller 780 is then activated to pull upwardly on the ropes and thus pull the leading edge of the liner out of the liner storage housing 758 and up the liner supporting beam frame subassembly 770. The guide rollers 760 and 791, the lower power roller 782 and the idler rollers 778 support the liner 752 as it moves up the beam frame subassembly 770.

Once the leading end of the liner 752 reaches the upper power roller 780, the rotation of the upper power roller 780 is stopped. The position of the two nip rollers 788 are adjusted with respect to the top and bottom power rollers 780 and 782, respectively, to change the direction of movement of the liner 752 to provide positive friction contact between the underside of the liner and the upper surfaces of the power rollers 780 and 782. The two ropes (not shown) are then removed from the leading end of the liner 752. The power rollers 780 and 782 are activated to again move the liner 752 up the beam frame subassembly 770. The leading end of the liner 752 then moves past the left end of the upper power roller and extend down from the beam frame subassembly 770 as shown. Once the leading end of the liner reaches the manhole entrance, the power rollers 780 and 782 are again stopped.

An annular inversion ring 806 is placed at the entrance to the manhole 755. The leading end of the liner 752 is slipped over the inversion ring 806 as shown. The inversion ring 806 includes a pair of annular ribs 808. A clamp means 810 is placed over the liner between the ribs 808 for holding the leading end of the liner firmly in place upon the inversion ring. The power rollers 780 and 782 are again activated to move the liner 752 along the beam frame subassembly 770 and into the manhole 755 as shown. Water or other such fluid 812 from a suitable source (not shown) is placed within the inverted portion of the liner 752. The weight of the water 812 pushes the inverted portion of the liner downwardly. A deflector means or deflector shoe 814 is positioned within the pipe 754 at the bottom of the manhole 755 for turning or deflecting the liner into the pipe 754 as the liner inverts and moves downwardly under the weight of the water 812. The column of water within the liner is maintained at a height to produce the force necessary to continue to invert and move the liner 752 along the pipe 754. Inversion and installation of the liner within the pipe 754 continues in this manner with the power rollers 780 and 782 pulling the liner out of the liner storage housing 758 and up the supporting beam frame subassembly 770 and the water pressure invert the liner and moving it along the pipe 754. The two nip roller assemblies 784 and 786 in combination with the two power rollers 780 and 782 also function as a first feed control means. Of course, once the momentum of the water pressure builds, the water pressure inverting and pushing the liner along the pipe helps to move the liner up the supporting beam frame subassembly 770. Conversely, the weight of the liner being moved from the liner storage housing 758 and up the beam frame subassembly 770 helps to control the rate of movement of the liner along the pipe 754.

As approximately one half of the liner 752 has been installed within the pipe 754 and the trailing end of the liner 752 reaches the lower power roller 782, the inversion and liner installation process is stopped. A temporary secondary feed control means, in the present embodiment a flexible cable or rope 818, is secured to a pullring 820 at the trailing end of the liner 752. The rope 818 is also looped around the grooves 804 of the lower power rollers 782 as shown in FIG. 32. The liner installation process then continues with the temporary secondary feed control means or rope 818 cooperating with the lower power roller 782 to function as a temporary second feed control means for controlling the rate of movement of the liner along the pipe 754.

After the trailing end of the liner reaches the inversion ring 806, the liner inversion process is again stopped. A second, secondary control means comprising in the present embodiment a flexible cable or rope 819, is looped around the grooves 804 in lower power roller 782 is passed up the liner supporting beam frame subassembly 770 through a flexible protective sleeve shown in phantom as 816 and is secured to the ring 820 on the trailing end of the liner 752. A perforated hose (not shown) is also secured to the trailing end of the liner at this time. The liner inversion process then continues utilizing the first rope 818 as the temporary secondary feed control means until the upper end of the protective sleeve 816 reaches the inversion ring 806. The first rope 818 is then removed from the ring 820. The protective sleeve 816 engages the inversion ring 806, the manhole 755 and the junction of the manhole and the pipe 754 to protect the inverted portion of the liner 752 from any cutting or other damage due to the movement of the rope 819. The liner inversion process is continued until the entire length of the liner is installed within the pipe 754. The liner is then cured as previously described utilizing high temperature water. The trailer 756 and liner storage housing 758 are removed as is the pivoting support frame assembly 764. Once the curing of the liner has been completed, the cured liner is trimmed as previously described.

Referring now to FIGS. 12 through 16, there is shown an apparatus, generally 500, for installing a generally tubular liner within an elongated conduit in accordance with another alternate embodiment of the present invention. The apparatus 500 is particularly adapted for the installation of a large diameter thermosetting liner 502 within a large diameter conduit or piper, such as underground pipe 504. In the present embodiment, the inner diameter of the underground pipe 504 and the outer diameter of the liner 502 are approximately equal and are in the range of between about 36 inches and about 96 inches. It should be understood, however, that the below described apparatus 500 may alternatively be employed in connection with the installation of liners having a diameter of less than 36 inches or greater than 96 inches depending upon the particular application.

Figure 12:
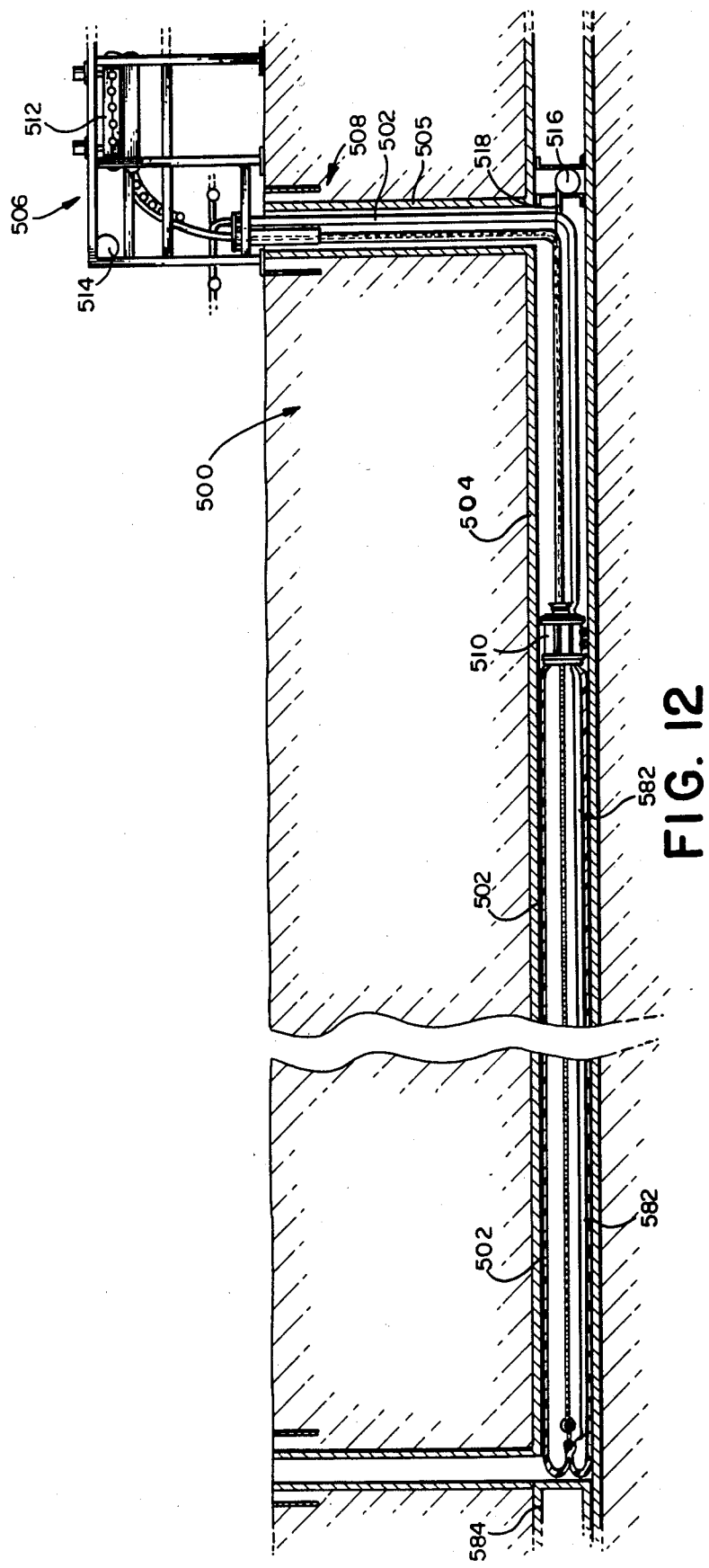
FIG. 12 is an elevation view, partially in section, of an alternate embodiment of the apparatus shown in FIG. 7.

As best seen in FIG. 12, the portion of the apparatus 500 extending above the ground, show generally as 506 and the portion of the apparatus extending generally vertically downwardly, shown generally as 508 are substantially the same as the corresponding above-described portions of apparatus 400 as shown in FIGS. 7 through 11. However, unlike the apparatus 400 of FIGS. 7 through 11, the presnt apparatus 500 does not include a diverter conduit 480 of the type previously described. Instead, the apparatus 500 includes fluid lock means, generally 510, detachably secured in sealing engagement with the inner surface of the pipe 504 for sealingly clamping the leading end of the liner 502 to facilitate insertion of the liner within the pipe 504.

The apparatus 500 includes a first or primary feed control means shown generally as 512 for continuously controlling the feed rate of the liner 502 and a liner folding means (not shown) for folding the lateral sides of the liner 502 inwardly to overlap each other to facilitate movement of the liner down the manhole 505 and through the pipe 504. A second or secondary feed control means is provided for controlling the feed rate of the liner as it is inserted into the pipe once the first feed control means 512 is no longer operable. In the present embodiment, the second feed control means comprises a first hydraulically actuated winch 514 located at the top of the supporting structure and a second hydraulically actuated winch 516 secured within the pipe 504, for example, by lag bolts (not shown), slightly to the right of the manhole 505. A flexible cable or rope means (not shown) is employed with the first hydraulic winch 514 for controlling the liner feed rate as the trailing end of the liner 502 moves down the manhole 505. Thereafter, a second flexible cable or rope means 518 is employed with the trailing end of the liner 502 for controlling the rate of insertion of the remainder of the liner 502 within the pipe 504.

Figure 13:
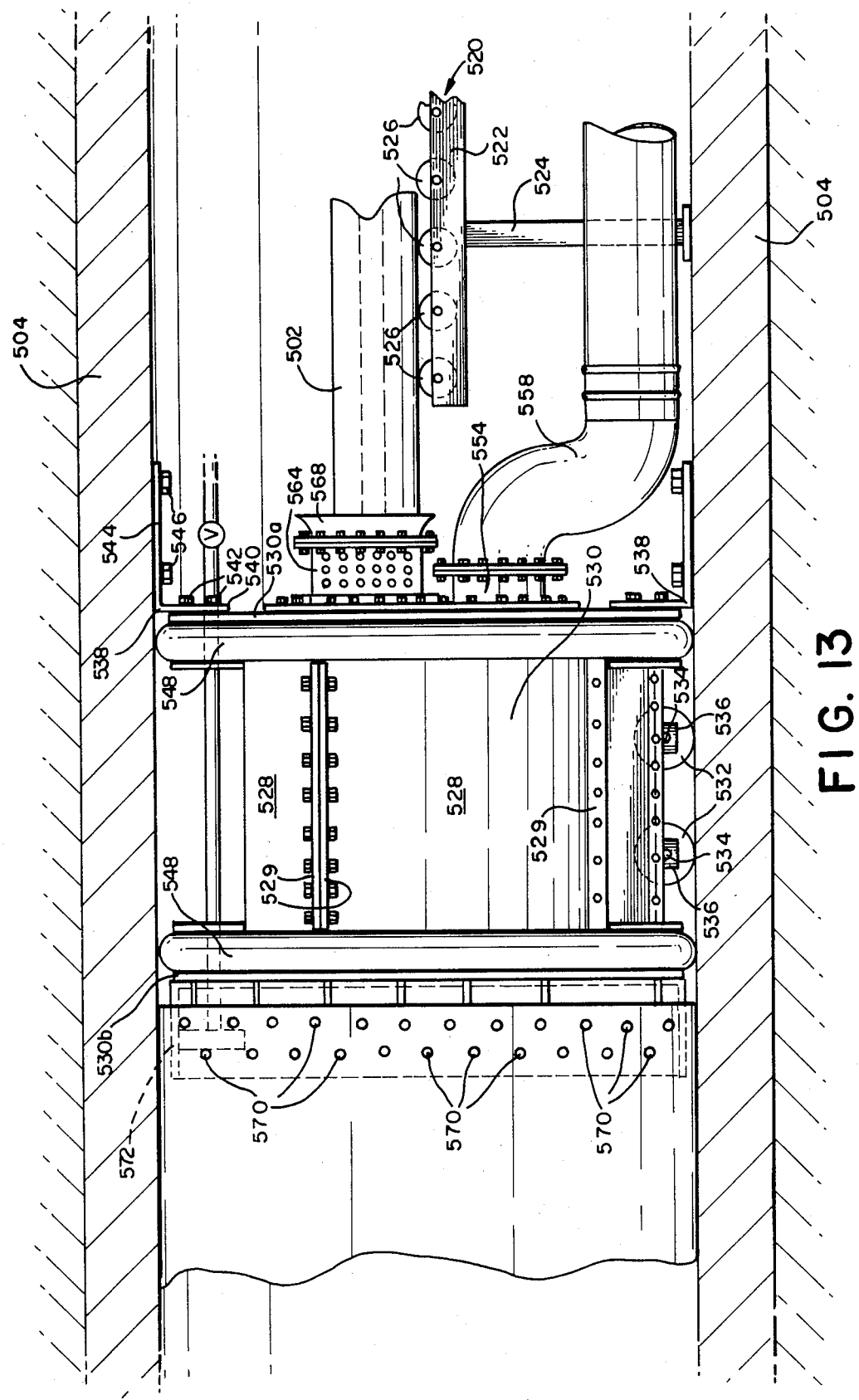
FIG. 13 is an enlarged elevation view of a portion of the apparatus of FIG. 12.

As best seen in FIG. 13, a liner conveyor means shown generally as 520 is installed within the pipe 504 for supporting the folded liner 502 as it moves from the manhole 505 to the fluid lock means 510. The liner conveyor means 520 is made up of a plurality of separate conveyor sections (not shown) which are individually lowered through the manhole 505 and are assembled together within the pipe 504. Each liner conveyor section comprises a generally horizontally oriented frame member 522 which is supported at a common predetermined height by a one or more generally vertically extending support legs 524. The lower ends of the support legs 524 are curved to compliment and cooperate with the curved pipe 504 to provide a firm support for the horizontal frame 522. A plurality of spaced, generally horizontally oriented guide roller members 526, are rotatably supported by the horizontal frame 522. The various conveyor sections are bolted or otherwise attached together (not shown) in end to end relation to form a generally continuous conveyor 522 for supporting the folded liner 502 as it moves from the manhole 505 to the fluid lock means 510.

FIGS. 13 through 16 show details of the structure and operation of the fluid lock means 510. As with the liner conveyor means 520, the fluid lock means 510 is comprised of a plurality of separate components which are individually lowered down the manhole 505 and are thereafter assembled within the pipe 504. In the present embodiment, the fluid lock means 510 is comprised of four generally arcuate segments 528 which included flanged ends 529 which are bolted or otherwise secured together to form a generally cylindrically shaped fluid lock housing 530. The arcuate segments 528 may be made of steel or any other high strength material. Once the arcuate segments 528 are assembled, generally circular end plates are secured to each axial end to complete the fluid lock housing 530.

Figure 15:
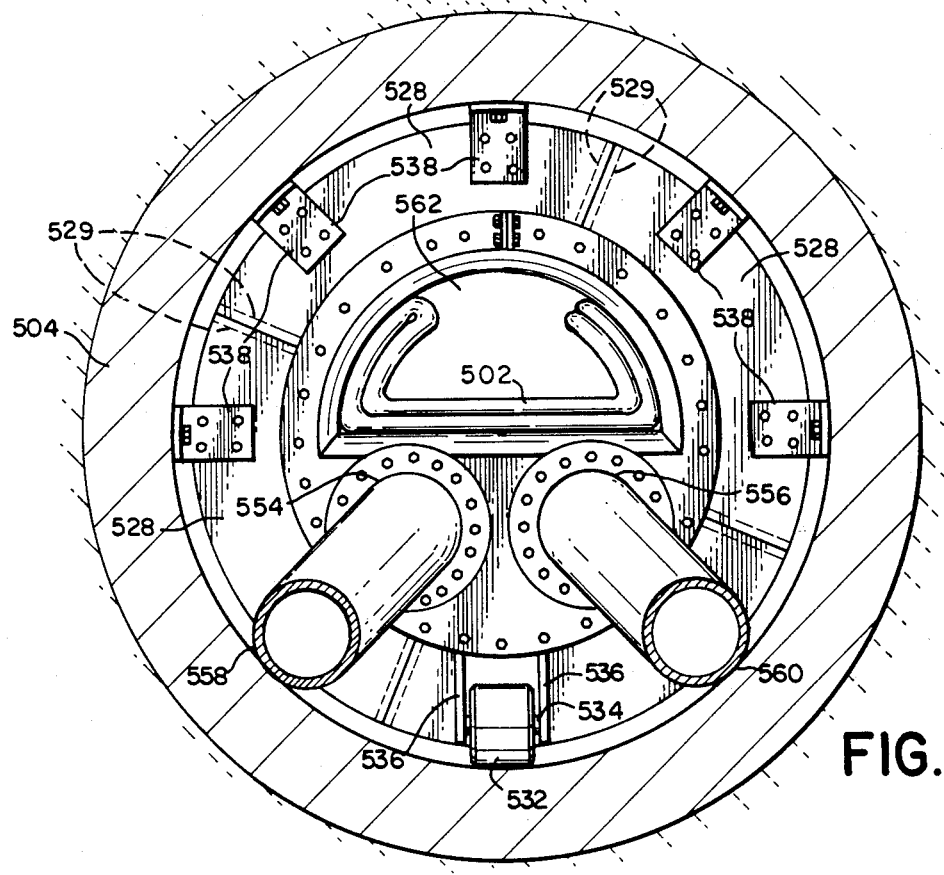
FIG. 15 is a right end view of the portion of the apparatus shown in FIG. 13.
Figure 16:
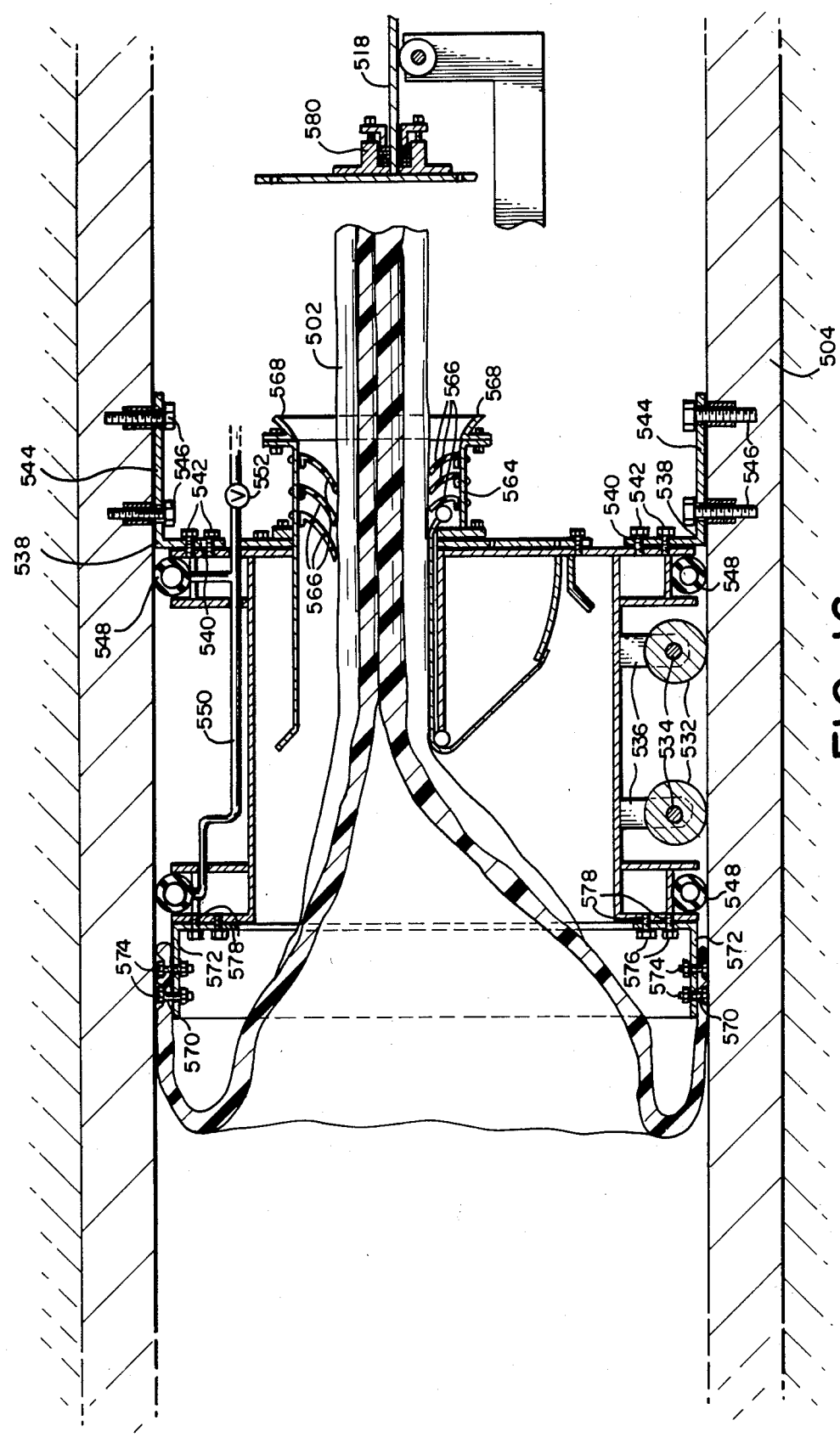
FIG. 16 is a sectional view taken along line 16—16 of FIG. 14.

As best seen in FIGS. 15 and 16, the fluid lock housing 530 includes a pair of roller members or wheels 532 rotatably supported upon suitable axles 534 and downwardly extending support members 536. The wheels are provided to facilitate movement of the assembled fluid lock housing 530 through the pipe 504.

Once the fluid lock housing 530 is moved to the position within the pipe as shown in FIG. 12, the fluid lock housing 530 is detachably secured in sealing engagement with the interior surface of the pipe 504. A plurality of generally L-shaped bracket members 538 are positioned in spaced locations around the periphery of the fluid lock housing 530. A first leg 540 of each of the L-shaped bracket members 538 is secured to the first or entry side or end of the fluid lock housing 530a by suitable means such as bolts 542. The other leg 544 of each of the bracket members 538 is secured directly to the pipe 502 utilizing suitable attachment means such as lag bolts 546.

As best shown in FIGS. 13 and 16, the fluid lock housing 530 includes a first or entry side or end 530a and a second or exit side or end 530b. Sealing means are utilized to provide a fluid tight seal between the fluid lock housing 530 and the pipe 504. In the present embodiment, the sealing means comprises a pair of generally annular inflatable resilient sealing members 548, one of which is located proximate to the fluid lock entry side 530a and the other of which is located proximate to the fluid lock housing exit side 530b. Piping means 550 are provided to conduct pressurized air to each of the inflatable sealing members 548. A control valve 552 controls the flow of the pressurized air to the sealing members 548. Once the fluid lock housing 530 is secured in place within the pipe 504 as described above, the sealing members 548 are inflated by pressurized air amd move radially outwardly to closely engage and conform to the interior surface of the pipe 504 to provide a fluid tight seal.

Figure 14:
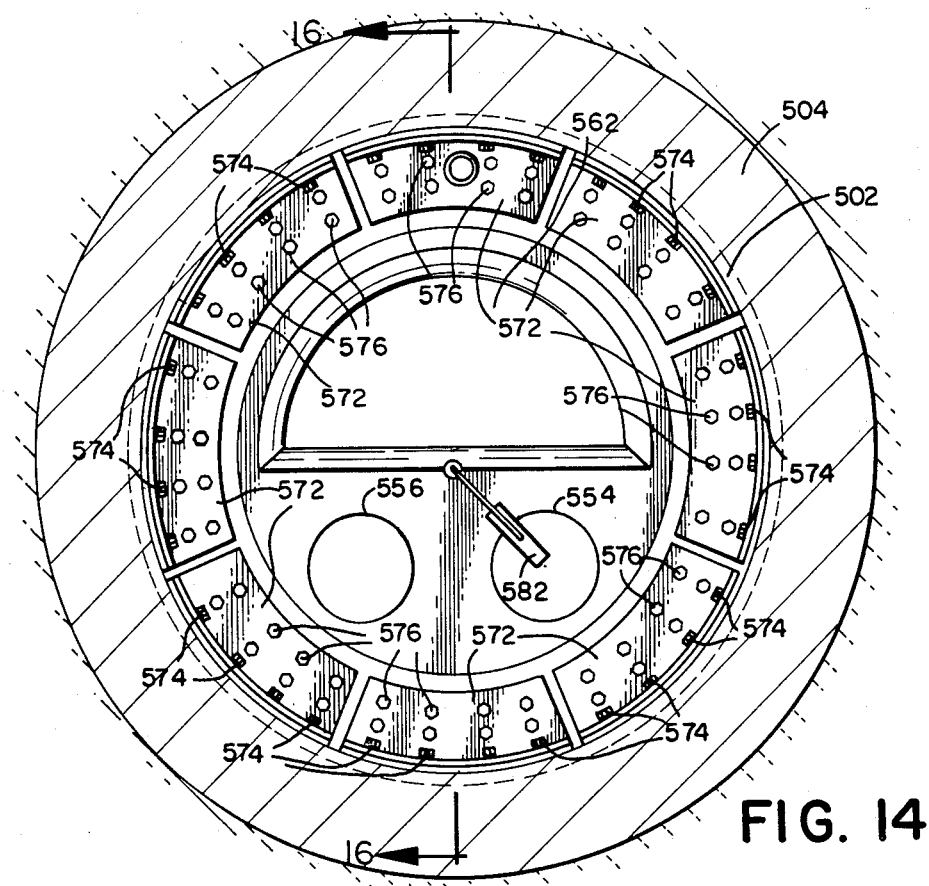
FIG. 14 is a left end view of the portion of the apparatus shown in FIG. 13.

As best seen in FIGS. 13 and 15, the first or entry side 530a of the fluid lock housing includes a pair of generally circular fluid inlet ports 554 and 556 respectively. A first end of a first fluid supply conduit 558 is secured to fluid inlet port 554 and a first end of a second fluid supply conduit 560 is secured to fluid inlet port 556. In the present embodiment, the other end of the first conduit 558 is secured to a source of pressurized air (not shown). A valve means (not shown) is positioned along the first conduit 558 to regulate the flow of pressurized air through the first conduit 558 and the fluid inlet port 554. As shown in FIG. 14, one end of the flat hose 582 extends out of the first conduit 558. The hose 582 extends along the first conduit 558 to a reel means (not shown) upon which the hose 582 is wound. The other end of the second conduit 560 is connected to a source of water (not shown). Again, a valve means is positioned along the second conduit 560 to regulate the flow of water through the second conduit 560 and fluid inlet port 556.

The entry side 530a of the fluid lock housing also includes an opening, such as a generally semicircular shaped opening 562 adapted for the passage of the folded liner 502 into the fluid lock housing 530. As best seen in FIGS. 13 and 16, a generally semicircular member 564 surrounds the semicircular liner opening 562 and extends outwardly (toward the right) therefrom. A plurality of flexible annular sealing members 566 extend generally radially inwardly around the interior of the cylindrical member 564 and engage the folded liner 502 as it passes into the fluid lock housing 530 to provide a fluid tight active seal for maintaining the pressure in the pressurized region as the liner travels through the fluid lock housing 530. The forward (rightward) end of the semicircular member 564 includes a seared or fluted flange member 568 which is adapted to guide the folded liner 502 into the semicircular member 564.

As shown in FIG. 14, the exit side 530b of the fluid lock housing is generally annular with a generally open center. Once the leading end of the liner 502 has passed through the semicircular opening 562 it passes out of the exit side of the fluid lock housing 530b and a short length is inverted as previously described to form a cuff. As best shown in FIG. 13, a plurality of spaced openings 570 generally arranged in two rows extend through the liner and are spaced around the circumference proximate the leading end. As shown in FIGS. 14 and 16, means, preferably a plurality (in the present embodiment eight) of generally L-shaped bracket members 572 are secured to the inverted leading end of the liner 502, preferably utilizing nuts and bolts, shown collectively as 504 which pass through the liner openings 570 to attach one leg of each of the arcuate bracket members 572 to the inverted portion of the liner 502. The other leg of each of the arcuate bracket members 572 is similarly secured to the exit side 530b of the fluid lock housing, preferably utilizing suitable bolts 576 adapted for engagement with suitable tapped openings 578 extending around the exit side 530b of the fluid lock housing. As best shown in FIG. 14, in the present embodiment, the bracket members 572 taken together form a circle having an outer diameter which roughly corresponds to the inner diameter of the pipe 504 and the outer diameter of the fluid lock housing 530 to provide a tight fit for the inverted portion of the liner 502. Once the leading end of the liner 502 is secured to the fluid lock housing 530 in this manner, the liner 502 and the fluid lock housing form a generally sealed continuous vessel which serves as the pressurized region of the present embodiment. The interior of the fluid lock housing 530 also serves as the insertion conduit.

The foregoing constitutes a brief description of the primary structural features of the apparatus 500 of the present embodiment. In order to better understand the relationship between the various structural components and the installation of a liner 502 within the pipe 504, a brief description of the operation of the apparatus will now be presented. The operation of the above ground portion of the apparatus 506 is substantially the same as previously described in connection with apparatus 400 and, therefore, will not be repeated in detail. Essentially, a properly selected and prepared liner 502 is transported from a central liner preparation facility (not shown) to the remote job site location where the pipe 504 is to be lined. The manhold frame and cover (not shown) are removed to provide additional space and temporary supports are installed around the manhole entrance. Thereafter, the liner is folded as previously described and is fed down the manhole 505 at a controlled feed rate (utilizing either the first feed control means 512, or the second feed control means which comprises first and second hydraulic winches 514 and 516 respectively). Prior to the insertion of the liner into the manhole 505, the fluid lock 510 along with all associated connected piping 558 and 560 is installed within the pipe 504 as previously described. The liner conveyor means 520 is also installed in place within the pipe 504.

When the leading end of the liner 502 reaches the lower end of the manhole 505, it is placed upon the liner conveyor means 520. The liner 502 continues to move through the pipe 504 (toward the left) along the guide roller members 526. When the liner reaches the fluid lock housing 530, it passes through the semicircular member 564 and out of the exit end 530b of the fluid lock housing.

The feeding of the liner is temporarily stopped and the leading end of the liner 502 is inverted to form the cuff. The inverted leading end is then secured to the exit end 530b of the fluid lock housing as previously described. With the preliminary preparation now completed, the liner 502 is ready for inversion and insertion along the pipe 504.

The liner 502 is initially inverted and inserted along the pipe 504 utilizing air pressure. Pressurized air from a pressurized air source, such as a compressor (not shown) flows through the first fluid conduit 558, through fluid port 554 and into the fluid lock housing 530. The sealing members 566 which surround and sealingly engage the folded liner 502 prevent the pressurized air from flowing out of the fluid lock housing 530 around the liner 502. Since the fluid lock housing 530 is sealingly secured to the pipe 504 and the leading end of the liner 502, the air pressure within the fluid lock housing 530 builds up and pushes against the liner 502 inverting the liner and moving the liner towards the left along the pipe 504. A pressure regulating valve (not shown) is provided along the first fluid conduit 558 to permit the operator to regulate the air pressure within the pressurized region formed by the liner 502 and the fluid lock housing 530. The first feed control means 512 is employed to control the feed rate of the liner 502 in the manner as previously described in detail in connection with the other embodiments.

The inversion process utilizing air is continued until the trailing end of the liner 502 reaches the entrance of the first feed control means 512. Thereafter, control of the liner feed is shifted to the first hydraulic winch 514 in the same manner as described above in connection with the third embodiment. Inversion of the liner then continues utilizing the air pressure until the trailing end of the liner reaches the bottom of the manhole 505. It is at this point that the liner feed control is shifted or transferred to the second hydraulic winch 516 in a manner as described below.

One end of the flexible cable 518 is passed through the central opening of a water sealing packing gland assembly 580 (see FIG. 16) installed and used as described below. The one end of the cable 518 is then secured to the trailing end of the liner 502. The other end of the cable 518 is wound around the second hydraulic winch 516 as previously described. The cable associated with the first hydraulic winch 514 can now be removed from the trailing end of the liner 502 so that the trailing end of the liner is held only by cable 518. Thereafter, insertion of the liner utilizing the air pressure is permitted to continue by unwinding the cable 518 utilizing the second hydraulic winch 516.

When the trailing end of the liner passes through the semicircular member 564 and into the interior of the fluid lock housing 530, the insertion process is again stopped. The flared flange member 568 is removed from the right end of the semicircular member 564 and the packing gland assembly 580 is installed on the end of the semicircular member 564. A suitable gasket (not shown) is utilized so that the packing gland assembly 580 effectively provides a water tight seal over the semicircular member 564 to thereby seal the fluid lock housing 530. The one end of the hose 582 which has been previously installed within the first fluid conduit 558 is also secured to the trailing end of the liner 502.

At this point in the liner insertion process, approximately half of the liner 502 has been installed and inverted within the pipe 504, the other half of the liner extending backwardly through the center of the inverted half. The remainder of the liner is inverted and installed, preferably utilizing water pressure, although air pressure alone may be used if desired. The distal end of the second fluid conduit 560 is connected to a source of water (not shown). Again, a flow control valve (not shown) is included within the second fluid conduit to regulate the flow of water. Water from the source flows through the second fluid conduit, into the fluid lock housing 530 and the inverted portion of the liner 502. A suitable air bleed means (not shown) is provided to permit air to escape from the fluid lock housing 530 as the liner 502 fills with water. Once the liner 502 and the fluid lock housing 530 are completely filled with water, the water pressure continues to build until the liner 502 again begins to invert and move toward the left, this time under the water pressure. The second hydraulic winch 516 and the cable 518, in cooperation with the regulated water pressure, control the feed rate of the liner. The movement of the trailing end of the liner 502 along the pipe 504 pulls the hose 582 along with it in the manner previously described. The inversion and the insertion of the liner 502 continues in this manner until the liner reaches the stop means 584 which has been previously secured to the inside of the pipe 504 at the end of the section of pipe to be lined, preferably at or near another manhole. At this point, substantially all of the liner 502 is inverted within the pipe and the flexible cable 518 and the hose 582 extend within the liner along its entire length. The cable 518 passes through the packing gland assembly 582 and remains secured to the second hydraulic winch 516. The hose 582 passes through the first conduit 558 and extends to the surface.

The liner 502 is now ready for curing. The curing process is accomplished in substantially the same manner as described above in connection with the earlier embodiments. More specifically, heated water is introduced into the interior of the liner through perforations in the hose 582 and water is removed and recirculated from the liner 502 utilizing the second conduit 560 which is connected to a pump (not shown). The curing of the liner 502 takes about three hours utilizing a water temperature of about 170° F. Once the curing of the liner has been completed, the various components of the apparatus 500 can be disassembled and removed. Both ends of the cured liner 502 can then be trimmed as previously described.

Figure 20:
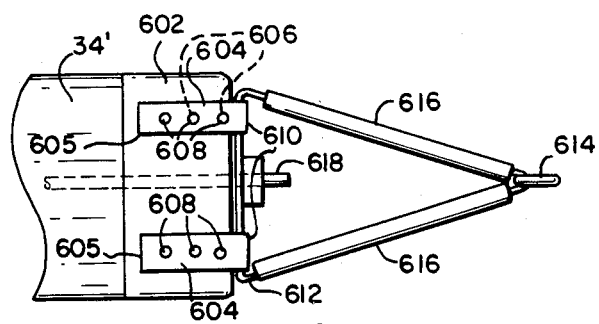
FIG. 20 is an enlarged elevation view of a portion of the apparatus shown in FIG. 1.
Figure 21:
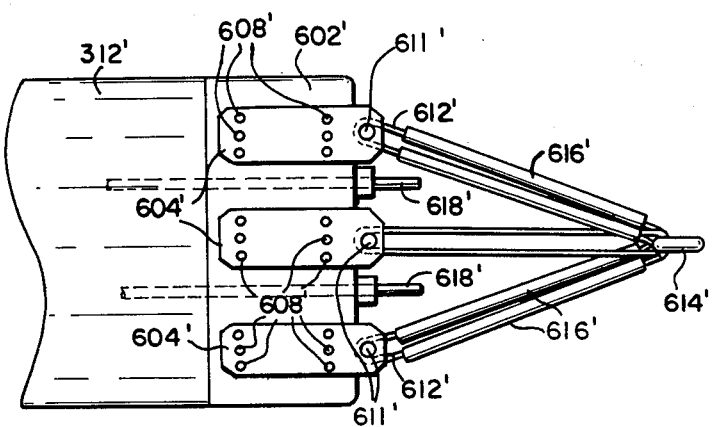
FIG. 21 is an enlarged elevation view of a portion of the apparatus shown in FIG. 6.
Figure 22:
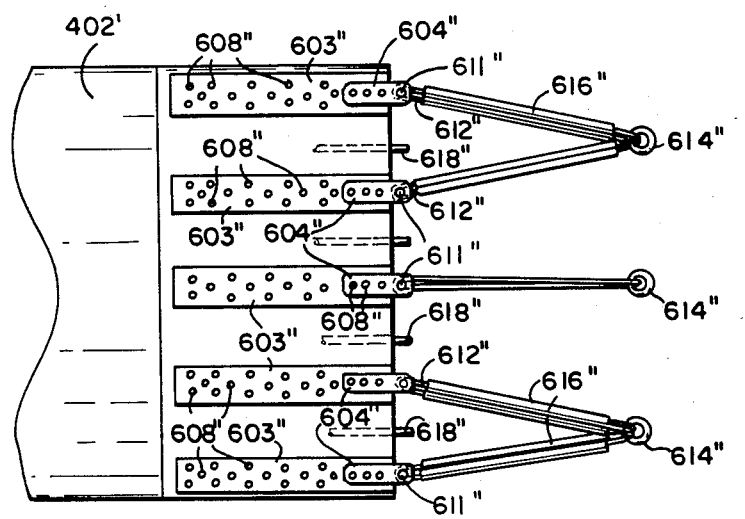
FIG. 22 is an enlarged elevation view of a portion of the apparatus shown in FIG. 7.

Referring now to FIGS. 20 through 22, there is shown, in greater detail, three slightly different means for securing the cables of the various secondary control means and hoses to the trailing end of a flexible tubular liner. The securement means differ primarily due to variations in the diameter of the tubular liner and the expected insertion and inverting forces applied to the liner. The securement means shown in FIG. 20 is primarily applicable with respect to liners having a diameter of between about four inches and about twelve inches. The securement means shown in FIG. 21 is preferably employed with liners having a diameter of between about twelve inches and about thirty-six inches. Correspondingly, the securement means shown in FIG. 22 is preferably employed with larger liners having a diameter of between about thirty-six inches and about eighty-four inches or more.

Referring now to FIG. 20, there is shown the trailing end of a flexible tubular liner 34' of the type described above having a diameter of between about four inches and about twelve inches. Extending around the outside of a portion of the liner 34' is an outer sheath 602 comprised of cured synthetic resin, such as "Tuftane", which has been bonded directly to the trailing end of the liner 34'. At least the portion of the liner 34' which is covered by the resin sheath 602 is compressed or flattened as shown.

Reinforcing means, in the present embodiment two generally parallel, spaced plate means or strap members 604 are attached to the flattened portion of the liner 34'. In the present embodiment, the strap members 604 are formed of leather or a similar strong but flexible material. The ends 605 of each of the strap members 604 engage both sides of the flattened portion of the liner 34' with the middle portion of each of the strap members 604 forming a bight 610 which extends slightly beyond and around the trailing end of the liner.

Each of the strap members 604 also includes at least one and preferably a plurality of openings 606 extending therethrough. The strap openings 606 on opposite sides of the flattened portion of the liner 34' are aligned with each other and are in registry with a similar number of openings (not shown) extending completely through the flattened portion of the liner 34'. Fastener means, preferably nuts and bolts shown collectively as 608, extend through each of the strap member openings 606 and the corresponding liner openings (not shown) for securing the end portions of the strap members 604 to the flattened portion of the liner 34'. Grommets, bushings or other protective devices (not shown) may be provided within the strap member openings 606 for added strength.

As shown in FIG. 20, the bight portions 610 of the strap members 604 extend beyond the trailing end of the flattened portion of the liner 34' forming attachment loops. Intermediate connection means, in the present embodiment a flexible cable 612, extends through each of the bight portions 610 and around a connection terminal means, in the present embodiment an annular ring member 614. Protective tubing 616 extends around a portion of the cable 612 as shown.

When the trailing end of the liner 34' is flattened and the securement means, is in place, the bonded resin 602 forms a sealing means or sealing membrane for sealing the end of the liner 34'. Means, in the present embodiment a generally cylindrical gas evacuation tube 618, extends out of the sealed end of the liner 34' to permit the escape of gases trapped in the interior of the liner as the resin is being impregnated into the liner during liner preparation (not shown).

Referring now to FIG. 21, there is shown the trailing end of a flexible tubular liner 312' of the type described above having a diameter of between about twelve inches and about thirty-six inches. A portion of the end of the liner 312' is compressed or flattened and a sheath 602' of cured synthetic resin has been bonded directly to the flattened portion of the liner 312'.

Reinforcing means, comprising a plurality, and preferably three generally parallel, spaced plate means are secured to the flattened portion of the liner 312'. Preferably, each plate means comprises a pair of plate members 604', one plate member of each pair being on opposite sides of the flattened portion of the liner 312'. Each of the plate members 604' include at least one and preferably a plurality of openings 606' extending therethrough. The openings 606' on the plate members 604' of each plate member pair are aligned with each other and are in registry with a similar number of openings (not shown) which extend through the flattened portion of the liner 312'. Fastener means, preferably nuts and bolts, shown collectively as 608' extend through each of the plate member openings 606' and the corresponding liner openings (not shown) for securing the plate members 604' to the liner 312'. Grommets, bushings or other protective devices (not shown) may be provided around the plate member openings 606' for added strength.

A portion of each of the plate members 604' extends beyond the trailing end of the flattened portion of the liner 312'. Attachment means, preferably a pin member 611', is secured between the extended portions of each pair of plate members 604'. An individual flexible cable 612' extends around each of the pin members 611', the flexible cables being joined together around a common connection terminal means, such as an annular ring member 614'. Protective tubing 616' extends around the exposed portions of the cables 612' as shown. As with the above-described embodiment, the bonded resin 602' forms a sealing means or sealing membrane for sealing off the trailing end of the liner 312'. Gas releasing means in the form of one or more gas evacuation tubes 618' extends out of the sealed end of the liner 312' to permit the escape of gases trapped within the liner 312' during the resin impregnation process.

Referring to FIG. 22, there is shown the trailing end of a flexible tubular liner 402' of the type described above and having a diameter of between about thirty-six inches and about eighty-four inches. The securement means used in conjunction with liner 402' is substantially the same as that described above in connection with liner 312' of FIG. 21. However, with the securement means of FIG. 22, there are five pairs of plate members 604" which are secured to the flattened portion of the liner 402'. In addition, the flattened portion of the liner which is covered by the outer sheath 602" is somewhat larger and includes a plurality of metallic braided reinforcing strips 603" which are secured to the liner 402' proximate the plate members 604" for added holding strength. The flexible cables 612" which serve as intermediate connection means are secured to the plate member pin 611" and to three separate annular ring members 614". By employing a securement means of this type, the pulling forces acting upon the trailing end of the liner 402' can be effectively spread over the entire width of the liner to prevent tearing.

Although the apparatus previously described above in connection with the various embodiments of the present invention are primarily employed for the installation of a flexible tubular liner into a pipe or conduit which has been previously installed, for example, underground the apparatus could also be employed for the installation of such a liner within one or more sections of new or uninstalled length of pipe (shown as 628) or the various corresponding pipe fittings (shown as 629). Such pipe sections 628 and fittings 629 may be made of cast iron, ductile iron, concrete, clay or any other material typically used in the fabrication of pipe and pipe fittings. The addition of a tubular liner of the type described in detail above to such new or uninstalled pipe sections or fittings provides the additional strength and leakage protection not afforded by the pipe alone.

Figure 23:
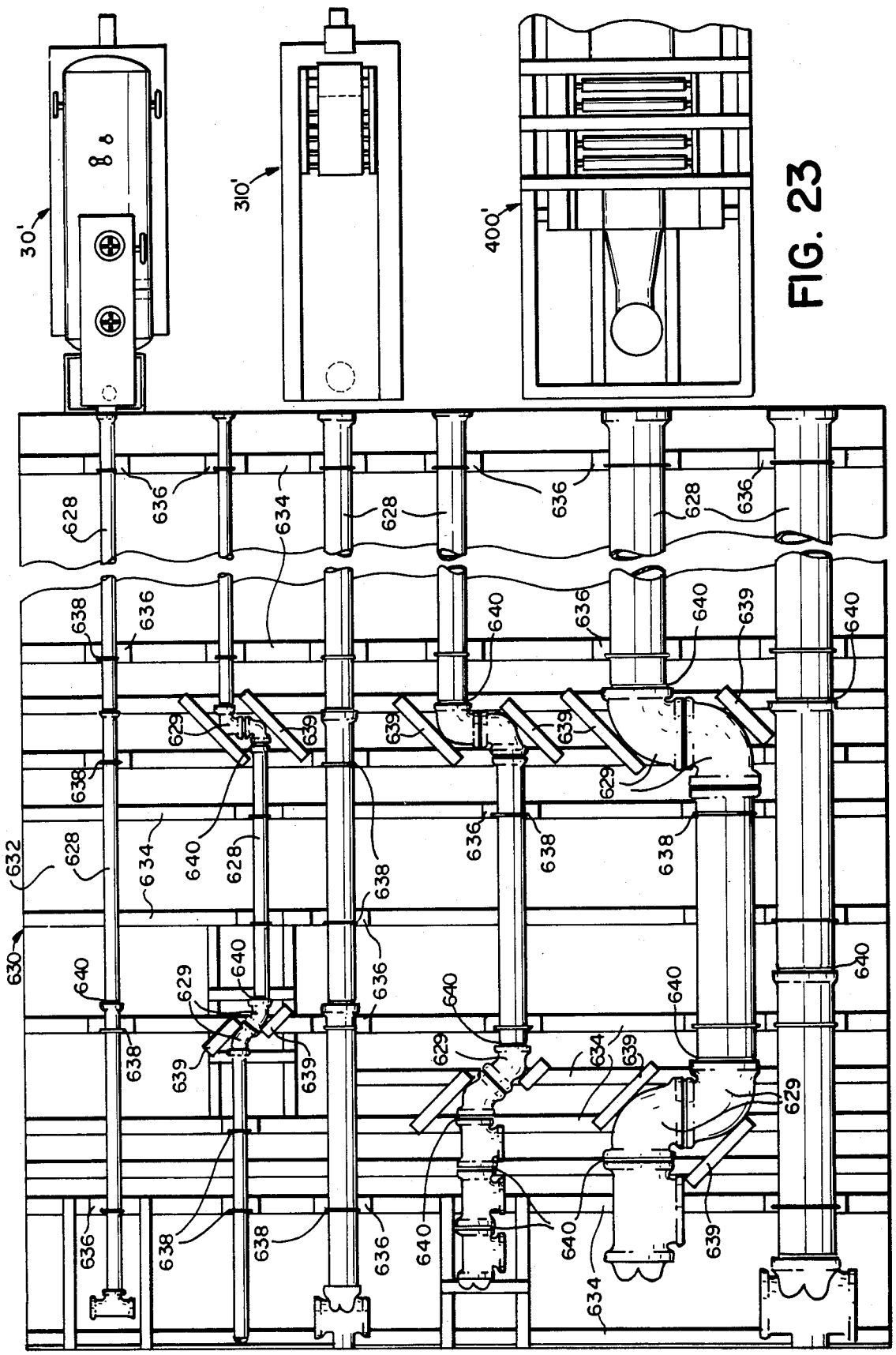
FIG. 23 is a plan view of the apparatus shown in FIGS. 1, 6 and 7 as employed for the prelining of the corresponding sized conduits prior to installation.

Referring now to FIG. 23, there is shown a plan view of a method and apparatus for the installation of a flexible tubular liner within a new or uninstalled pipe section or fitting of any particular size. The method and apparatus shown in FIG. 23 employs apparatus 30', 310' and 400' which are substantially the same as the previously described apparatus 30, 310 and 400 of the first, second and third embodiments, depending upon the diameter of the pipe involved. Thus, for the installation of a flexible tubular liner within a new or uninstalled pipe section 628 or fitting 629 with a diameter in the range of between about four inches and about twelve inches, apparatus 30' (substantially the same as apparatus 30 of FIGS. 1 through 5) is employed. Correspondingly, for the installation of a flexible tubular liner into a new or uninstalled pipe section or fitting having a diameter of between about twelve inches and about thirty-six inches, apparatus 310' (substantially the same as apparatus 310 of FIG. 6) is employed. Similarly, for the installation of a flexible tubular liner into a new or uninstalled pipe section or fitting having a diameter of between about thirty-six inches and about eighty-four inches or larger, apparatus 410' (substantially the same as apparatus 400 of FIGS. 7 through 11) is employed.

Since each of the apparatus 30', 310' and 400' are generally transportable, they can be individually aligned to a fixed location such as the locations shown in FIG. 23. Therefore, it is preferable to provide a generally fixed facility 630 to which the various sized conduits or pipes and fittings may be secured and thereafter moving the particular apparatus 30', 310' or 400' into position as shown for the installation of the liners.

In the present embodiment, the pipe holding facility 630 is comprised of a supporting means including a large, generally level base member 632 which may be comprised of a concrete slab or any other similar structure. A plurality of generally parallel supporting beams 634 are secured to the concrete base 632 by attachment means, preferably a plurality of anchor bolts and nuts (not shown). The spacing between the supporting beams 634 varies depending upon the length of the pipe sections or pipe fitting to be lined. The pipe sections 628 which are to be lined are aligned in end to end relationship to form a generally continuous conduit and are secured to the parallel supporting beams 634 at one or more locations as shown. The pipes 628 may be secured to the supporting beams utilizing clamping means, in the present embodiment a plurality of individual restraining beams 636 which are generally parallel to and supported by the supporting beams 634. The restraining beams 636 have curved saddles (not shown) which corresponding to the curvature of the pipe to provide a positive supporting surface for the pipes. Suitable restraining straps 638 extend around the outside of the pipe sections 628 to hold the pipe sections in position. Additional restraining beams 639 are secured to the supporting beams 634 at suitable angles as shown for holding the pipe fittings 629 in place.

Spacer means (not shown) are installed between the pipe sections 628 and/or pipe fittings 629 to provide a small space or gap 640 between adjacent pipes and or fittings of approximately one inch.

Figure 24:
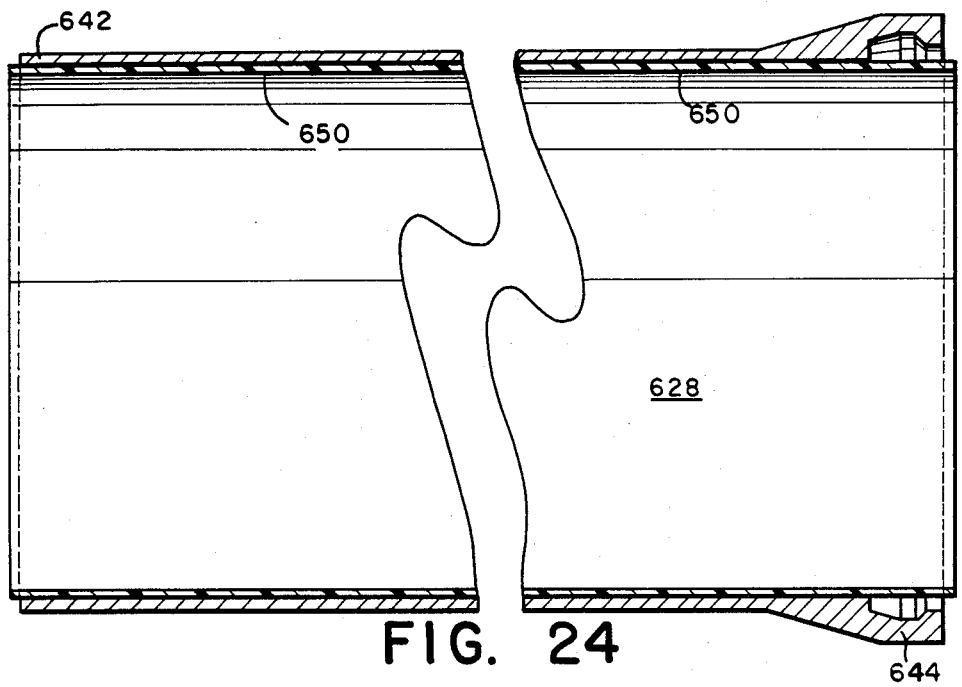
FIG. 24 is an enlarged sectional view of a portion of the pipe shown in FIG. 23.
Figure 25:
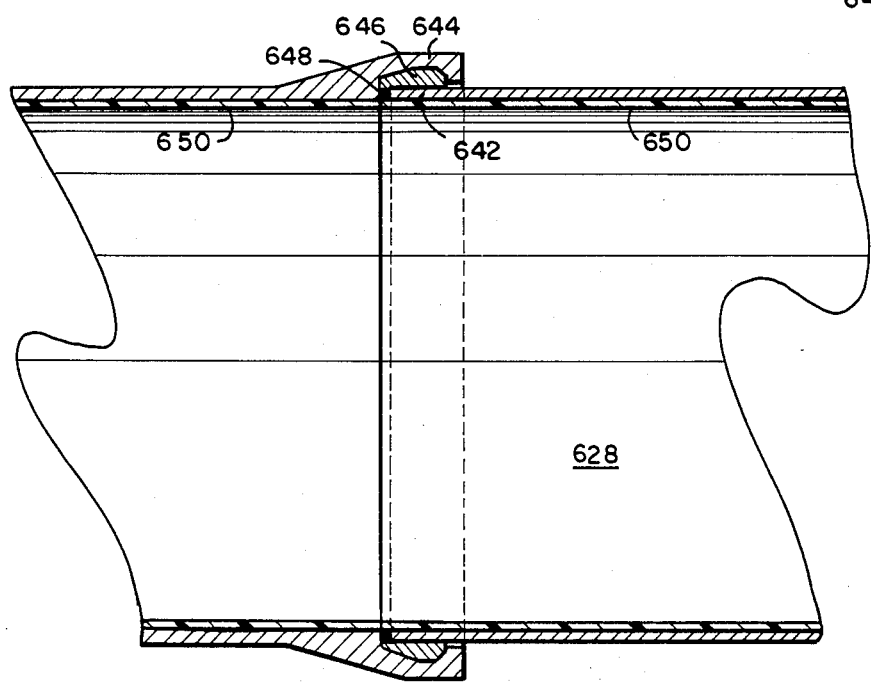
FIG. 25 is an enlarged sectional view of a portion of the pipe shown in FIG. 23 when connected to a corresponding pipe.

Once the pipe sections 628 or fittings 629 are appropriately secured to the concrete base 632 as described, the appropriately sized liner installation apparatus is moved into position at a first end of the line of pipe sections and fittings. Thereafter, the previously described liner installation procedure is followed with the liner being inverted and passing sequentially through the various spaced pipe sections 628 and/or fittings 629 one by one until the liner reaches the distal end of the pipe sections (towards the left when viewing FIG. 23). The liner is then cured in place as previously described and the liner installation apparatus 30', 310' or 400' can then be removed. The cured liner is then severed or cut transversely at the gaps or spaces 640 between adjacent pipe sections and/or fittings and is trimmed to provide pipe ends as shown in FIG. 24. The pipe sections 628 and fittings 629 may then be released and removed for installation and use in the normal manner.

If the liner 650 has been properly trimmed as shown in FIG. 24, a small portion of the liner extends beyond both the spigot end of the pipe 642 and the bell end of the pipe 644. Upon installation of the pipe, the portion of the liner extending beyond the spigot 642 end of the pipe or fitting abuts and cooperates with the portion of the liner extending within the bell portion 644 of the abutting pipe or fitting as shown in FIG. 24. A compression gasket 646 is installed in the bell portion 644 of the pipe and a small amount of a sealer compatible with the curing resin and liner materials, such as an epoxy based sealer 648, is placed at the back of the bell 644 as the spigot end 642 of the pipe is pushed into the bell 644, thereby forming a completely sealed pipe joint.

Figure 26:
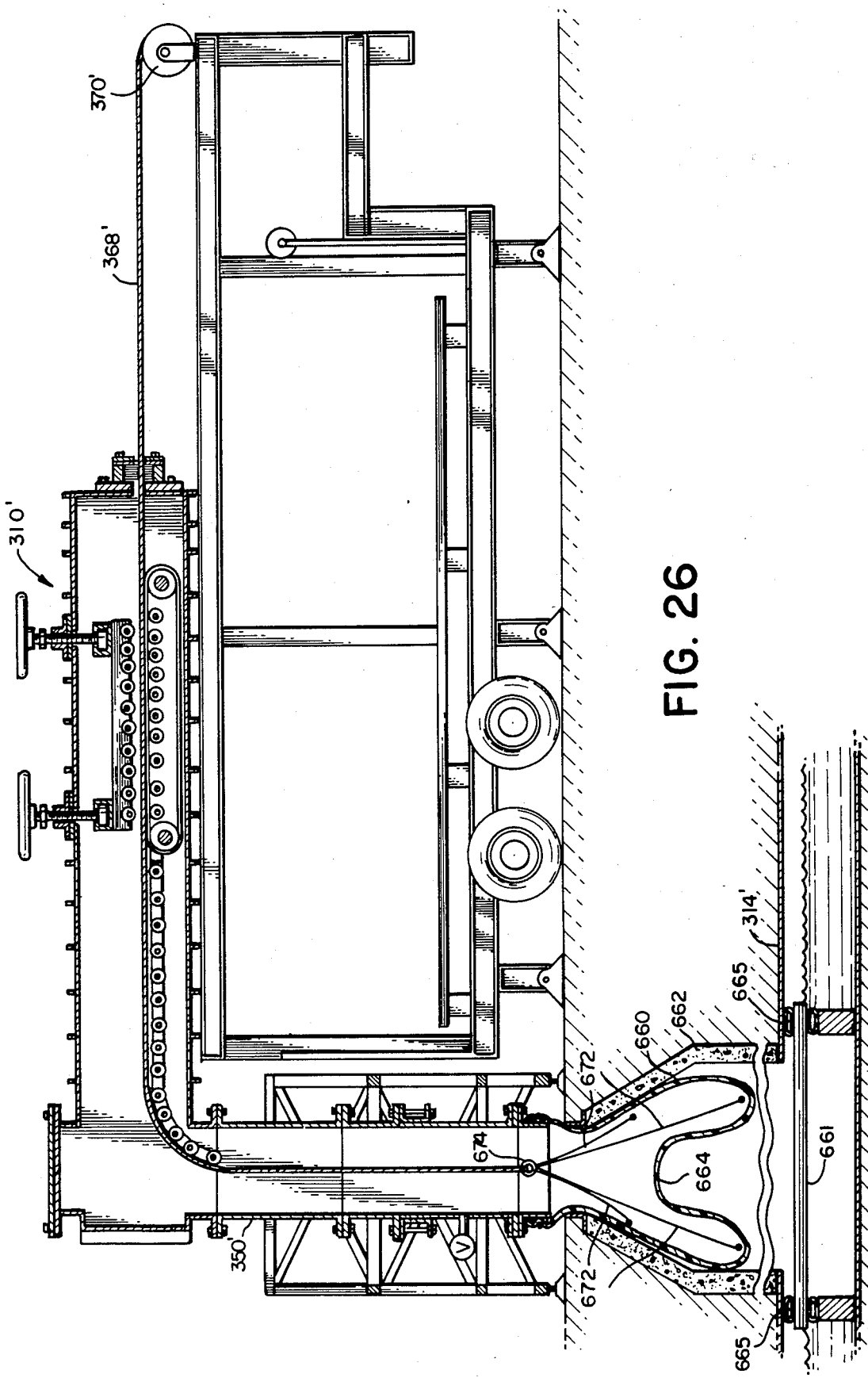
FIG. 26 is an alternate embodiment of the apparatus of FIG. 7 which may be employed for the installation of a liner within a vertically oriented conduit.
Figure 27:
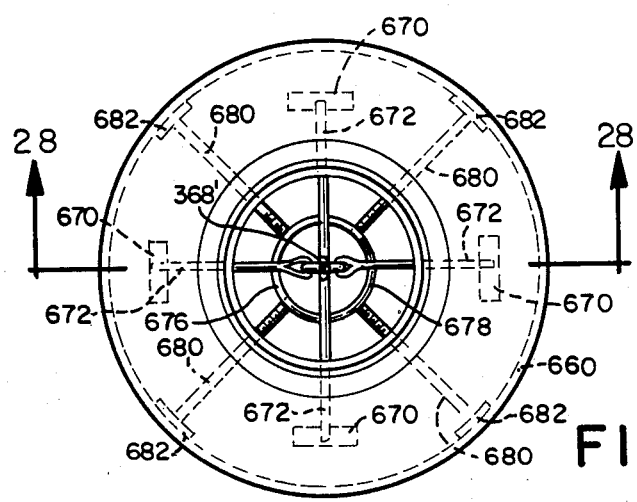
FIG. 27 is an enlarged plan view of a portion of the apparatus of FIG. 26.
Figure 28:
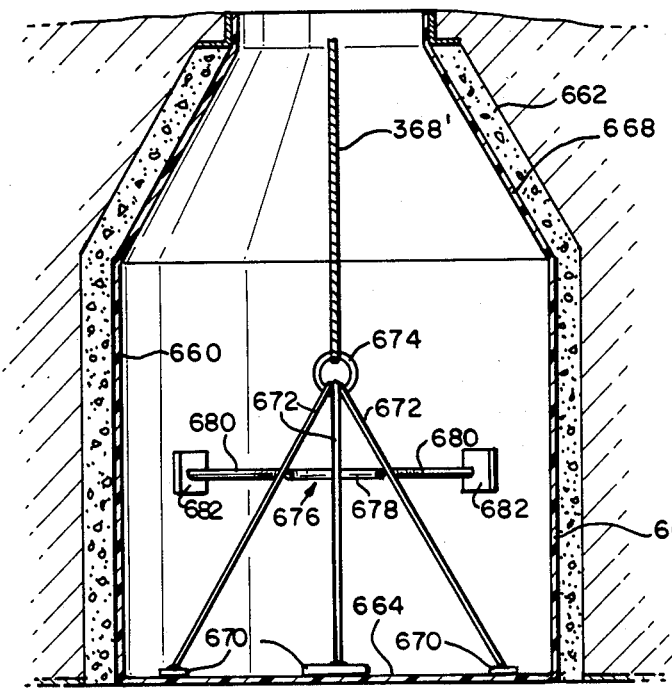
FIG. 28 is a sectional view taken along line 28—28 of FIG. 27.

Referring now to FIGS. 26 through 28, there is shown a method and apparatus for the insertion of a flexible liner 660 into a manhole 662. The liner 660 is custom made to conform to the shape and size of the manhole 662 and includes a generally closed lower or bottom wall portion 664, a generally cylindrical portion 666 and a generally conical portion 668 all of which are joined together to form the generally continuous liner 660. As with the above-described liners, liner 660 is first impregnated with a thermosetting resin and is then transported to the location of the manhole 662.

As shown in FIG. 26, the apparatus used for installation of the flexible liner 660 into the manhole 662 is substantially the same as the above-described second embodiment as shown in FIG. 6. A detailed description of the apparatus 310' is set forth above and therefore will not be repeated.

The leading end of the flexible manhole liner 660 is partially inverted to form a cuff and is secured to the lower end of the insertion conduit 350' in the manner as previously described in connection with the embodiment shown in FIG. 6. A plurality of attachment means are secured to the liner lower portion 664 or the line sidewall portion in spaced relation as shown. In the present embodiment, the attachment means comprises holding straps 670, four of which are shown. The first end of each of four attachment cables 672 is secured to the holding straps 670 as shown. The other end of each of the four attachment cables 672 is secured to a common connection or attachment means, preferably an annular ring 674. The first end of the flexible cable 368' of the apparatus 310' is secured to the annular ring 374 for controlling the lowering of the liner 660 into the manhole 662.

Prior to installing the liner 660, the manhole 662 is blocked off and the sewage or other fluid flowing through the manhole 662 is diverted or pumped around the manhole 662 utilizing a bypass pump (not shown). Alternatively, a temporary flow through conduit 661 may be placed within the manhole 662. The flow through conduit 661 has a diameter which is less than the diameter of the pipe 314' and suitable sealing means, such as inflatable tubular members 665 surround the flow through conduit 661 for sealing the joint between the pipe 314' and the flow through conduit 661. In this manner, all of the sewage or other fluid is channeled through flow through conduit 661 in order to keep the fluid level below the bottom of the liner 660.

The flexible manhole liner 660 is installed into the manhole 662 by low pressure air which is installed within the pressurized region of the apparatus 310'. The pressure of the air forces the liner 660 to invert and move downwardly into the manhole 662 and thereafter to expand outwardly against the interior walls of the manhole 662. The cable 368' and the hydraulically actuated winch 370' control the rate of insertion of the liner 660 into the manhole 662.

Once the liner is fully inserted within the manhole 662 as shown in FIG. 2B, a mechanical abutment means, in the present embodiment a holding spider assembly 676 is installed within the liner to hold the liner in place. The holding spider assembly 676 includes a central annular brace member 678 and four leg members 680 which extend outwardly from the brace member 678 and are generally normal to each other. The radial outer ends of the leg members 680 include padded engagement means 682 for engaging the liner 660. The leg members 680 are adjustable to move the engagement means 682 radially inwardly or outwardly to hold the liner 660 in place against the wall of the manhole 662. More than one holding spider assembly 676 may be employed to hold the liner 660 in place.

After the holding spider assembly 676 is positioned as shown, the liner 660 is filled with water to push the liner outwardly against the interior walls of the manhole. The water is heated to cure the liner in the manner as previously described in connection with the various conduit or pipe liners. After curing of the liner is completed, the water and the spider assembly 676 are removed and the lower portion of the liner 664 is cut-out and removed to afford access or communication between the manhole 662 and the pipe running through the manhole 662. The flow through conduit 661 is then removed to permit the sewage or other fluid to flow normally. If the flow through conduit 661 is made of plastic, it may be cut away when the lower portion of the liner 664 is cut out.

Figure 29:
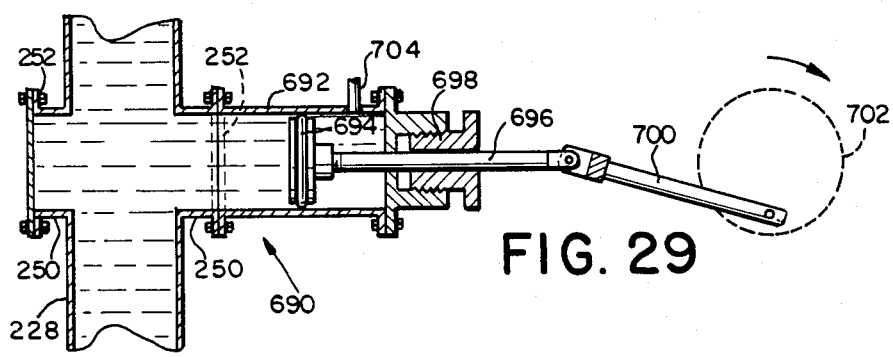
FIG. 29 is a view of a pulsator which may be used in accordance with the apparatus shown in FIG. 1 or FIG. 6.

FIG. 29 shows a pulsator means or pulsator assembly 690 which may be utilized in connection with any of the previously described liner installation apparatus to assist in the inversion and movement of the liner along the conduit or pipe. In the embodiment shown in FIG. 29, the pulsator assembly 690 is employed in connection with apparatus 30 of FIG. 1 and is secured to one of the annular connection flange members 250 positioned along the insertion conduit 228. Prior to installing the pulsator assembly 690 on the flange member 250, the cover plate, shown in phantom as 252, is removed.

The pulsator assembly 690 comprises a tubular or cylindrical housing 692 within which is disposed a movable piston member 694. The cylindrical housing 692 is generally sealed and the piston member 692 includes a rod 696 which extends out of the end of the cylindrical housing 692 through a suitable packing gland 698. The distal end of the rod 696 is pivotally connected to a first end of a connecting member 700. The other end of the connecting member is similarly pivotally connected to an eccentric drive means shown in phantom as 702. The eccentric drive means 702 in turn is secured to the output shaft of a hydraulic motor (not shown).

The cylindrical housing 692 also includes an air inlet/exit vent means 704. The air inlet/exit means is provided to permit the piston to move unimpeded in the rod direction (toward the right when viewing FIG. 29).

The pulsator assembly is employed to provide additional pressure to the pressurized region during inversion and insertion of the liner within the pipe. The turning of the hydraulic motor (not shown) causes the eccentric drive means to turn thereby reciprocating the connecting member 700. The reciprocal movement of the connecting member 700 causes the piston member 694 to rapidly move back and forth within the cylindrical housing 692. The reciprocal movement of the piston 694 provides a mild water hammer effect in the form of pulses of water pressure which move through the insertion conduit 228 and the rest of the pressurized region to enhance the inversion and movement of the tubular liner along the conduit or pipe.

While the pulsator assembly 690 is described as being utilized in connection with the embodiment shown in FIG. 1, it should be appreciated by those skilled in the art that a similar pulsator apparatus could also be implied in connection with the other embodiments described above.

Figure 30:
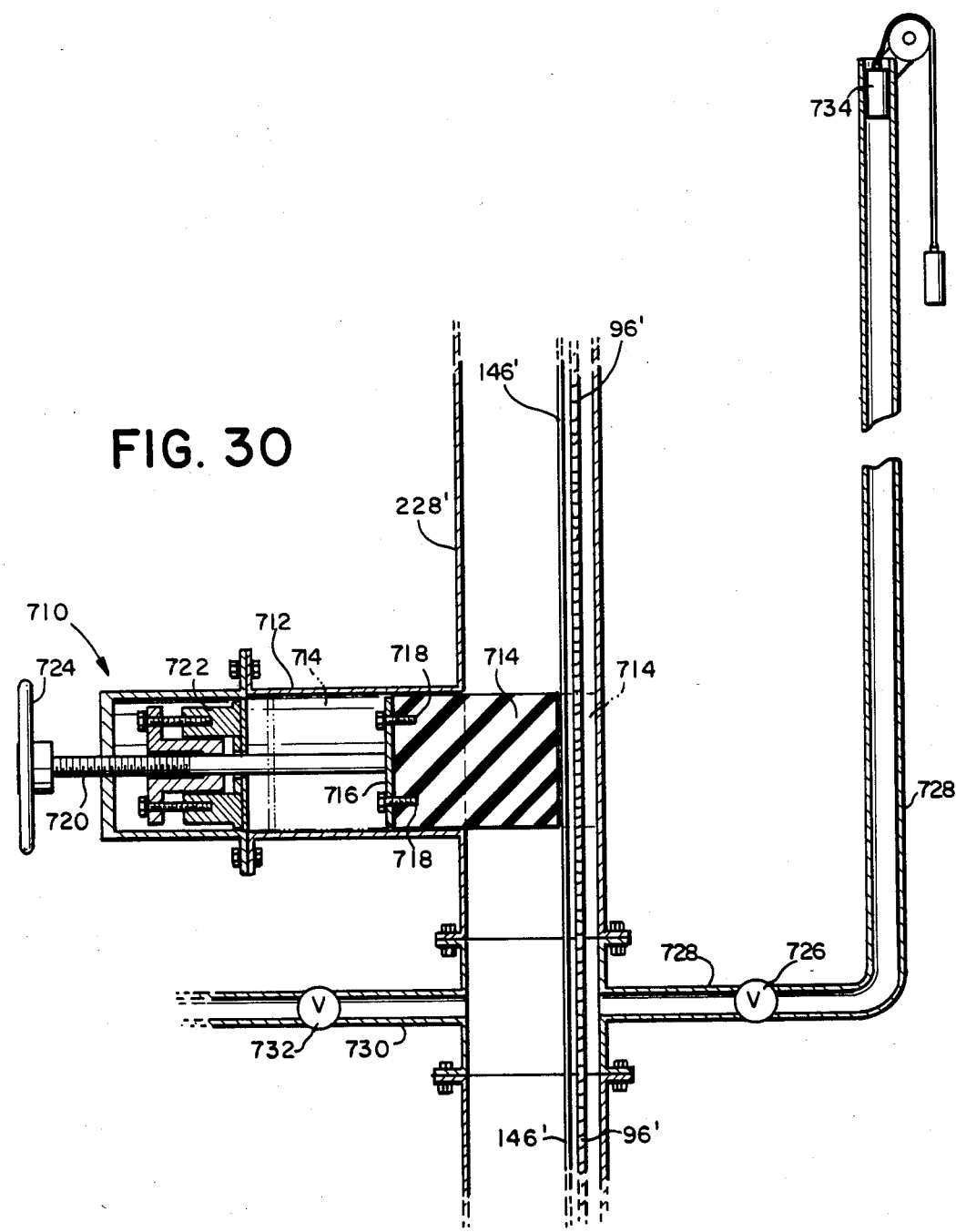
FIG. 30 is an enlarged sectional view of a portion of the apparatus of FIG. 1 showing an alternate embodiment.

Referring now to FIG. 30, there is shown another variation of the first embodiment of the present invention 30. The variation shown in FIG. 30 relates to means for sealing the insertion conduit 228' to maintain the inversion water pressure within the insertion conduit and the liner during the disassembly and removal of the pressure vessel 36 and the installation of the snorkel assembly 296. The means for sealing the insertion conduit, shown generally as 710, comprises a generally cylindrical housing member 712 extending radially outwardly from a portion of the insertion conduit 228'. Located within the cylindrical housing 712 is a generally cylindrical sealing member or plug 714. In the present embodiment, the sealing member 714 is comprised of a soft resilient material such as rubber. The sealing member 714 is generally cylindrical in cross-section for movement through the cylindrical housing 712.

A generally circular plate member 716 is secured to one end of the sealing member 714 by suitable attachment means, for example a plurality of bolts 718. A first end of an elongated control rod 720 is secured to the circular plate member 716 proximate the center thereof. The other end of the control rod 720 extends out of the cylindrical housing 712 through a packing gland assembly 722. A portion of the control rod 720 is threaded as shown to engage suitable complimentary threading on the packing gland assembly 722. A control wheel 724 is secured to the distal end of the control rod 720. Rotation of the control wheel 724 results in corresponding rotation of the control rod 720 with respect to the packing gland assembly 722 to move the sealing member 714 into or out of the insertion conduit 228'.

In operation, once the inversion and insertion of the liner has been completed, but prior to curing, the cable 96' and the perforated flat hose 146' extend from the trailing end of the liner back through the insertion conduit 228' as shown. At this point in the liner installation process, it is desirable to disconnect and remove the pressure vessel 36 (not shown in FIG. 30) for refilling with the next liner to be installed. While in most applications it is not necessary to maintain the water pressure within the liner during the disconnection and removal of the pressure vessel 36, in some situations, particularly where there is a high water table in the surrounding area, it is desirable to maintain the pressure within the liner to prevent any undesired movement or collapse of the liner. For this purpose, the sealing member 714 is moved into the insertion conduit 228' and (all the way to the right when viewing FIG. 30) to fully engage and block the insertion conduit 228. Since the sealing member 714 is made of a soft resilient material, it conforms to and seals around the cable 96' and the hose 146' to form a complete seal of the insertion conduit 228'.

Once the insertion conduit is sealed off by the sealing member 714, control valve 726 is opened to permit water from the insertion conduit to flow into a temporary or alternate snorkel assembly 728. Additional water is permitted to flow into the insertion conduit 228' through water conduit 730 which is connected to a water source (not shown). Water conduit 730 also includes a control valve 732.

The level of the water in the temporary snorkel assembly 728 is permitted to rise to the top of the temporary snorkel assembly 728. A suitable float gauge 734 is provided at the top of the temporary snorkel assembly 728 to indicate when the proper water level is attained. The water level within the temporary snorkel assembly 728 provides sufficient pressure to maintain the liner in engagement with the pipe along its entire length. The pressure vessel 36 (not shown in FIG. 30) may then be disconnected and removed. Thereafter, the main snorkel assembly 296 (not shown in FIG. 30) may be installed in the manner as previously described. Once the water level in the main snorkel assembly 296 is attained, the sealing member 714 may be removed from the insertion conduit 228' by turning the control wheel 724 to withdraw it into the cylindrical housing member 712. The remainder of the curing process is continued as described above.

Although the sealing means 710 has been described for use in connection with the first embodiment of the present invention, it will be appreciated by those skilled in the art that it could also be employed without undue experimentation in connection with other embodiments of the present invention as described above.

From the foregoing description, it can be seen that the present invention comprises a method and apparatus for installing a flexible tubular liner into a conduit. It will be recognized by those skilled in the art that changes may be made to the above-described embodiments of the invention without departing from the broad inventive concepts thereof. It is understood, therefore, that this invention is not limited to the particular embodiments disclosed, but it is intended to cover all modifications which are within the scope and spirit of the invention as defined by the appended claims.

I claim:

1. A securement means for securing a generally flexible cable to one end of a generally flexible tubular pipe liner which has been impregnated with a thermosetting resin, a portion of the liner proximate the one end being flattened with the interior liner surfaces engaging to close the one end and to establish two generally flat end portion sides, the flattened liner end portion including a plurality of openings extending completely therethrough from one side to the other side, the securement means comprising reinforcing means secured to both sides of the flattened liner end portion for reinforcing the liner end portion to distribute tension exerted on the liner by the cable, the reinforcing means including a plurality of openings extending therethrough, the reinforcing means openings being in registry with the liner end portion openings, the reinforcing means being secured to the liner end portion by fastener means extending through the registered openings in the liner end portion and in the reinforcing means, a portion of the reinforcing means extending beyond the end of the liner and including attachment means for attaching the cable to the reinforcing means.

2. The securement means as recited in claim 1 wherein the reinforcing means comprises a generally flexible elongated strap member having end portions and a bight portion between the end portions, one of the end portions being secured to each side of the flattened liner end portion with the bight portion extending beyond the end of the liner to provide the attachment means.

3. The securement means as recited in claim 1 wherein the reinforcing means comprises a pair of spaced generally flexible elongated strap members, each strap member having end portions and a bight portion between the end portions, one of the end portions of each strap member being secured to each side of the flattened end portion of the liner with the bight portion of each strap member extending beyond the end of the liner to provide the attachment means, further including intermediate connection means extending through each of the bight portions of each of the strap members for attaching the cable to the strap members.

4. The securement means as recited in claim 1 wherein the reinforcing means comprises a pair of generally rigid elongated plate members, the plate members being generally aligned on opposite sides of the liner end portion, a portion of each of the plate members extending beyond the liner end and wherein the attachment means comprises a pin member secured to and extending between the portions of the plate members extending beyond the liner end.

5. The securement means as recited in claim 4 further including braided material secured to the flattened liner end portion and positioned between the plate members and the liner.

6. A securement means as recited in claim 1 further including a layer of cured synthetic resin bonded to the flattened end portion of the liner, the cured synthetic resin layer sealing the closed end of the liner.

7. The securement means as recited in claim 6 further including means extending out of the sealed end of the liner and through the resin layer for releasing gas from the interior of the liner.

8. The securement means as recited in claim 7 wherein the means for releasing the gas comprises a gas evacuation tube.

* * * * *